(12) United States Patent
Tsutsumi et al.

(10) Patent No.: US 6,689,507 B1
(45) Date of Patent: Feb. 10, 2004

(54) BATTERY AND EQUIPMENT OR DEVICE HAVING THE BATTERY AS PART OF STRUCTURE AND LOCALLY DISTRIBUTED POWER GENERATION METHOD AND POWER GENERATION DEVICE THEREFOR

(75) Inventors: Kazuo Tsutsumi, Kobe (JP); Toshio Atsuta, Akashi (JP); Chikanori Kumagai, Kobe (JP); Mitsuharu Kishimoto, Kako-gun (JP); Atsushi Tsutsumi, Tokyo (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 159 days.

(21) Appl. No.: 09/937,688
(22) PCT Filed: Sep. 27, 2000
(86) PCT No.: PCT/JP00/01860
§ 371 (c)(1),
(2), (4) Date: Sep. 28, 2001
(87) PCT Pub. No.: WO00/59062
PCT Pub. Date: Oct. 5, 2000

(30) Foreign Application Priority Data

Mar. 29, 1999 (JP) .............................. 11-85585
Oct. 29, 1999 (JP) ........................... 11-309627
Feb. 14, 2000 (JP) ......................... 2000-34650

(51) Int. Cl.$^7$ .......................... H01M 2/38; H01M 2/36; H01M 10/50; H01M 4/74; H01M 4/58
(52) U.S. Cl. ............................ 429/67; 429/73; 429/62; 429/120; 429/243; 429/218.2; 429/223
(58) Field of Search ................. 429/105, 72, 73, 429/62, 120, 67, 68, 69, 218.2, 223, 233, 243, 235

(56) References Cited

U.S. PATENT DOCUMENTS

| 4,091,181 A | 5/1978 | Merritt, Jr. .................... 429/94 |
| 4,977,043 A | 12/1990 | Kadouchi et al. ............. 429/54 |
| 5,139,900 A | 8/1992 | Tada et al. ................... 429/206 |
| 5,264,302 A | * 11/1993 | Sonneveld .................... 429/67 |
| 5,405,714 A | 4/1995 | Terasaka et al. .............. 429/52 |
| 5,714,277 A | 2/1998 | Kawakami ................... 429/62 |

FOREIGN PATENT DOCUMENTS

| EP | 0 174 526 B1 | 7/1990 |
| EP | 0 324 479 B1 | 6/1995 |

(List continued on next page.)

OTHER PUBLICATIONS

"Chemistry: A Structural View" by Dr. R. Stranks, et al., $2^{nd}$ ed., Carlton, Vic.: Melbourne University Press, 1970 (pp 306–321).

Primary Examiner—Stephen Kalafut
Assistant Examiner—Thomas H. Parsons
(74) Attorney, Agent, or Firm—Marshall, Gerstein & Borun LLP

(57) ABSTRACT

A battery comprising powdered active materials and capable of storing a large power, and equipment or device having the battery as parts of its structure, wherein an anode cell (2) of two vessels connected via an ion-passing separator (1) is filled with an anode powdered active material and an electrolytic solution (4), a cathode cell (3) is filled with a cathode powdered active material and an electrolytic solution (5) and conductive current collectors (6, 7) in contact with the powdered active materials are provided in the two vessels.

15 Claims, 50 Drawing Sheets

FOREIGN PATENT DOCUMENTS

| | | |
|---|---|---|
| EP | 0 443 451 B1 | 12/1995 |
| GB | 1437649 | 6/1976 |
| GB | 1 437 649 A1 | 6/1976 |
| JP | 50-48422 | 4/1975 |
| JP | 53-92302 | 8/1978 |
| JP | 53-092302 A1 | 8/1978 |
| JP | SHO 53-092302 A1 | 8/1978 |
| JP | 64-31352 | 2/1989 |
| JP | 4-144076 | 5/1992 |
| JP | 04-144076 A1 | 5/1992 |
| JP | 6-283206 | 10/1994 |
| JP | 6-292304 A1 | 10/1994 |
| JP | 6-292304 | 10/1994 |
| JP | 07-169513 A1 | 7/1995 |
| JP | 8-19193 | 1/1996 |
| JP | 8-019193 * | 1/1996 |
| JP | 8-273680 | 10/1996 |
| JP | 08/273680 A1 | 10/1996 |
| JP | 11-4632 | 1/1999 |
| JP | 11-18203 | 1/1999 |
| JP | 3051401 | 3/2000 |
| WO | WO 90/02423 | 3/1990 |
| WO | WO 92/15122 | 9/1992 |
| WO | WO 95/31011 | 11/1995 |

* cited by examiner gas or liquid hydrogen and hydrogen-containing gas or hydrogen carbide gas or alcohol-like material or ethel-like material oxygen or air

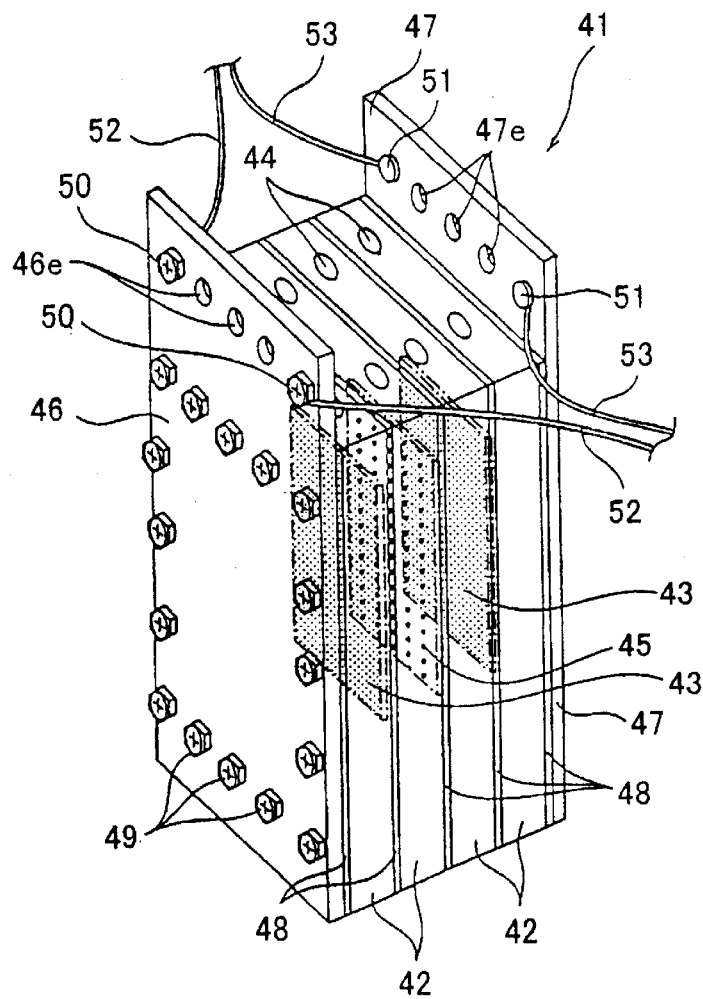
Fig. 1 3 (a)
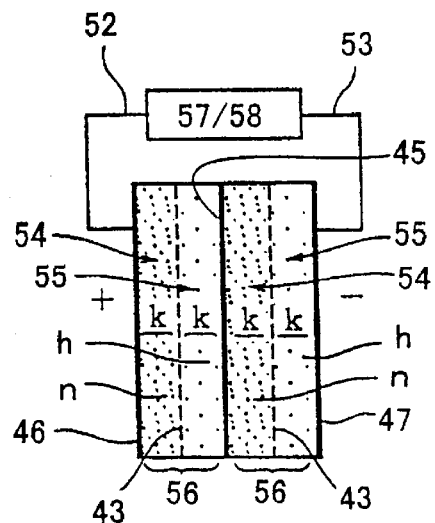
Fig. 1 3 (b)

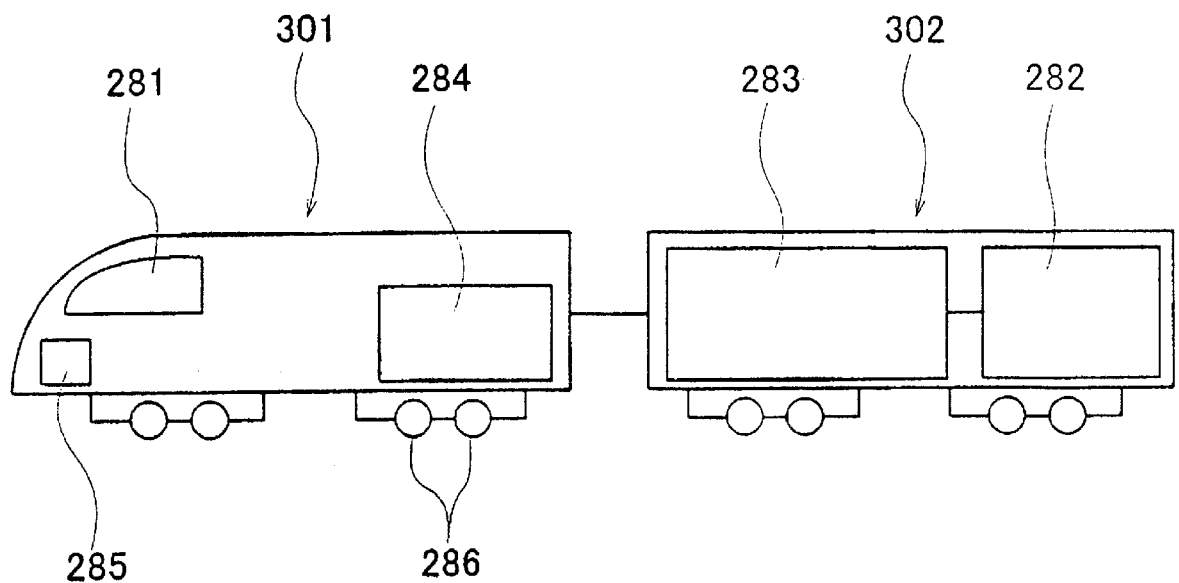
Fig. 3 8 (a)
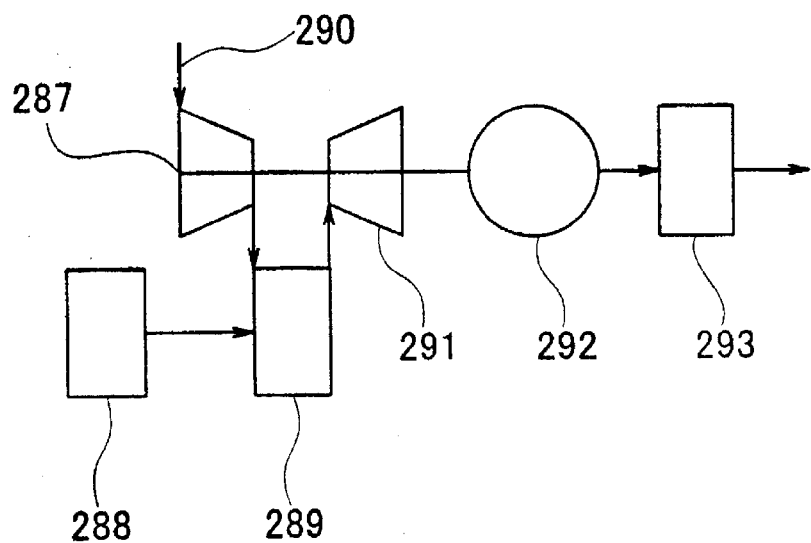
Fig. 3 8 (b)

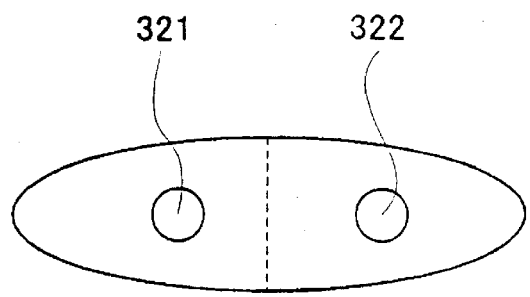
Fig. 4 0 (a)
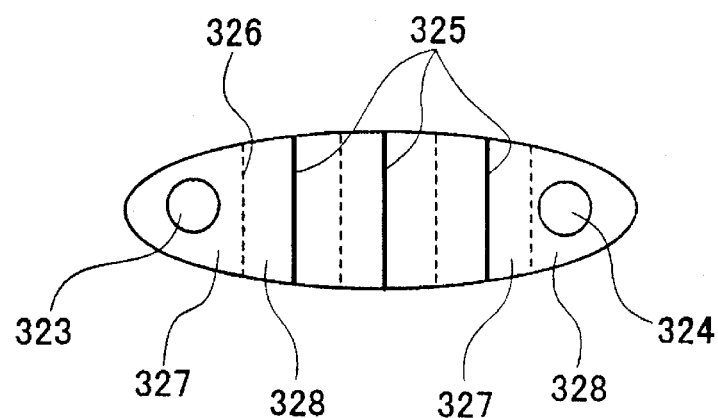
Fig. 4 0 (b)
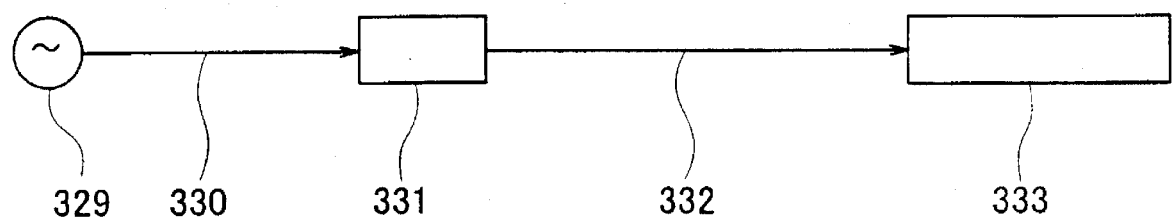
Fig. 4 0 (c)

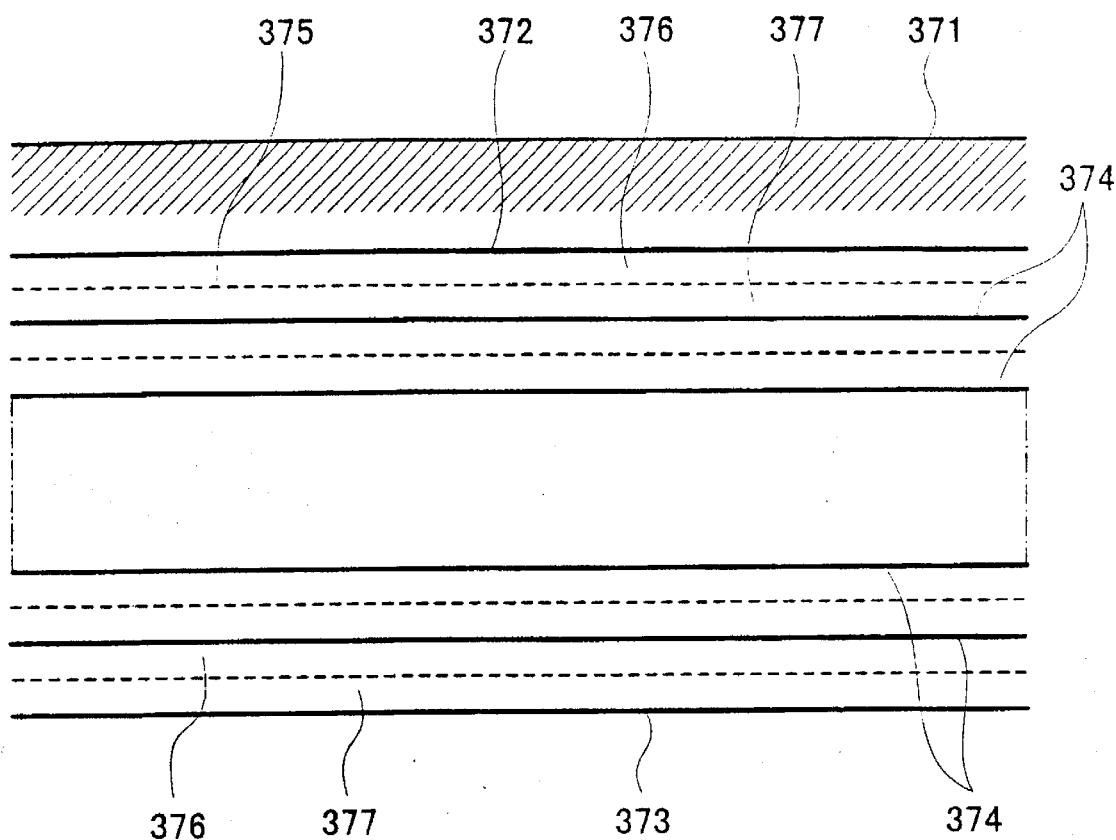
Fig. 4 4 (a)
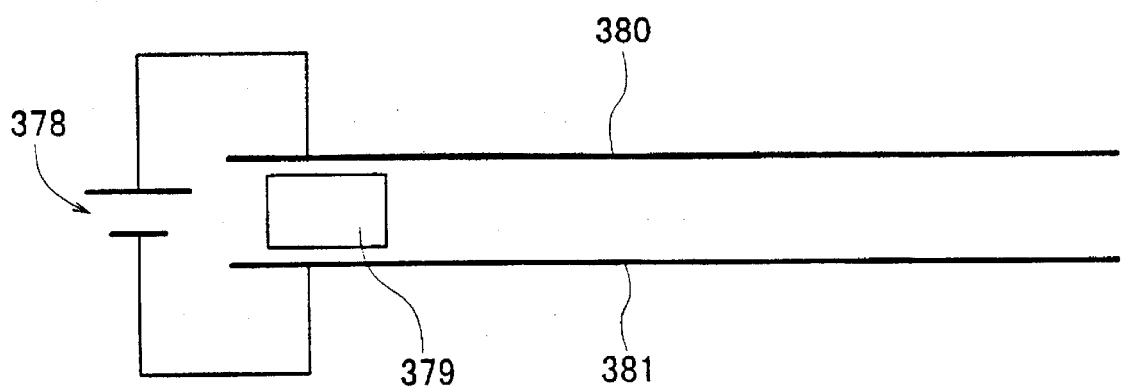
Fig. 4 4 (b)

BATTERY AND EQUIPMENT OR DEVICE HAVING THE BATTERY AS PART OF STRUCTURE AND LOCALLY DISTRIBUTED POWER GENERATION METHOD AND POWER GENERATION DEVICE THEREFOR

BACKGROUND OF THE INVENTION

1. Technical Field

The present invention relates to a battery and equipment or device having the battery as part of its structure, and a locally-distributed power generation method and a power generation device therefor. More particularly, the present invention relates to a battery of a three-dimensional structure comprising powdered active materials and capable of storing a large power, and equipment or device having the battery as part of its structure, an alkali primary battery and an alkali secondary battery of long lives in which discharge voltages are less likely to be reduced, and a locally-distributed power generation method which utilizes a power of transfer and transport means such as a power-driven two-wheeled vehicle, a power-driven three-wheeled vehicle, a power-driven four-wheeled vehicle, ship, or the like and a power generation device therefor.

2. Description of the Related Art

The present invention relates to a battery. In view of the prior arts, objectives to be achieved by the present invention are broadly classified into five objectives as follows.

The first objective is to provide a battery which obviates drawbacks of the conventional battery having a structure in which a plate-shaped, solid-cylindrical, or hollow-cylindrical active material that has a certain volume is immersed in an electrolytic solution. The second objective is to provide a three-dimensional battery of a large power capacity which has been unfulfilled in the conventional battery. The third objective is to provide practical use of the battery of the three-dimensional structure as means for achieving the first or second objective. The fourth objective is to provide an alkali primary battery or an alkali secondary battery of long lives in which discharge voltages are less likely to be reduced. The fifth objective is to provide a locally-distributed power generation method utilizing the battery of the three-dimensional structure and a power generation device therefor. Hereinbelow, the first to fifth objectives will be described according to comparison with the prior arts.

1. Prior Art and First Objective

Conventionally, the battery is structured such that the plate-shaped, the solid-cylindrical, or the hollow-cylindrical active material is immersed in the electrolytic solution. The battery has a layered structure with an electrolytic plate sandwiched between a cathode and an anode.

For example, Japanese Laid-Open Patent Publication No. Hei. 7-169513 discloses a method and device that thermally or chemically recovers a battery material after discharge to continuously generate a power by utilizing a combustion heat of a fossil fuel.

However, the conventional battery has the following problems.

(1) Scale up is Impossible.

A current flowing in a battery is directly proportional to an area of a membrane. For example, in case of the battery having a membrane area of 1 m$^2$ and a power of 1W, an area of one billion m$^2$ is required to obtain one million kW. This corresponds to a square of approximately 32 kilometer square, and cannot be formed into a flange. Even if the number of membranes is increased as a solution to this, the scale up is unfulfilled.

(2) Degradation of Active Materials or a Catalyst Cannot be Dealt with.

In the conventional battery, since the active materials and the catalyst are used as components of the battery, the entire battery must be replaced when degraded. In actuality, the replacement is impossible and the degraded battery is discarded.

(3) A Heat Transmitter for Heat Generation and Heat Absorption in Association with Charge and Discharge Cannot be Provided.

In view of a battery characteristic in which exothermic reaction or endothermic reaction is conducted in association with charge and discharge of the battery, a power conversion efficiency is reduced with an increase in temperature and a reaction speed decreases with a decrease in temperature, it is necessary to provide a heat transmitter in the battery for adjustment so as to obtain appropriate temperature. However, since the conventional battery is complex in structure, the heat transmitter is not provided. Besides, since the battery is small and a battery surface area with respect to its output is small, it is naturally cooled or heat-absorbed. In some cases, the upper limit temperature is set by using a temperature fuse but any temperature control device is not provided for the battery.

(4) An Energy Density is low.

In the conventional battery, the current is directly proportional to the area of the membrane. For example, in case of the battery having a membrane area of 1 m$^2$ and a power of 1W, one million membrane batteries each having a membrane area of 1 m$^2$ and a width of 0.1 m are required and therefore have a volume of 100000 m$^3$ to create a battery of 1000 kW. Consequently, the energy density cannot be increased.

The first invention has been developed in view of the above-described problems, and the first objective to be achieved by the first invention is to provide a battery comprising powdered active materials in vessels, in which scale up can be achieved, degraded active materials and catalyst can be recovered and replaced, the heat transmitter can be provided in the battery, and the energy density can be increased.

2. Prior Art and Second Objective

Conventionally, the battery is structured such that the active materials are formed to have a predetermined shape such as a solid cylinder or a hollow cylinder and immersed in the electrolytic solution, and the electrolyte plate is sandwiched between a cathode and an anode to have a layered structure.

Specifically, as shown in FIG. 49, a nickel hydrogen battery is layered by adhering a current collector 431, a cathode 432, a separator 433, an anode 434, and a current collector 435 in this order. This example is disclosed in Japanese Laid-Open Patent Publication No. Hei. 9-298067. The battery disclosed in this publication is structured such that a plurality of element batteries (unit batteries) each comprising a cathode mainly composed of nickel hydroxide, an anode mainly composed of hydrogen-occluding alloy, a separator formed of a polymer non-woven fabric cloth, and an electrolytic solution composed of an alkali aqueous solution, are connected in series and stored in a metallic square vessel and an opening thereof is sealed by a sealing plate having a reversible vent.

The conventional battery 430 has a membrane structure (two dimensional), including the above-described structure. To obtain the battery 430 of a large capacity, it is extended to make it thinner as shown in FIG. 40 or wound, or the unit batteries 430 are connected in parallel as shown in FIG. 41. Or otherwise, as shown in FIG. 52, a plurality of electrode plates 436 are interposed in a number of unit batteries 430 and wirings 437 connected to the respective electrode plates 436 are pulled out of the batteries to allow these electrodes to be connected to electrode plates 438 of another unit batteries that have different polarity, thereby obtaining a layered structure.

However, the conventional batteries of FIGS. 49–52, the following problems arise.

(1) Scale up is Limited.

The conventional battery has a membrane structure (two-dimensional), and the current flowing in the battery is directly proportional to the area of the membrane. Therefore, for example, if 1W power is generated in 1 m² area, then (100×100)m² area is required to generate 10 kW power. Accordingly, the number of membranes may be increased or the membrane may be enlarged and wound. In either case, the battery becomes extremely large and is difficult to practice. Consequently, the batteries must be connected in parallel, and thereby, the whole structure becomes complex.

(2) A Production Cost of a Battery is Extremely High Due to a Large Capacity.

In case of the battery of the membrane structure, if an attempt is made to obtain the large capacity, the area of the membrane must be correspondingly increased, and the production cost becomes higher with an increase in the battery capacity. For this reason, the scale up results in no advantage in production cost.

(3) Degradation of the Battery Cannot be Dealt with.

Since the active materials have a fixed shape such as the plate or cylinder as components of the battery, the whole battery must be replaced when these materials are degraded, because it is impossible to replace only the active materials.

(4) When the batteries are connected in series, a device cost is high and a resistance energy loss in a connected portion is large. For example, when a plurality of batteries of 1.6V–2.0V per battery are connected to obtain a voltage as high as 100V, they must be connected by means of wirings. The working cost therefore becomes high and the loss of heat generated due to the current passing through the connected portion causes an energy loss.

The second invention has been developed in view of the above-described problems. The second objective to be achieved by the second invention is to provide a layered-type three-dimensional battery that is three-dimensionally structured to allow a capacity of the battery to be increased by increasing a volume (cell) of the battery and gives a number of advantages associated with scale up.

3. Prior Art and Third Objective

In general, in various equipment or devices, spaces therein are not efficiently utilized, as described in embodiments below.

Accordingly, the third objective to be achieved by the third invention is to provide practical and effective use of the three-dimensional battery in which the battery of the three-dimensional structure according to the first or second invention constitutes part of the various equipment or devices.

4. Prior Art and Fourth Objective

The practical battery can be broadly classified into a primary battery incapable of repeating charge/discharge, a secondary battery capable of repeating charge/discharge, a special battery comprising a physical battery (for example, solar battery) and a biological battery (for example, enzyme battery), and a fuel battery.

The fourth objective is to obviate drawbacks of the alkali primary battery and the alkali secondary battery among these practical batteries.

The battery is composed of an anode, a cathode, and an electrolyte as three main components. During discharge, the anode discharges an electron to an external circuit by an electrochemical reaction and the anode itself is oxidized, while the cathode receives the electron from the external circuit by the electrochemical reaction and the cathode itself is reduced, and the electrolyte serves as an ion transmission medium between the anode and the cathode in the electrochemical reaction because it is ion-transmissible. Thus, the oxidation occurs in the anode and the reduction occurs in the cathode during discharge, and reduced materials (non-oxidized materials) such as hydrogen-occluding alloy, cadmium, iron, zinc, lead, and the like are used as anode materials and oxidized materials are used as cathode materials.

For example, an alkali manganese battery as a type of the alkali primary battery generally uses manganese dioxides and carbon as cathode active materials, zinc as an anode active material, and a potassium hydroxide solution or a sodium hydroxide solution as an electrolytic solution. In this alkali manganese battery, the reaction progresses as follows:

$$Zn + 4OH^- \rightarrow Zn(OH)_4^{2-} + 2e^- \quad \text{(Anode)}$$

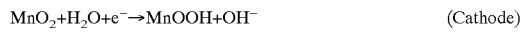
$$MnO_2 + H_2O + e^- \rightarrow MnOOH + OH^- \quad \text{(Cathode)}$$

A nickel-cadmium accumulator battery as a typical alkali secondary battery generally uses nickel hydroxide and carbon as the cathode active material, cadmium as the anode active material, and a potassium hydroxide solution as the electrolytic solution. In the nickel-cadmium accumulator battery, the reaction progresses as follows:

$$Cd + 2OH^- \leftrightarrows Cd(OH)_2 + 2e^- \quad \text{[Anode]}$$

$$NiOOH + H_2O + e^- \leftrightarrows Ni(OH)_2 + OH^- \quad \text{[Cathode]}$$

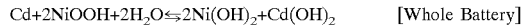
$$Cd + 2NiOOH + 2H_2O \leftrightarrows 2Ni(OH)_2 + Cd(OH)_2 \quad \text{[Whole Battery]}$$

In the above reaction formula, an arrow pointing right indicates a discharge reaction and an arrow pointing left indicates a charge reaction. As can be seen from the formula, the discharge reaction in the anode produces hydroxide such as zinc hydroxide or cadmium hydroxide. It is important that the electrodes have a certain mechanical strength or are corrosion-resistant in a potential region and it is particularly important that the electrodes have superior conductivity.

Since metal oxide or metal hydroxide have generally high specific resistance and low conductivity, a mixture of conductive materials such as carbon, zinc, and cobalt as conduction promoter is conventionally used as cathode materials comprising metal oxides. However, since a metal is used to promote the oxidation as the anode active material, the discharge causes the metal to be chemically changed into a metal oxide or a metal hydroxide, thereby resulting in reduced conductivity. Accordingly, to increase the conductivity, there has been proposed use of a pellet material in which a conductivity material such as powdered carbon, powdered nickel, or powdered cobalt is mixed into the metal such as zinc as the anode active material, or use of an anode current collector comprising a metal such as zinc to which the conductivity material is pressed to be strongly stuck.

However, the above-described pressure-application process or granulating process for obtaining the pellet material is complex and increases the production cost.

The fourth invention has been developed in view of the above problems and the fourth objective to be achieved by the fourth invention is to provide an alkali primary battery and an alkali secondary battery that show a preferable discharging characteristic during discharge (in which a discharge voltage is less likely to be reduced), have long lives, and low production cost.

5. Prior Art and Fifth Objective

The conventional locally-distributed power generation equipment is a fixed-type cogeneration equipment for generating warm air, cool air, warm water, and steam by using heat energy generated secondarily by power generation and supplying a steam energy and a heat energy. Also, in the locally-distributed cogeneration equipment, solar power generation, wind power generation, or the like is utilized.

As the prior art, it is known that a solar battery installed in a house is utilized to charge a battery of an electric automobile.

Japanese Laid-Open Patent Publication No. Hei. 6-225406 discloses a technique for charging a battery of an electric automobile by using a commercial power supply and a fuel battery power generation equipment systematically operated with the power supply.

To generalize the locally-distributed cogeneration equipment, it is necessary to install power generation equipment in houses or offices. However, the power generation equipment is expensive and requires a long time period to obtain an economic effect due to difference between a purchasing price of the power generation equipment and a price of power when purchased as the home power generation equipment. Thus, since the power generation equipment for houses and offices has a high equipment cost and is unpayable unless it is used for a long time period, it is difficult to generalize the locally-distributed cogeneration equipment. To facilitate the generalization of the solar power generation, the state tried to pay half of the equipment cost, which was economically unsuccessful, and a great deal of budget was surplus.

The fifth invention has been developed in view of the above-described problems, and the fifth objective to be achieved by the fifth invention is to provide a locally-distributed power generation method capable of utilizing a power generation system installed in automobile or the like originally used as transfer and transport means for houses and offices instead of installing only the fixed-type power generation equipment for houses or offices, to allow transport equipment and private power generation equipment to be utilized as common equipment, thereby significantly reducing the equipment cost, and capable of performing the cogeneration without the power generation equipment in houses or offices.

A technique of utilizing the fixed-type power generation equipment such as the solar power generation for charging the transfer and transport means such as automobiles is known but a technique of utilizing a power generated by the transfer and transport means such as automobile for the fixed-type power generation equipment for houses or the like is not known.

BRIEF SUMMARY OF THE INVENTION

1. First Invention

To achieve the first objective, there is provided a battery of the first invention comprising two vessels connected with a member interposed therebetween that permits passage of an ion but does not permit passage of an electron, a powdered active material filled in one of the vessels and suspended in an electrolytic solution in the one vessel to discharge the electron, and a powdered active material filled in the other vessel and suspended in an electrolytic solution in the other vessel to absorb the electron, wherein conductive current collectors in contact with the powdered active materials are provided in the two vessels (see FIG. 1).

It is preferable that in the battery of the first invention, at least one of fluid fluidizing and dispersing means and agitating means using a liquid or a gas for fluidizing the powdered active materials in the electrolytic solutions in the two vessels would be connected to the two vessels or provided in the two vessels to provide efficient contact between the powdered active materials and between the powdered active materials and the current collectors (see FIGS. 2 to 12), as mentioned later.

In the battery of the first invention, current collectors in contact with the powdered active materials may have a shape of one of a bar, a plate and a tube (see FIGS. 1 to 4).

In the battery of the first invention, the current collectors in contact with the powdered active materials may serve as at least one of the fluid fluidizing and dispersing means and the agitating means using the liquid or the gas for fluidizing the powdered active materials in the vessels (see FIGS. 5, 6).

It is preferable that in the battery of the first invention, heat transmitters would be provided in the two vessels to keep reaction temperature in the battery constant as mentioned later. The heat transmitters may be one of tubular current collectors and plate-shaped current collectors in contact with the powdered active materials (see FIGS. 8, 9).

It is preferable that in the battery of the first invention, means for discharging degraded powdered active materials out of the two vessels and means for supplying the powdered active materials into the vessels would be connected to the two vessels (see FIGS. 10, 11) as mentioned later.

In this case, at least one of means for recovering discharged powdered active materials and means for making up the powdered active materials may be connected to the discharging means, to supply the recovered or made-up powdered active materials into the vessels from the supplying means (see FIG. 10).

Also, reaction means for charging the discharged powdered active materials by thermal reaction or chemical reaction may be connected to the discharging means, to supply the charged powdered active materials into the vessels from the supplying means (see FIG. 11)

In the battery of the first invention, the powdered active material on an anode side may be powdered hydrogen-occluding alloy and the powdered active material on a cathode side may be powdered nickel hydroxide (see FIG. 7).

Also, in the battery of the first invention, the powdered active material on the anode side may be powdered hydrogen-occluding alloy, the gas introduced into the fluid fluidizing and dispersing means on the anode side may be hydrogen, the powdered active material on a cathode side may be powdered nickel hydroxide, and the gas introduced into the fluid fluidizing and dispersing means on the cathode side may be oxygen or air (see FIG. 12). The battery of the first invention has a charging/discharging characteristic better than that of the conventional battery without fluidizing the powdered active materials or without equipment for fluidizing the powdered active materials. The specific effects will be described in detail in embodiments of the invention mentioned later. The improvements thereof are as follows:

(1) Scale up is Achieved.

The current flowing through the battery is directly proportional to the surface area of a reacting material. Accordingly, by using the powdered active materials, the battery comprising the powdered materials in the vessels can be created. The battery is three-dimensionally structured by using the powdered active materials. For example, in case of the battery having a volume of 1 liter and a power of 1W, if it is scaled up to 1 m$^3$, 10 m$^3$, and 100 m$^3$, the corresponding powers are respectively 1 kW, 1000 kW, and 1 million kW.

In addition, when the powdered active materials are used to create the battery, scale up becomes advantageous. For example, if the conventional battery of 1 kW costs 100 thousand yen (831.19 dollars), then, one million batteries are required to obtain 1 million kW and costs 100 billion yen (831,186,100.00 dollars). On the other hand, in the battery of the present invention the scale up results in advantages, i.e., a reduced production cots of about 100 million yen (831,186.10 dollars).

(2) The Degraded Active Material and Catalyst can be Recovered and Replaced.

When the powdered active materials and catalyst are degraded, they are discharged, and recovered or replaced by new active materials and catalyst, or otherwise, they are re-charged by thermal reaction or chemical reaction, to be re-supplied. For example, the powder ed active material and catalyst are discharged as a slurry together with the electrolytic solution through a pipe from the vessel. Then, the powdered active material is separated from the electrolytic solution and re-mixed with the electrolytic solution after recovery or addition of new materials, to be created into the slurry, which is supplied to the battery by a slurry pump.

For example, the conventional small-sized battery is capable of charging and discharging about 500 times, and the conventional large-sized battery is activated for about 8000 consecutive hours. On the other hand, since in the battery of the present invention, the active material and the catalyst are kept in best conditions by circulation and recovery or make up of the active material and catalyst, the life of the battery, and hence, the life of the battery equipment can be prolonged 50 to 100 times.

(3) Heat Transmitters can be Provided in the Battery.

The battery has a simple structure in which the powdered active material and catalyst are suspended in the electrolytic solution. By utilized battery characteristic in which a heat transmitter is easy to provide therein, heat transmitted through the heat transmitter provided in the battery can keep reaction temperature in the battery constant, and power conversion efficiency is reduced with an increase in temperature, whereas reaction speed is reduced with a decrease in temperature, the temperature in the battery can be appropriately adjusted. Besides, since high-temperature substances and low-temperature substances collected through the heat transmitter can be utilized for air-conditioning or power generation, energy generation efficiency and energy usage efficiency can be increased.

(4) Energy Density can be Increased.

The current flowing through the battery is directly proportional to the surface area of the reaction material. Accordingly, the powdered active materials are used to create the battery. The creation of the battery using the powdered active materials increases the surface area. For example, the powdered material of 1 m$^3$ has a surface area of 300000 m$^2$ and has an increased energy density. Also, if the conventional battery has a membrane area of 1 m$^2$ and a power of 1W, then 3 million membrane batteries each having an area of 1 m$^2$ and a width of 0.1 m are required to create a battery of 3000 kW and has a volume of 300000 m$^3$. If the battery of the present invention uses a powdered material having a particle diameter of 1 μm to obtain the same power, then it has a volume of about 10 m$^3$ and has an energy density made 30000 times higher. Thus, the energy density can be significantly increased.

2. Second Invention

To achieve the second objective, there is provided a three-dimensional battery of a layered type of the second invention, comprising plural pairs of unit batteries each comprising a pair of cells (vessels) connected with a member interposed therebetween that permits passage of an ion but does not permit passage of an electron, a powdered active material put in and suspended in an electrolytic solution filled in one of the cells (vessels) to discharge an electron, and a powdered active material put y and suspended in an electrolytic solution filled in the other cell (vessel) to absorb the electron, the plural pairs of batteries being integrally connected in series with conductive current collecting members placed so as to define separating walls of the respective cells and be in contact with the powdered active materials, wherein the cells on opposite sides are provided with current collectors that are in contact with the powdered active materials and respectively function as a cathode and an anode.

In the three-dimensional battery of the second invention having the above-described structure, the capacity (power) of the battery can be increased by increasing capacities of the respective cells of the pair of cells. Assuming that a capacity of 1 liter generates a power of 1W then power of 1 kW can be obtained by increasing the capacity to 1 m$^3$ and a power of 10 kW can be obtained by increasing the capacity to 10 m$^3$. The scale up results in advantages in the production cost. Specifically, if the conventional battery of 10W costs 10 thousand yen (83.12 dollars), then the battery of 10 kW costs 10 million yen (83.118.61 dollars). On the other hand, since the production cost of the battery of the present invention is reduced with the scale up, the battery cost of the present invention of about 1 million yen (8,311.86 dollars) equals about ¹⁄₁₀ of the conventional battery.

On the other hand, the voltage is determined depending on the type of powdered active materials (corresponding to the conventional general electrodes) filled in the pair of cells. For example, when powdered metallic lead and powdered lead oxide are used, approximately 2.4V voltage is generated. So, it is necessary to connect 5 to 6 unit batteries in series to obtain 12V or more. However, according to the second invention, unit batteries situated at intermediate position (except opposite end positions) can use current collecting members made of the same material on the anode side and on the cathode side. Since the cathode and anode electrodes need not be provided differently from the conventional battery, separating walls defining a pair of cells (unit battery) are constituted by conductive current collecting members to enable structural and electrical series connection. The separating wall is configured to have a considerably small thickness (e.g., 0.5 mm) and a large area (e.g., 127 mm×127 mm). In addition, the current flows in the thickness direction of the separating wall. Therefore, a large current flows with little resistance and a power loss is very little. Further, since the two pairs of unit batteries can be directly connected by means of the separating walls, plural pairs of unit batteries can be connected in series and in layers. Thereby, the whole battery is configured to have a minimum capacity and made small.

Furthermore, in the three-dimensional battery of the second invention, the powdered active materials function as a membrane (battery body) of the conventional battery of a membrane structure and the current flowing through the battery is directly proportional to the surface area of the active materials. Since the powdered active materials are suspended in the electrolytic solution and occupy most of the volume of the battery casing, the energy density can be greatly increased. Also, since the powdered active materials are put into the electrolytic solution (dilute sulfuric acid for lead storage battery), and are mixed and suspended therein, the powdered active materials are separated from the electrolytic solutions or replaced together with the electrolytic solutions for recovery when degraded. The life of the battery can be significantly (approximately 50 to 100 times) prolonged.

It is preferable in the three-dimensional battery of the second invention, that agitating means would be provided in each of the cells to fluidize the powdered active material suspended in the electrolytic solution when a large power is required. The agitating means includes means for mechanically agitating the powdered active materials using a rotational shaft with agitating vanes that is rotatably provided in the cells by a drive unit such as a motor or means for dispersing and fluidizing the powdered materials in the electrolytic solution by supplying or circulating a liquid or a gas into the electrolytic solution by means of a pump or a blower. In the three-dimensional battery, the agitating means agitates the powdered material in the electrolytic solution to be dispersed therein, thereby improving efficiency of contact between the active materials, reducing contact resistance because of preferable contact between the powdered materials and the current collecting members or the current collectors, increasing conductivity, and increasing ion dispersion speed in the electrolytic solution. Consequently, a large current flows and a large power can be obtained. In addition, a width of each cell (spacing in a series direction) can be increased and the capacity of the battery can be increased.

In the three-dimensional battery of the second invention, conductive studs may be provided integrally with and protrusively from the current collecting members or the current collectors toward inside of the respective cells. In this three-dimensional battery, since contact areas between the current collecting members or the current collectors and the powdered materials are greatly increased, and the contact resistance is reduced, the width of each cell (spacing in the series direction) can be enlarged, and the capacity of the battery can be greatly increased.

It is preferable that in the three-dimensional battery of the second invention, a function for stopping fluidization of the powdered active material to reduce amount of a power supplied from the battery would be added to the agitating means. By addition of the function to stop fluidization of the powdered materials to the agitating means like this three-dimensional battery, the fluidization of the powdered materials can be arbitrarily stopped, and, consequently, the amount of a power from the battery can be reduced.

It is preferable that in the three-dimensional battery, the powdered active material that discharges the electron would be hydrogen-occluding alloy, cadmium, iron, zinc or lead, because these materials are inexpensive and practicable. Further, it is preferable that in the three-dimensional battery of the second invention, the active material that absorbs the electron would be nickel oxyhydroxide, lead dioxide, or manganese dioxide, because these materials are inexpensive and practical.

3. Third Invention

To achieve the third objective, there is provided equipment or device of the third invention, having a battery of a three-dimensional structure as part of its structure, the battery comprising two vessels connected with a member interposed therebetween that permits passage of an ion but does not permit passage of an electron, a powdered active material filled in one of the vessels and suspended in an electrolytic solution in the one vessel to discharge the electron, and a powdered active material filled in the other vessel and suspended in an electrolytic solution in the other vessel to absorb the electron, wherein conductive current collectors in contact with the powdered active materials are provided in the two vessels, the equipment or device having a function of chargeable/dischargeable power storage equipment.

The equipment or device to which the third invention is applicable may include rotary equipment using the power stored in the three-dimensional battery as a power source, a mobile body using the power stored in the three-dimensional battery as the power source, power conveying means for supplying the power stored in the three-dimensional battery to another equipment, and equipment for converting the power stored in the three-dimensional battery into photo energy, kinetic energy, or heat energy. These equipment or device will be described in the embodiment described later.

It is preferable that in the equipment or device of the third invention, at least one of fluid fluidizing and dispersing means and agitating means using a liquid or a gas for fluidizing the powdered active materials suspended in the electrolytic solutions in the two vessels would be connected to the two vessels or provided in the two vessels. With the fluid fluidizing and dispersing means or the agitating means, efficiency of contact between the active materials is improved, contact resistance is reduced because of preferable contact between the powdered active materials and the current collectors, conductivity is improved, and an ion dispersion speed in the electrolytic solution is increased. Consequently, a large current flows and a large power can be stored.

It is preferable that in the third invention the powdered active material that discharges the electron would be hydrogen-occluding alloy, cadmium, iron, zinc or lead, because these materials are inexpensive and practical. Also, it is preferable that in the third invention, the active material that absorbs the electron would be nickel oxyhydroxide, lead dioxide, or manganese dioxide, because these materials are inexpensive and practical. Further, it is preferable that in the third invention, the electrolytic solution would be a potassium hydroxide solution, sodium hydroxide solution, or dilute sulfuric acid, because these solutions are inexpensive and practical.

4. Fourth Invention

To achieve the fourth objective, there are provided an alkali primary battery comprising a cathode current collector, a cathode active material and an electrolytic solution, a separator that permits passage of an ion but does not permit passage of an electron, an anode active material and an electrolytic solution, and an anode current collector which are placed in this order, wherein metal carbide or a mixture of metal carbide and the metal is used as the anode active material, and an alkali secondary battery comprising a cathode current collector, a cathode active material and an electrolytic solution, a separator that permits passage of an ion but does not permit passage of an electron, an anode active material and an electrolytic solution, and an anode current collector which are placed in this order, wherein metal carbide or a mixture of metal carbide and the metal is used as the anode active material.

In the alkali primary battery and the alkali secondary battery of the fourth invention, since carbon is a good conductor of electricity, preferable electricity conductivity can be ensured, and degradation of a discharging characteristic (reduction of a discharge voltage) can be suppressed even if metal of the anode active material is chemically changed into oxide or hydroxide. By a simple method that uses metal carbide or the mixture of the metal carbide and this metal as the anode active material, expensive conduction promoter such as high-purity carbon and a special treatment for adding conductivity to the anode become unnecessary and a production cost can be suppressed.

It is preferable that the cathode active material and the anode active material would be powdered. The reason is that since the battery structure becomes three-dimensional, the scale up results in advantages (scale up reduces a production cost), the degraded active material can be recovered and replaced, and heat transmitters can be provided in the battery, the operation according to the battery characteristic becomes possible and the energy power generation efficiency can be improved. In addition, the surface area is increased and the energy density is increased.

Furthermore, it is preferable that the iron carbide is used as the metal carbide. The metal carbide is an inexpensive material. As disclosed in Japanese Laid-Open Patent Publication No. Hei. 9-48604 filed by the applicant, the iron carbide is produced in such a manner that iron-containing material is partially reduced using a reducing gas, and then the partially reduced material is further reduced and carburized using reducing and carburizing gases. This method is particularly preferable because the iron carbide can be produced promptly and economically.

5. Fifth Invention

To achieve the fifth objective, there is provided a locally-distributed power generation method of the fifth invention that connects a battery mounted in transfer and transport means to an inverter installed in a house or an office to allow a load in the house or the office to use a power generated by an electric generator of the transfer and transport means when the transfer and transport means is not moving, the transfer and transport means including any of a power-driven two-wheeled vehicle, a power-driven three-wheeled vehicle, a power-driven four-wheeled vehicle and ship in which a device that uses an engine such as a gasoline engine, a diesel engine, and a gas turbine to activate the electric generator to generate a power and the battery for storing the generated power are mounted, to travel by the engine and a power of an electric motor driven by the power from the battery, thereby utilizing the transfer and transport means which is not moving as fixed power generation equipment for the house or the office.

In the method of the fifth invention, transfer and transport means in which a device for generating a power using a fuel battery and a battery for storing the power are mounted may be used, instead of the transfer and transport means in which the device that uses the engine to activate the electric generator to generate the power and the battery for storing the power are mounted.

In the method of the fifth invention, at least one of solar power generation equipment and wind power generation equipment may be installed in the house or the office, the battery mounted in the transfer and transport means which is not moving may be connected to a fixed battery for storing a power generated in the equipment to charge the fixed battery, and the power from the fixed battery may be converted into an alternating current and its voltage may be adjusted by a inverter, to be used in the load in the house or the office.

In this case, the power generated in at least one of the solar power generation equipment and the wind power generation equipment may be used to charge the battery of the transfer and transport means which is not moving.

It is preferable that, in the method of the fifth invention, high temperature substances or/and low-temperature substances generated in the transfer and transport means which is not moving may be supplied to the house or the office to perform cogeneration.

In the method of the fifth invention, a silencer may be provided outerly on the transfer and transport means to reduce an emission sound of the engine when the engine is used to activate the electric generator to supply the power to the house or the office while the transfer and transport means including any of the power-driven two-wheeled vehicle, the power-driven three-wheeled vehicle, and the power-driven four-wheeled vehicle is not moving.

It is preferable in the method of the fifth invention, to use a battery of a three-dimensional structure, comprising two vessels connected with a member interposed therebetween that permits passage of an ion but does not permit passage of an electron, a powdered active material filled in one of the vessels and suspended in an electrolytic solution in the one vessel to discharge the electron, and a powdered active material filled in the other vessel and suspended in an electrolytic solution in the other vessel to absorb the electron, wherein conductive current collectors in contact with the powdered active materials are provided in the two vessels. This is because if part or all of the degraded powdered active materials are discarded, the degraded powdered materials are recovered, and new powdered materials as much as the discarded powdered materials are supplied into the vessels, charge can be immediately started.

To achieve the fifth objective, there is provided a locally-distributed power generation device of the fifth invention, comprising: transfer and transport means including any of a power-driven two-wheeled vehicle, a power-driven three-wheeled vehicle, a power-driven four-wheeled vehicle and ship that travels by an engine and by a power of an electric motor driven by a power from a battery, in which a device that uses an engine such as a gasoline engine, diesel engine, and a gas turbine engine to activate an electric generator to generate a power and a battery for storing the generated power are mounted; an inverter installed in a house or an office to supply an AC and voltage-adjusted power to each load of the house or the office; and a connector that connects the battery mounted in the transfer and transport means which is not moving to the inverter installed in the house or the office, wherein the power generated by the electric generator of the transfer and transport means is used in the load of the house or the office.

In the device of the fifth invention, as the transfer and transport means, transfer and transport means in which a device for generating a power using a fuel battery and a battery for storing the generated power are mounted may be used.

In the device of the fifth invention, at least one of solar power generation equipment and wind power generation equipment may be installed in the house or the office, a power generated in the equipment may be stored in a fixed battery and may be supplied to the load via an inverter connected to the fixed battery, a battery mounted in the transfer and transport means which is not moving may be connected to the fixed battery by means of a connector to allow the power generated by the electric generator of the transfer and transport means, to be supplied to the fixed battery.

In this case, the power may be supplied from the fixed battery in which the power generated in at least one of the solar power generation equipment and the wind power generation equipment is stored to the battery of the transfer and transport means which is not moving.

It is preferable that in the device of the fifth invention, a heat source of the transfer and transport means would be adapted to communicate with the house or the office via a duct to allow high-temperature substances or/and low-temperature substances generated in the transfer and transport means which is not moving to be supplied to the house or the office, thereby constructing a cogeneration system.

It is preferable, in the device of the fifth invention, to use a battery of a three-dimensional structure comprising two vessels connected with a member interposed therebetween that permits passage of an ion but does not permit passage of an electron, a powdered active material filled in one of the vessels and suspended in an electrolytic solution in the one vessel to discharge an electron, and a powdered active material filled in the other vessel and suspended in an electrolytic solution in the other vessel to absorb the electron, wherein conductive current collectors in contact with the powdered active materials are provided in the two vessels. This is because if part or all of the degraded powdered active materials are discarded, the degraded powdered material are recovered, and new powdered materials as much as the discarded powdered material are supplied into the vessels, then charge can be immediately started.

The present invention is constituted as described above and the following effects are provided.

1. The First Invention Provides the Following Remarkable Effects (1) Since the battery is structured to have powdered active materials put in the vessels, it has a three-dimensional structure and can be scaled up. By creating the battery using the powdered active materials, the scale up advantageously reduces the production cost.

(2) When the powdered active material and catalyst are degraded, they are discharged and recovered or replaced by new active materials and catalyst. Or otherwise, they are re-charged by thermal reaction or chemical reaction to be re-supplied. Thereby, since the active material and catalyst are always kept in best condition, the life of the battery, and hence the life of the battery equipment can be significantly prolonged.

(3) By utilizing a battery characteristic in which a heat transmitter can be provided, the heat transmitter provided in the battery can keep reaction temperature in the battery constant, and power conversion efficiency is reduced with an increase in temperature, whereas a reaction speed is reduced with a decrease in temperature, the temperature in the battery can be appropriately adjusted. Besides, since the collected high-temperature substances and low-temperature substances can be utilized for air-conditioning or power generation, energy generation efficiency and energy usage efficiency can be increased.

(4) Since the battery is created by using the powdered active materials, the surface area of the reacting material is increased and the energy density is significantly increased.

(5) Since at least one of fluid fluidizing and dispersing means and agitating means using a liquid or a gas for fluidizing the powdered active materials in the electrolytic solutions in the two vessels may be connected to the two vessels or provided in the two vessels to provide efficient contact between the powdered active materials and between the powdered active materials and the current collectors. With this constitution, efficiency of contact between the active materials is improved, contact resistance is reduced because of preferable contact between the powdered active materials and the current collectors, and conductivity between the active materials and the current collectors or between the active materials is increased, and the ion dispersion speed in the electrolytic solution is increased. Consequently, a large current flows and a large power can be obtained as compared to the battery comprising the unfluidized powdered active materials.

2. The Second Invention Provides the Following Remarkable Effects (1) Since the capacity (power) of the battery can be increased by increasing the capacities of the respective cells of a pair of cells, the scale up results in advantages in the production cost. The voltage is determined depending on the type (material) of the powdered active materials filled in the pair of cells. It is necessary to connect a plurality of unit batteries in series when a large voltage is required. Since the current collecting members on the anode side and the cathode side of the unit battery are made of the same material, and anode and cathode electrodes are not formed unlike the conventional battery, separating walls defining the pair of cells (unit battery) may be constituted by the conductive current collecting members. Thereby, the batteries can be connected in series structurally and electrically and the thickness thereof can be made small. As a result, the whole battery can be made compact and small-sized. In addition since the current flows in the thickness direction, a large current flows with little resistance.

The powdered active materials function as a membrane (battery body) of the conventional battery of the membrane structure and the current flowing in the battery is directly proportional to the surface area of the active materials. The powdered materials are suspended in the electrolytic solutions and the total surface area of the total powdered materials is several thousands to several tens thousands times as large as that of the conventional battery of the membrane structure. So, the energy density is made several thousands to several ten thousands higher. Also, th e powdered active materials are mixed in and suspended in the electrolytic solutions (dilute sulfuric acid for lead storage battery). When the powdered active materials are degraded, the powdered active materials together with the electrolytic solutions can be changed and the powdered active materials can be recovered. Consequently, the life of the battery can be significantly prolonged.

(2) By providing agitating means for fluidizing the powdered materials suspended in the electrolytic solutions in the respective cells to agitate the powdered materials in the electrolytic solutions, the powdered materials as electrodes are prevented from falling down due to its weight, and diffused in the electrolytic solutions. As a result, contact efficiency between powdered materials is improved and preferable contact between the powdered materials and the current collecting members or the current collectors is obtained, resulting in reduced contact resistance and an increased power. Further, width of each cell (spacing in the series direction) is increased and the capacity of the battery can be increased.

(3) By providing conductive studs integrally with and protrusively from the current collectors or the current collecting members toward the inside of the cell, the contact areas of the current collecting members and the powdered materials or the contact areas of the current collectors and the powdered materials are significantly increased and contact resistance is reduced. Therefore, the width of each cell (spacing in the series direction) can be increased and the capacity of the battery can be significantly increased.

(4) By addition of the function to stop fluidization of the powdered materials to the agitating means to reduce the amount of power supplied from the battery, the fluidization of the powdered materials can be arbitrarily stopped, resulting in a reduced amount of the power from the battery.

3. The Third Invention Provides the Following Remarkable Effects (1) It is possible to provide practical and effective use of the three-dimensional battery as part of various equipment or devices. Specifically, by adding the function of the chargeable/dischargeable power storage equipment in addition to the original function of the equipment or device, a free space is utilized to store a large power and the power storage efficiency can be greatly increased. Further, the absorbed/released heat associated with the battery reaction can be utilized for air-conditioning, or heating, cooling or the like of the materials.

(2) In the three-dimensional battery comprising two vessels provided with conductive current collectors in contact with the powdered active materials suspended in the electrolytic solutions, at least one of fluid fluidizing and dispersing means and agitating means using a liquid or a gas for fluidizing the powdered active materials in the electrolytic solutions in the two vessels may be connected to the two vessels or provided in the two vessels. Thereby, preferable contact between the powdered active materials and the current collectors is provided and contact resistance is thereby reduced, resulting in improved conductivity and increased ion diffusion speed in the electrolytic solutions. Consequently, a large current flows and a large power can be stored.

(3) Furthermore, the power stored in the three-dimensional battery is conveyed by power conveying means to be utilized as rotation power of rotary equipment, power of a mobile body, or photo energy, kinetic energy or heat energy.

4. The Fourth Invention Provides the Following Remarkable Effects (1) Without adding expensive conduction promoter such as high-purity carbon to the anode active materials and a special treatment for adding conductivity to the anode, it is possible to provide the alkali primary battery and the alkali secondary battery which have discharge voltages less likely to be reduced, have long lives, and are produced at a low cost.

(2) When the cathode active material and the anode active material are powdered, the battery structure becomes three-dimensional, the scale up results in advantages (scale up reduces a production cost), the degraded active material can be recovered and replaced, and heat transmitters can be provided in the battery. Therefore, the operation according to the electric characteristic becomes possible and the energy power generation efficiency can be improved. In addition, the surface area is increased and the energy density is increased.

(3) Iron carbide as metal carbide is inexpensive and is particularly preferable as the anode active material.

5. The Fifth Invention Provides the Following Remarkable Effects (1) By utilizing a power generation system provided in automobile or the like originally used as transfer and transport means for houses or offices, the equipment cost can be significantly reduced and cogeneration can be carried out without the power generation equipment in the houses or the offices.

(2) Since the power generation equipment cost is significantly reduced and the power generation equipment is economical, the locally-distributed cogeneration equipment can be generalized.

(3) Since the locally-distributed cogeneration equipment becomes inexpensive and is generalized, the effective use of the energy is facilitated. As a result, economical effect is obtained and generation of carbon dioxide can be reduced.

(4) In particular, since the battery mounted in the transfer means and transport means and the battery fixed to the houses or the offices are constituted by the battery comprising the powdered active materials on the cathode side and the anode side, part or all of degraded powdered active materials are discarded, the degraded powdered materials are recovered, and new powdered materials equal in amount to the discarded powdered materials are supplied. As a result, charge can be started immediately.

BRIEF DESCRIPTION OF DRAWINGS

FIG. 12 is a schematic cross-sectional view showing a structure of a battery according to an eighth embodiment of the first invention, FIG. 13(a) is a perspective view showing an example of a verification tester of a layered-type three-dimensional battery of the second invention and FIG. 13(b) is a central longitudinal sectional view schematically showing the battery of FIG. 13(a);

FIG. 21 is a longitudinal sectional view of a bridge piller having a chargeable/dischargeable three-dimensional battery in an inner space thereof;

FIG. 25 is a cross-sectional view showing part of a bonnet having a chargeable/dischargeable three-dimensional battery on an inner surface side;

FIG. 38(a) is a cross-sectional view showing an electric locomotive to which a power vehicle is connected and FIG. 38(b) is a schematic view showing an example of power storage equipment from an electric generator to the chargeable/dischargeable three-dimensional battery when applied to the turbo engine;

FIG. 40(a) is a cross-sectional view showing a normal power line, FIG. 40(b) is a cross-sectional view showing a power line in which the chargeable/dischargeable three-dimensional battery is built, and FIG. 40(c) is a schematic flow diagram showing an example in which power is supplied from the power line in which the chargeable/dischargeable three-dimensional battery is built, to a terminal device;

FIG. 43 is a cross-sectional view showing a flashlight in which the chargeable/dischargeable three-dimensional battery is built;

FIG. 44(a) is a longitudinal cross-sectional view showing the chargeable/dischargeable three-dimensional battery formed in the vicinity of the surface ground and FIG. 44(b) is a schematic view showing an example of a structure of a metal bullet shooting device using a rail gun;

FIG. 48 is a schematic explanatory view systematically showing a device that carries out a locally-distributed power generation method according to a first embodiment of the fifth invention;

DETAILED DESCRIPTION OF THE INVENTION

Hereinafter, embodiments of the present invention will be described. The present invention is not limited to the embodiments described below but may be suitably altered and carried out.

1. Embodiments of the First Invention

First Embodiment

Figure 1:
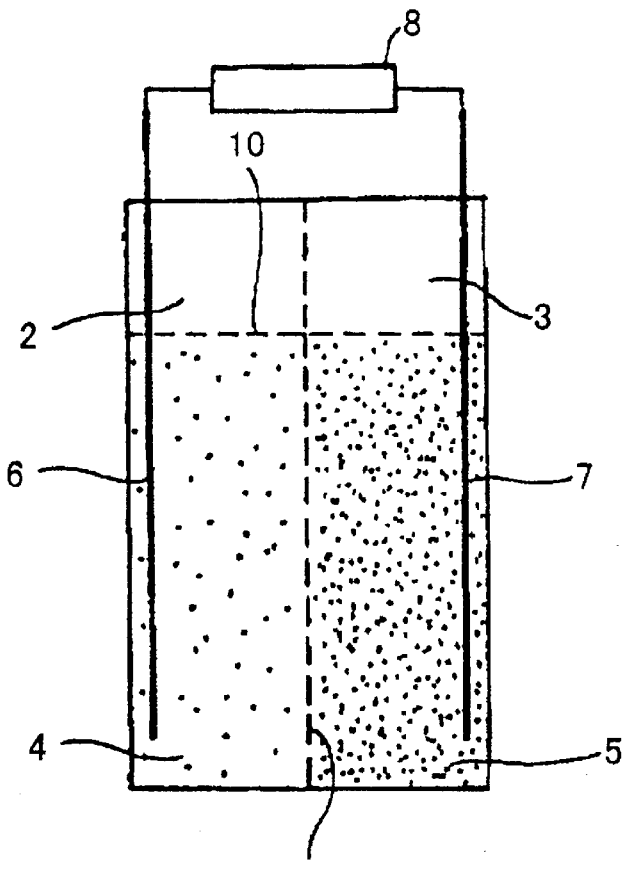
FIG. 1(a) is a schematic cross-sectional view showing a structure of a battery according to a first embodiment of a first invention and FIG. 1(b) is a view showing an example of a discharge curve of the battery of the first invention.
Figure 1:
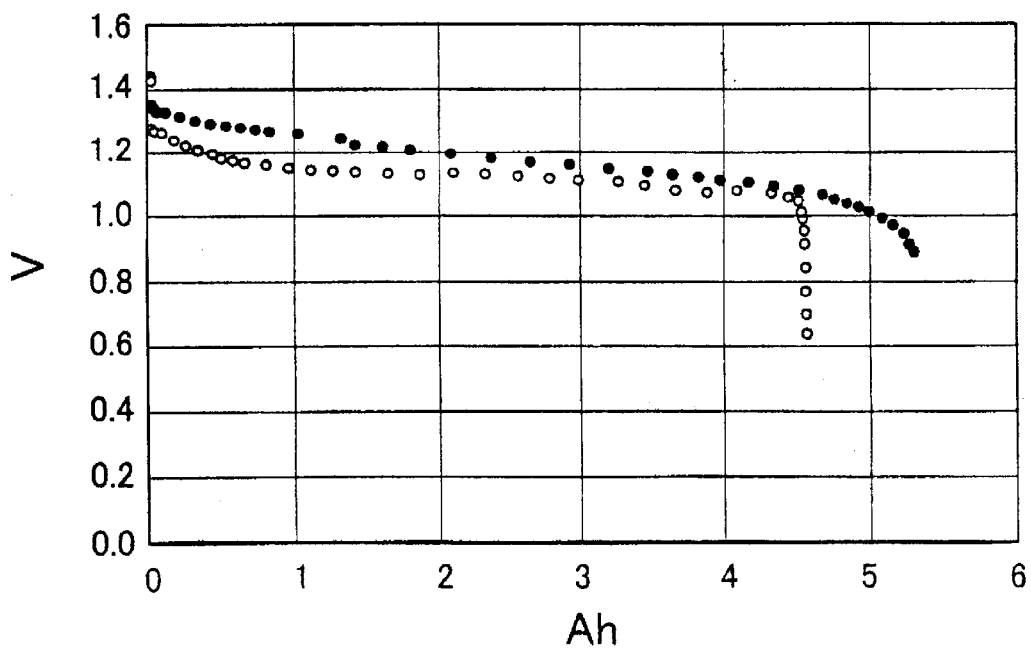

FIG. 1(*a*) shows a battery according to a first embodiment of a first invention. As shown in FIG. 1(*a*), an anode cell 2 and a cathode cell 3 are provided with a separator 1 interposed therebetween. The anode cell 2 is filled with an anode powdered active material and an electrolytic solution 4 and the cathode cell 3 is filled with a cathode powdered active material and an electrolytic solution 5. Examples of a combination of the powdered active materials for the anode and the cathode are hydrogen-occluding alloy and nickel hydroxide, cadmium and nickel hydroxide, or the like. An example of the hydrogen-occluding alloy is $La_{0.3}(Ce, Nd)_{0.15}Zr_{0.05}Ni_{3.8}Co_{0.8}Al_{0.5}$. As the electrolytic solution, for example, a KOH aqueous solution may be used. The separator 1 serves as an ion-passing membrane and does not serve as a powder-passing membrane. As the separator 1, for example, an unglazed pottery, an ion exchange resin membrane, metal fibers, or the like may be used.

An anode current collector 6 comprising a conductor and a cathode current collector 7 comprising a conductor are respectively provided in the anode cell 2 and the cathode cell 3. The current collectors 6, 7 are connected to a load means (for discharge) or a power generation means 8 (for charge). Reference numeral 10 denotes an electrolytic solution interface.

Subsequently, charge and discharge of the battery of this embodiment will be described in detail.

(Charge)

When the battery is connected to the power generation means 8) an electron is discharged from the power generation means 8 and reaches the anode current collector 6. The electron reacts with the anode powdered material immediately on the anode current collector 6 or while traveling through the anode powdered material. An anion produced by the reception of the electron by the anode powdered active material passes through the separator 1 and enters the cathode cell 3, where it reacts with the cathode powdered active material and discharges the electron. The electron moves to the cathode current collector 7 immediately or through the powdered active material and is supplied to the power generation means 8.

(Discharge)

When the battery is connected to the load means 8, the anode current collector 6 discharges the electron to an external circuit. The discharged electron travels through the load means 8 and reaches the cathode current collector 7. The electron reacts with the cathode active powdered material immediately on the cathode current collector 7 or while traveling through the powdered active material. An anion produced by the reception of the electron by the cathode powdered material passes through the separator 1 and enters the anode cell 2, where it reacts with the anode powdered active material and discharges the electron. The electron moves to the anode current collector 6 immediately or through the powdered active material and is supplied to the load means 8.

FIG. 1(*b*) is a view showing comparison in discharge curves between the battery according to the present invention and the conventional battery each having a nominal capacity of 5 Ah. In FIG. 1(*b*), a black circle (●) indicates the discharge curve of the battery of the present invention and a white circle (○) indicates the discharge curve of the conventional battery. The battery of the present invention is a battery of a three-dimensional structure in which the cathode cell is filled with the powdered nickel hydroxide and the electrolytic solution and the anode cell is filled with the powdered hydrogen-occluding alloy and the electrolytic solution (see FIG. 1(*a*)). The conventional battery is a battery of a two-dimensional structure in which a plate electrode comprising nickel hydrogen is used as the cathode, a plate electrode comprising hydrogen-occluding alloy is used as the anode, and these electrodes are immersed in the electrolytic solution. In FIG. 1(*b*), a longitudinal axis indicates a terminal voltage (V) and a lateral axis indicates a discharge capacity (Ah). Since the change in the voltage during discharge is subjected to the influence of concentration polarization due to the change in concentration of the electrolytic solution (in this comparative experiment, potassium hydroxide solution), the concentration of the electrolytic solution of the battery of the present invention and the concentration of the electrolytic solution of the conventional battery are adjusted so as to be equal during discharge. In discharge of the battery, the continuation of discharge to an extent that the voltage is below a fixed voltage is undesirable in view of degradation of the electrode, or the like, and therefore, there exists a discharge termination voltage at which the discharge should be terminated. The lower the discharge termination voltage is, the longer the discharge time is. With this regard, since the battery of the present invention has the three-dimensional structure with the electrode active material powdered, an energy density is greatly improved without fluidizing the powdered material, and the discharge voltage does not rapidly decrease as can be seen from "●" of FIG. 1(*b*), as compared to the conventional battery of the two-dimensional structure using the plate electrodes.

On the other hand, as can be seen from "○", of FIG. 1(*b*), in the conventional battery, the discharge voltage rapidly decreases in approximately 4.5 h. Therefore, assuming that the discharge termination voltage is 1.0V, the discharge must be terminated in approximately 4 h in the conventional battery for protection of battery equipment, whereas the discharge can continue for approximately 5 h in the battery of the present invention.

Second Embodiment

Figure 2:
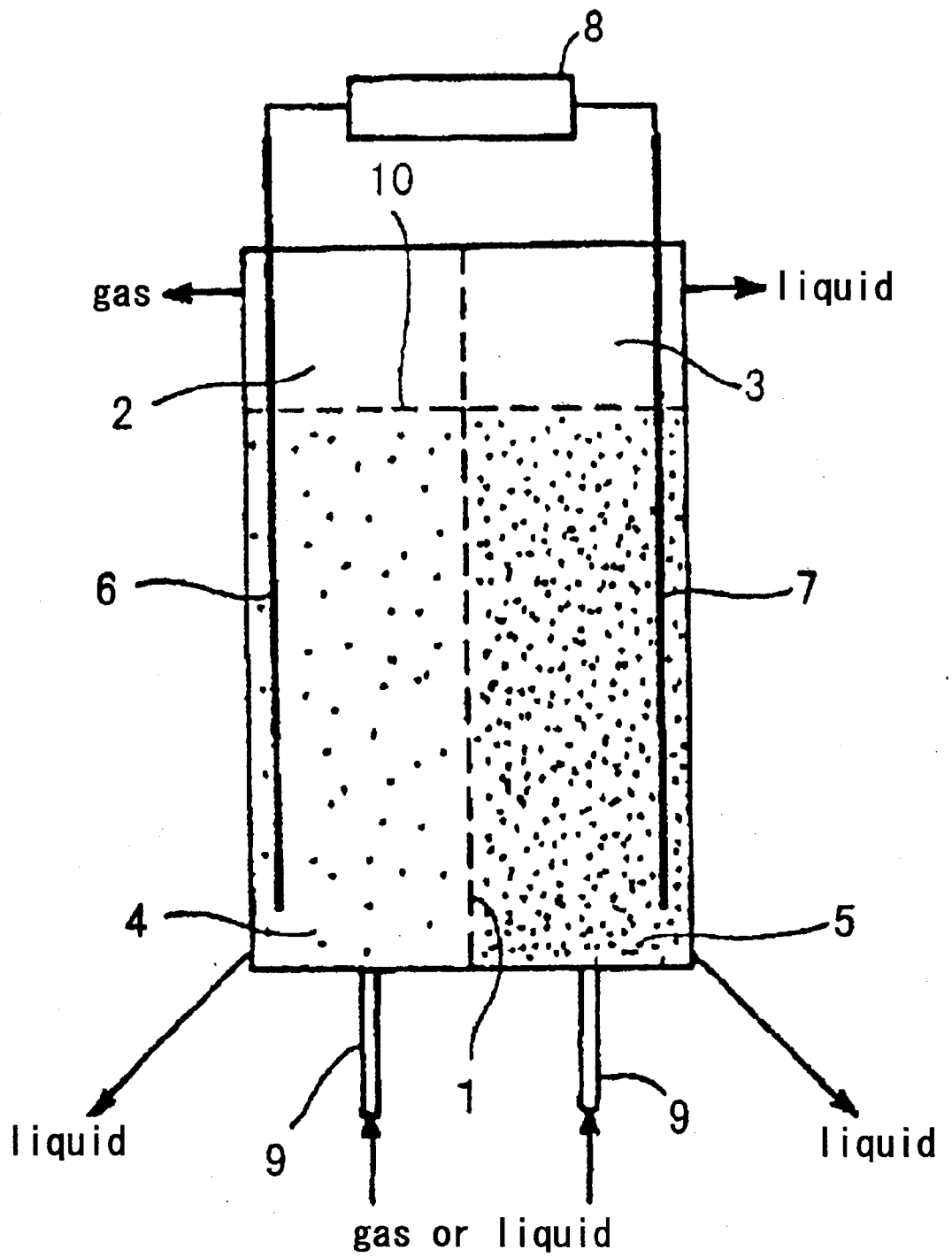
FIG. 2 is a schematic cross-sectional view showing a structure of a battery according to a second embodiment of the first invention.

FIG. 2 shows a battery according to a second embodiment of the first invention. Herein, to increase efficiency of contact between powdered materials or between the powdered materials and the current collectors 6, 7, a fluid fluidizing and dispersing means 9 using a gas or liquid is adapted to fluidize (agitate) the powdered materials in the respective cells 2, 3. Such fluidization increases the efficiency of contact between the powdered materials, reduces contact resistance because of preferable contact between the powdered active materials and the current collectors, increases conductivity between the powdered active materials and the current collectors or between the powdered active materials, and increases a diffusion speed of ions in the electrolytic solution. As a result, a large current flows and a large power can be obtained as compared to a case where the powdered materials are not fluidized.

Instead of or along with the fluid fluidizing and dispersing means 9, agitating means such as vane-like agitators may be provided in the respective cells 2, 3 to fluidize (agitate) the powdered materials. As the fluid fluidizing and dispersing means 9, a device such as a dispersion plate and a spray nozzle for uniformly dispersing the gas or the liquid in a horizontal cross section in the cell can be used, although this is not shown in the FIG. 2 for the sake of simplicity. As the gas (or liquid) introduced into the fluid fluidizing and dispersing means 9, for example, nitrogen, argon (or an electrolytic solution such as potassium hydroxide solution) or the like may be used. When the powdered materials are fluidized by the gas, the gas introduced into the fluid fluidizing and dispersing means 9 is discharged out of upper portions of the respective cells 2, 3. When the powdered materials are fluidized by the liquid, the liquid introduced into the fluid fluidizing and dispersing means 9 is discharged out of bottom portions of the cells 2, 3.

Except the addition of the fluidizing means, the other constitution and function are similar to those of the first embodiment.

Third Embodiment

Figure 3:
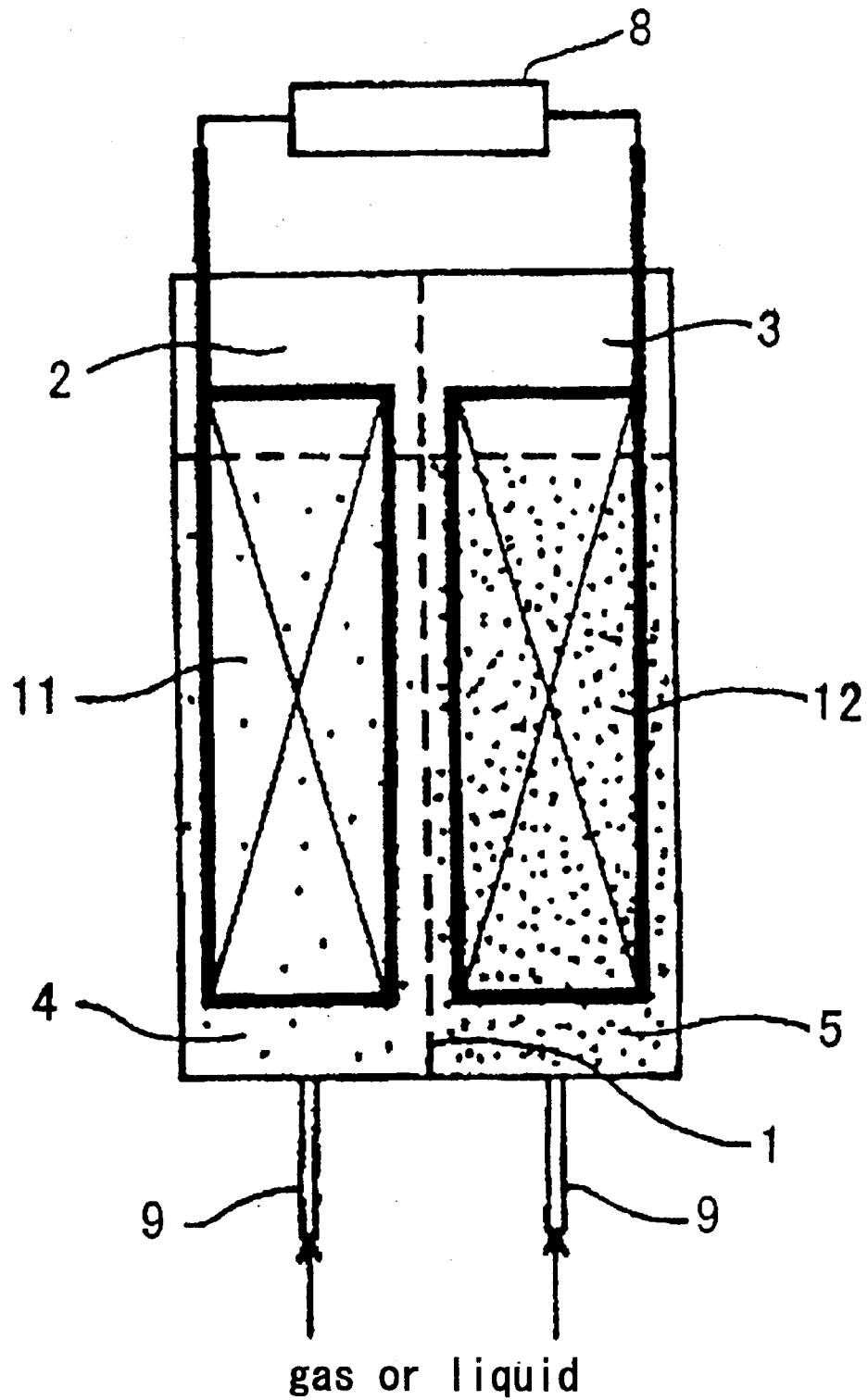
FIG. 3 is a schematic cross-sectional view showing an example of a structure of a battery according to a third embodiment of the first invention.
Figure 4:
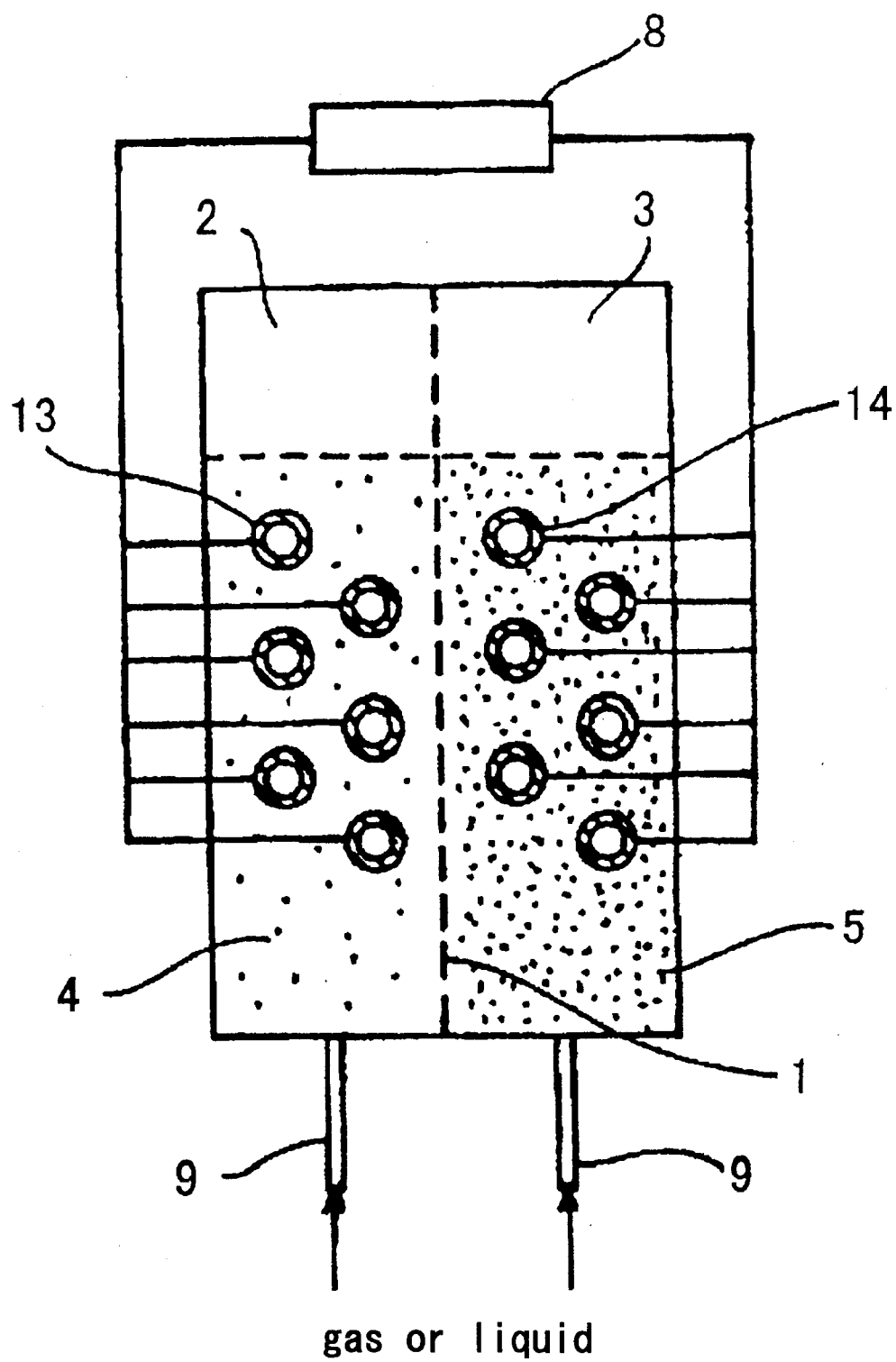
FIG. 4 is a schematic cross-sectional view showing another example of the battery according to the third embodiment of the first invention.

FIGS. 3, 4 show batteries according to a third embodiment of the first invention. Referring to FIG. 3, to increase the efficiency of contact between the current collectors and the powdered active materials, a plate-shaped anode current collector 11 and a plate-shaped cathode current collector 12 are respectively used as the anode current collector and the cathode current collector for larger contact areas. Referring to FIG. 4, to increase the efficiency of contact between the current collectors and the powdered active materials, a tubular anode current collector 13 and a tubular cathode current collector 14 are respectively used as the anode current collector and the cathode current collector for larger contact areas. The shapes other than plate and tube can be adopted so long as they can increase surface areas of the current collectors.

The other constitution and function are identical to those of the second embodiment.

Fourth Embodiment

Figure 5:
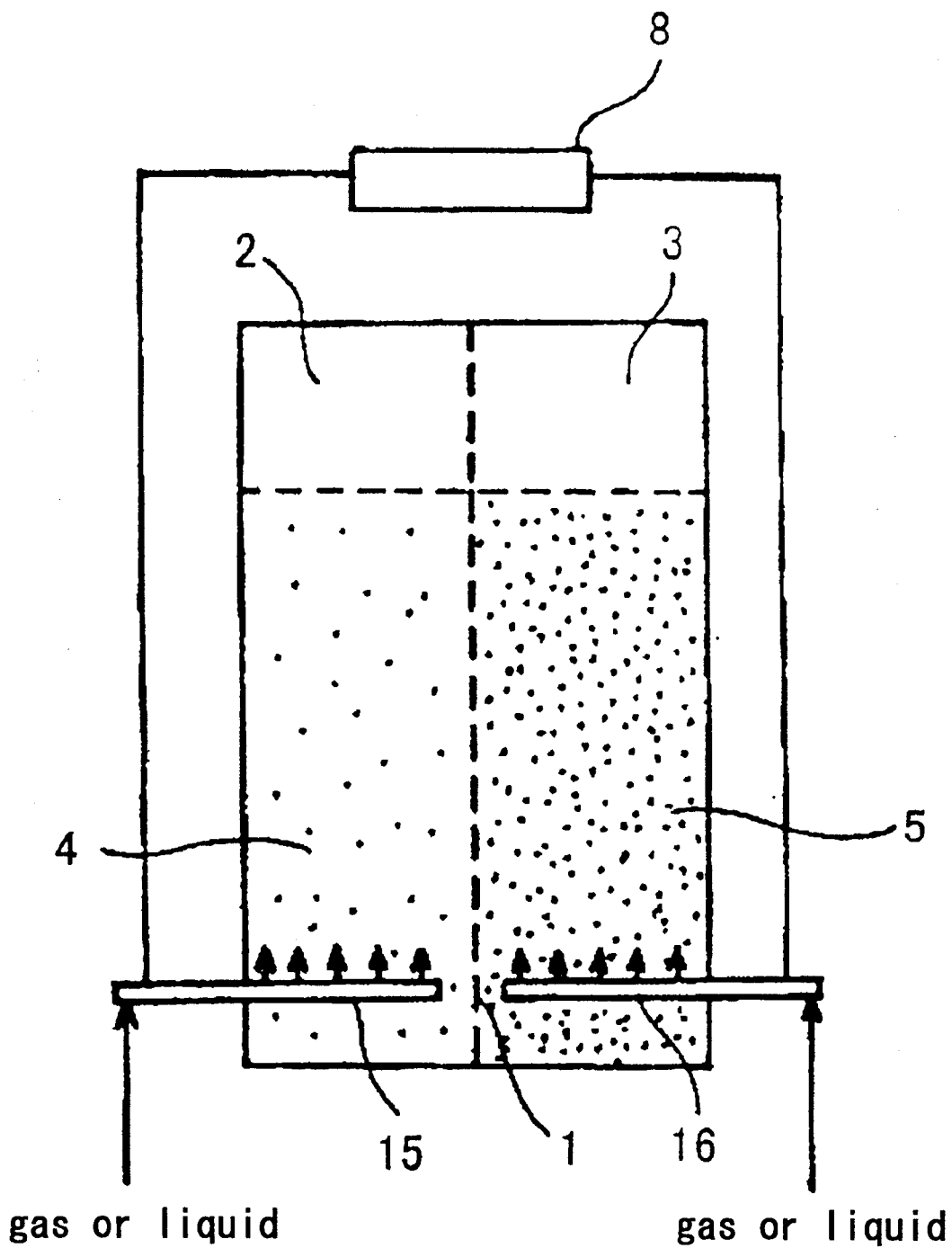
FIG. 5 is a schematic cross-sectional view showing an example of a structure of a battery according to a fourth embodiment of the first invention.
Figure 6:
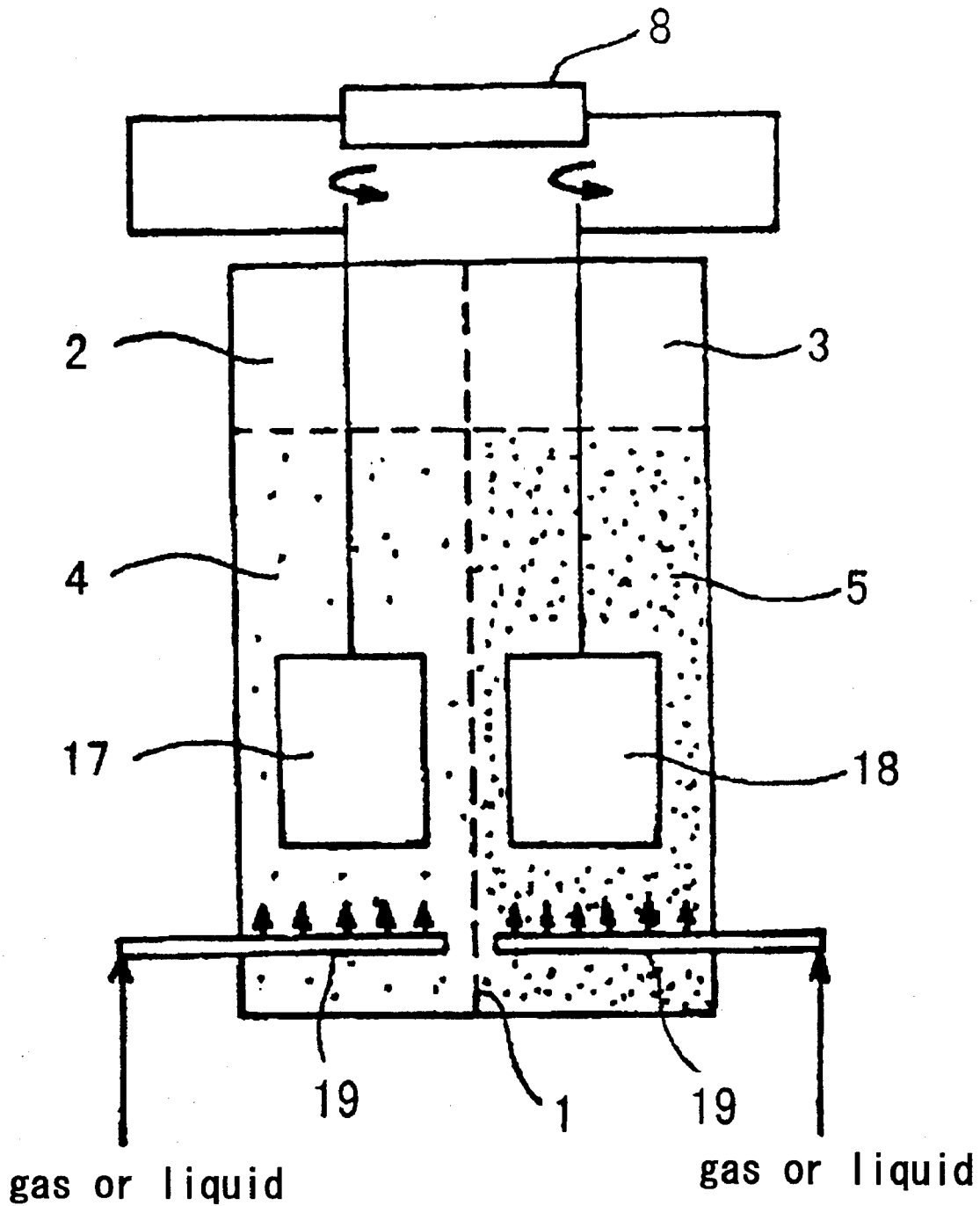
FIG. 6 is a schematic cross-sectional view showing another example of the structure of the battery according to the fourth embodiment of the first invention.

FIGS. 5, 6 show batteries according to a fourth embodiment of the first invention. Referring to FIG. 5, fluid fluidizing and dispersing units using a liquid or a gas are respectively used as the anode current collector and the cathode current collector. Referring to FIG. 6, agitators rotatably driven by motors or the like (not shown) are respectively used as the anode current collector and the cathode current collector.

As shown in FIG. 5, an anode current collector and dispersing unit 15 and a cathode current collector and dispersing unit 16 are devices such as the dispersion plate or the spray nozzle for uniformly dispersing the gas or liquid in the horizontal cross sections of the respective cells 2, 3. Also, the agitating means such as the vane-like agitators or the like may be provided in the respective cells 2, 3.

As shown in FIG. 6, an anode current collector and agitator 17 and a cathode current collector and agitator 18 serve to agitate (fluidize) the powdered active materials and directly make contact with the powdered materials. The vane-like agitators or the like rotatably driven by motors or the like (not shown) may be used as the anode current collector and agitator 17 and the cathode current collector and agitator 18 but the constitution of the agitating means is not limited. As shown in FIG. 6, although fluid fluidizing and dispersing units 19 using a liquid or a gas are also used, these may be omitted.

The other constitution and function are identical to those of the second embodiments.

Fifth Embodiment

Figure 7:
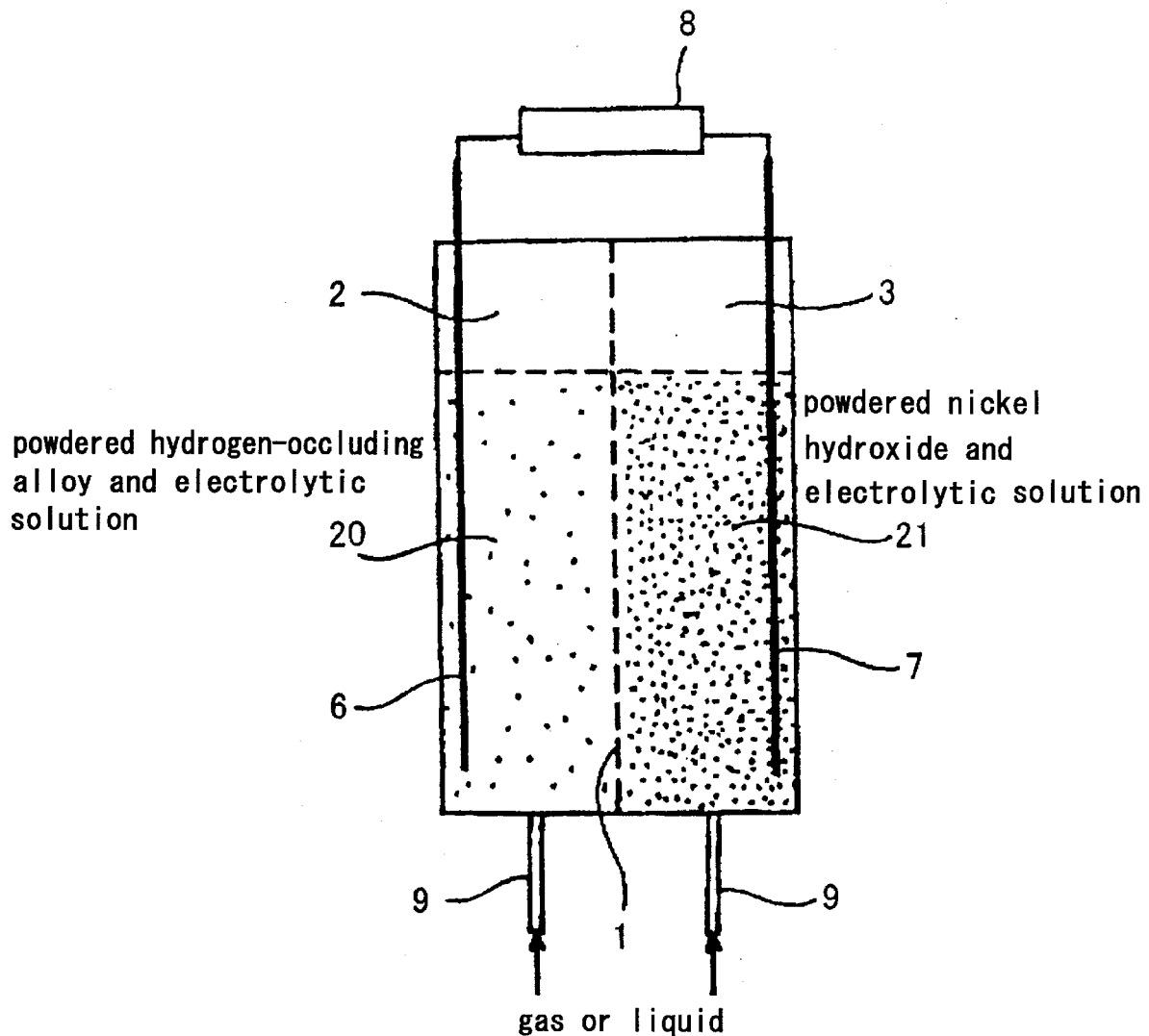
FIG. 7 is a schematic cross-sectional view showing a structure of a battery according to a fifth embodiment of the first invention.

FIG. 7 shows a battery according to a fifth embodiment of the first invention. In this embodiment, as powdered active materials, hydrogen-occluding alloy is used on an anode side and nickel hydroxide is used on a cathode side. As shown in FIG. 7, an anode cell 2 is filled with the powdered hydrogen-occluding alloy and an electrolytic solution 20 and a cathode cell 3 is filled with a powdered nickel hydroxide and an electrolytic solution 21. As the hydrogen-occluding alloy, for example, $La_{0.3}(Ce, Nd)_{0.15}Zr_{0.05}Ni_{3.8}Co_{0.8}Al_{0.5}$, or the like is used. As the electrolytic solution, for example, 6 normal KOH aqueous solution or the like may be used.

Charge and discharge of the battery of this embodiment will be described in detail.

(Charge)

When the battery is connected to the power generation means 8, an electron is discharged from the power generation means 8 and reaches the anode current collector 6. The electron reacts with the powdered hydrogen-occluding alloy immediately on the anode current collector 6 or while traveling through the powdered hydrogen-occluding alloy as follows. M denotes the hydrogen-occluding alloy and MHx denotes metal hydride.

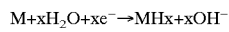

$$M + xH_2O + xe^- \rightarrow MHx + xOH^-$$

The hydroxyl ion generated by the reaction passes through the separator 1 and enters the cathode cell 3, where it reacts with the powdered nickel hydroxide, and discharges the electron as represented by the following reaction.

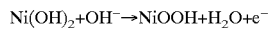

$$Ni(OH)_2 + OH^- \rightarrow NiOOH + H_2O + e^-$$

The generated electron moves to the cathode current collector 7 immediately or through the powdered nickel oxyhydroxide or powdered nickel hydroxide and is supplied to the power generation means 8.

(Discharge)

When the battery is connected to the load means 8, the anode current collector 6 discharges the electron to an external circuit. The discharged electron travels through the load means 8 and reaches the cathode current collector 7. The electron moves to the powdered nickel oxyhydroxide from the cathode current collector 7. The electron reacts with water immediately or through the powdered nickel oxyhydroxide to produce nickel hydroxide and hydroxyl. The hydroxyl passes through the separator 1 and is introduced to the anode cell 2, where it reacts with metal hydride and discharges the electron. The electron moves to the anode current collector 6 immediately or through the powdered hydrogen-occluding alloy and is supplied to the load means 8.

The other constitutions and functions are similar to those of the second embodiment. The battery of this embodiment can be carried out in the constitutions of the third and fourth embodiments and in constitutions of sixth and seventh embodiments.

Sixth Embodiment

Figure 8:
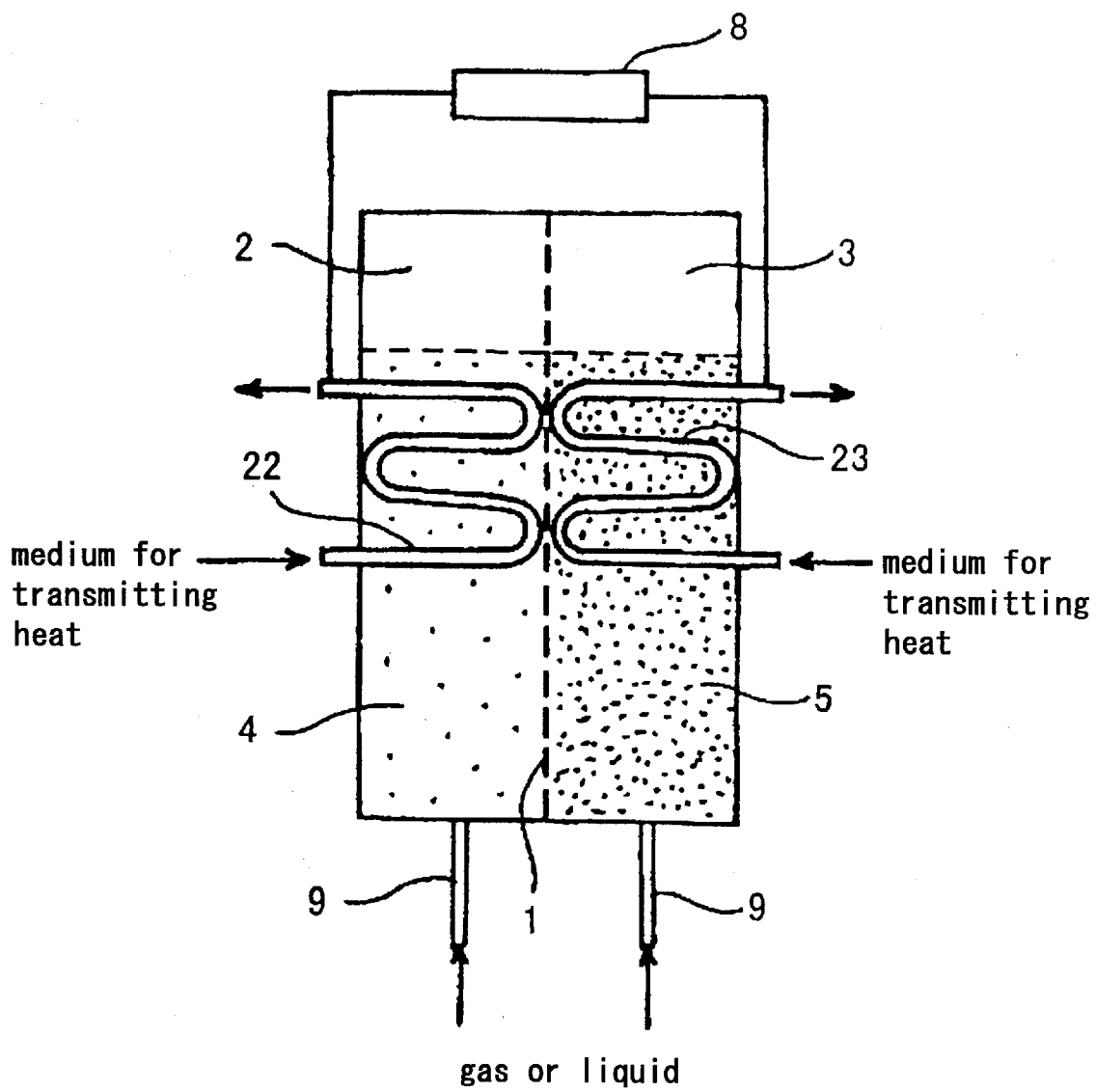
FIG. 8 is a schematic cross-sectional view showing an example of a structure of a battery according to a sixth embodiment of the first invention.
Figure 9:
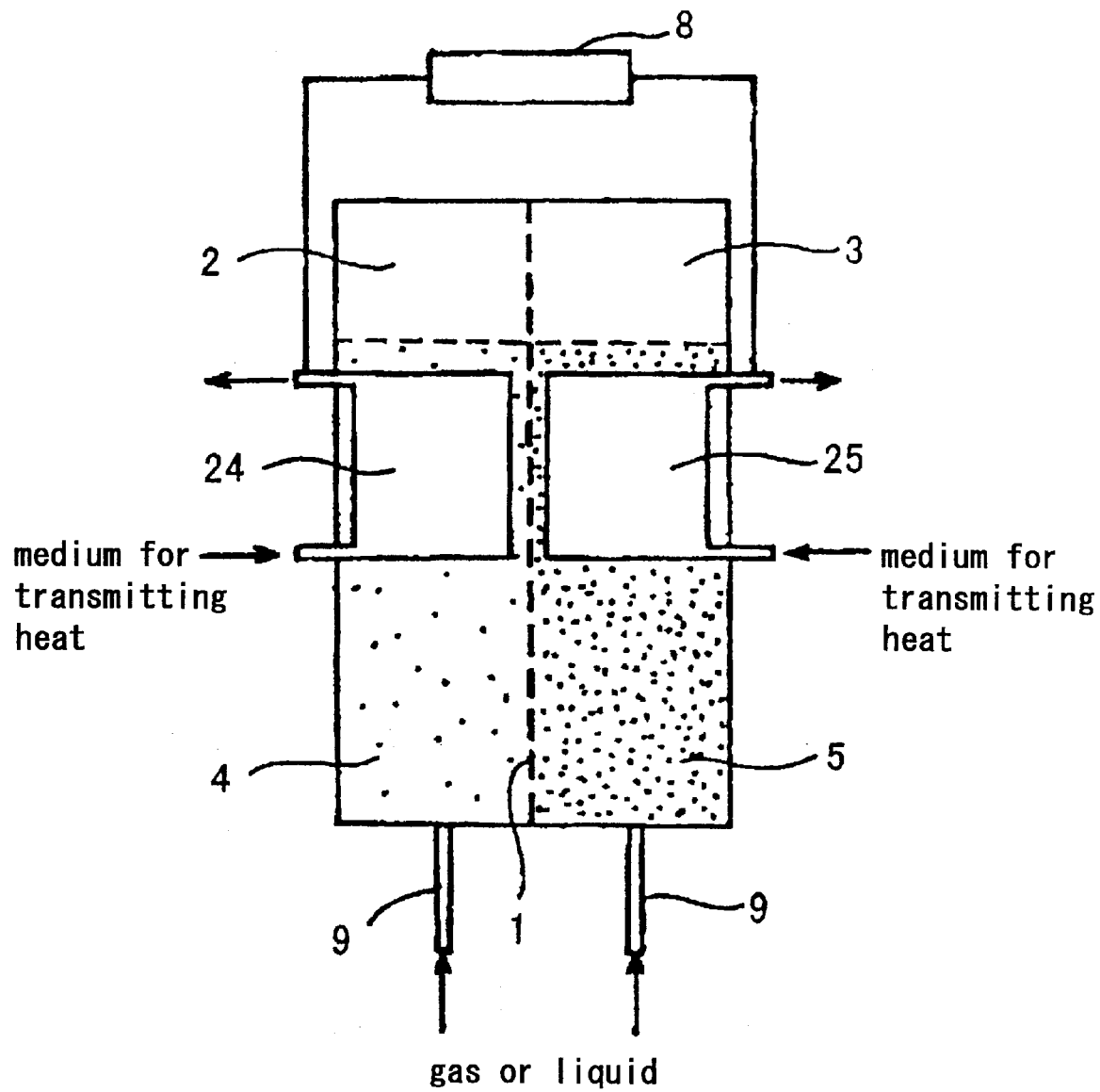
FIG. 9 is a schematic cross-sectional view showing another example of the structure of the battery according to the sixth embodiment of the first invention.

FIGS. 8, 9 show batteries according to a sixth embodiment of the first invention. In this embodiment, a heat transmitter is installed in the battery and functions as a current collector. It should be noted that the heat transmitter and the current collector can be independently provided. Referring to FIG. 8, an anode current collector and heat transmission tube 22 is provided in the anode cell 2 and a cathode current collector and heat transmission tube 23 is provided in the cathode cell 3. Referring to FIG. 9, an anode current collector and heat transmission plate 24 is provided in the anode cell 2 and a cathode current collector and heat transmission plate 24 is provided in the cathode cell 3.

With reference to FIG. 8, charge and discharge of the battery of this embodiment will be described in detail.
Charge When the battery is connected to the power generation means 8, an electron is discharged from the power generation means 8 and reaches the anode current collector 22. The electron reacts with the anode powdered active material immediately on the anode current collector 22 or while traveling through the powdered active material. An anion generated by the fact that the anode powdered active material has received the electron passes through the separator 1 and enters the cathode cell 3, where it reacts with the cathode powdered active material and discharges an electron. The electron moves to the cathode current collector 23 immediately or through the powdered active material and is supplied to the power generation means 8.

As described above, the current collectors serve as heat transmission tubes on the both cathode and anode sides to simultaneously transmit the electron and heat by contact with the powdered active materials. A heat medium such as water and air is flowed through the anode current collector and heat transmission tube 22 and the cathode current collector and heat transmission tube 23, for collecting/supplying heat.
Discharge When the battery is connected to the load means 8, the anode current collector 22 discharges an electron to an external circuit. The discharged electron travels through the load means 8 and reaches the cathode current collector 23. The electron reacts with the cathode powdered active material immediately on the cathode collector 23 or while traveling through the powdered active material. An anion generated by the fact that the cathode powdered active material has received the electron passes through the separator 1 and enters the anode cell 2, where it reacts with the anode powdered active material and discharges an electron. The electron moves to the anode current collector 22 immediately or through the powdered active material and is supplied to the load means 8.

The current collectors of FIG. 9 on the both anode and cathode sides serve as hollow heat transmission plates to transmit the electron and heat simultaneously by the contact with the powdered material. The heat medium such as water and air is flowed through an anode current collector and heat transmission plate 24 and a cathode current collector and heat transmission plate 25, for collecting/supplying heat. The details of the charge and discharge are similar to those of FIG. 8. The shape of the heat transmitters is not limited to tube or plate but another shape may be adopted.

The other constitutions and functions are similar to those of the second embodiment. It should be noted that the constitution of this embodiment can be combined into the constitutions of the third and fourth embodiments and a constitution of a seventh embodiment mentioned later.

Seventh Embodiment

Figure 10:
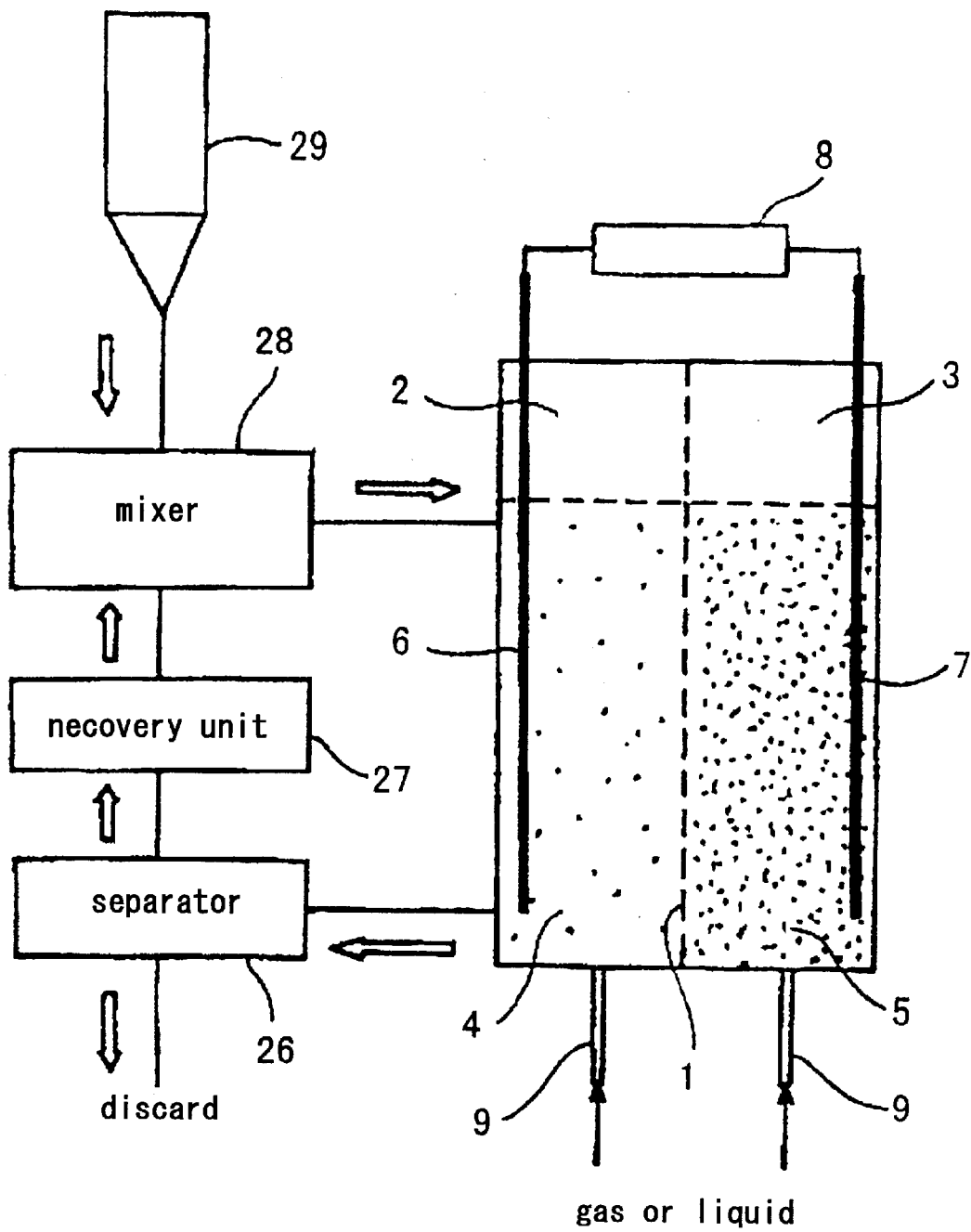
FIG. 10 is a schematic cross-sectional view showing an example of a structure of a battery according to a seventh embodiment of the first invention.

FIGS. 10. 11 show batteries according to a seventh embodiment of the first invention. In this embodiment, there are provided a discharging device for discharging the powdered active material from vessels and a supply device for supplying the powdered active material to the vessels. In addition, there are provided a device for recovering the discharged powdered materials, a device for making up (refilling) the powdered materials, and a device for charging the discharged powdered material by a thermal or chemical reaction.

First of all, charge and discharge of the battery of this embodiment will be explained in detail.
Charge When the battery is connected to the power generation means 8, an electron is discharged from the power generation means 8 and reaches the anode current collector 6. The electron reacts with the anode powdered material immediately on the anode current collector 6 or while traveling through the anode powdered active material. An anion generated by the fact that the anode powdered active material has received the electron passes through the separator 1 and enters the cathode cell 3, where it reacts with the cathode powdered active material and discharges an electron. The electron moves to the cathode current collector 7 immediately or through the powdered active material, and is supplied to the power generation means 8.
Discharge When the battery is connected to the load means 8, the anode current collector 6 discharges an electron to an external circuit. The discharged electron travels through the load means 8 and reaches the cathode current collector 7. The electron reacts with the cathode powdered active material immediately on the cathode current collector 7 or while traveling through the cathode powdered active material. An anion generated by the fact that the cathode powdered active material has received the electron passes through the separator 1 and enters the anode cell 2, where it reacts with the anode powdered active material and discharges the electron. The electron moves to the anode current collector 6 immediately or through the powdered active material and is supplied to the load means 8.

The other constitutions and functions are similar to those of the second embodiment.
(Recovery and Makeup of Active Materials)

Referring to FIG. 10, recovery and makeup of an active material (catalyst) of the battery of this embodiment will be described in detail. In FIG. 10, although only the constitution on the anode side is illustrated, the same device or the like is provided on the cathode side.

As shown in FIG. 10, the powdered active material degraded as the result of the charge/discharge is discharged from the anode cell 2 as a slurry together with an electrolytic solution (electrolytic liquid) and part of or all of the powdered active material is discarded by a separator 26 as necessary. The electrolytic solution is separated and the powdered material is supplied from the separator 26 to a recovery unit 27, where the powdered material is subjected to acidizing such as cleansing using hydrochloric acid. The powdered material recovered by the recovery unit 27 is supplied to a mixer 28 to which new powdered material equal in amount to the powdered material discarded by the separator 26 is supplied from a makeup powdered material hopper 29. The recovered and made up powdered material is re-mixed with the electrolytic solution by the mixer 28 and supplied as the slurry from a slurry pump (not shown) to the anode cell 2. The constitution for separating and mixing the electrolytic solution is not illustrated.

Figure 11:
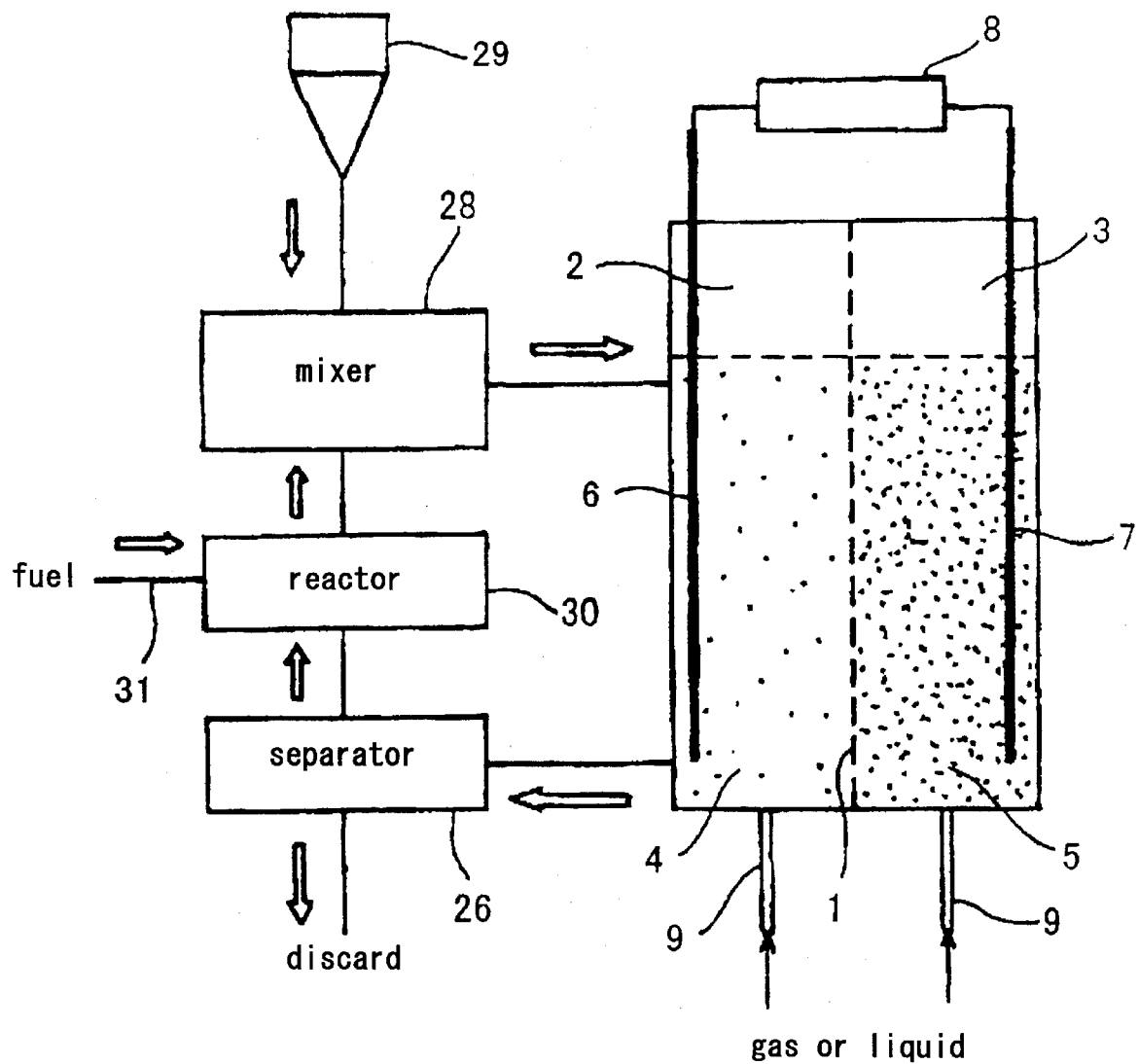
FIG. 11 is a schematic cross-sectional view showing another example of the structure of the battery according to the seventh embodiment of the first invention.
Figure 1:
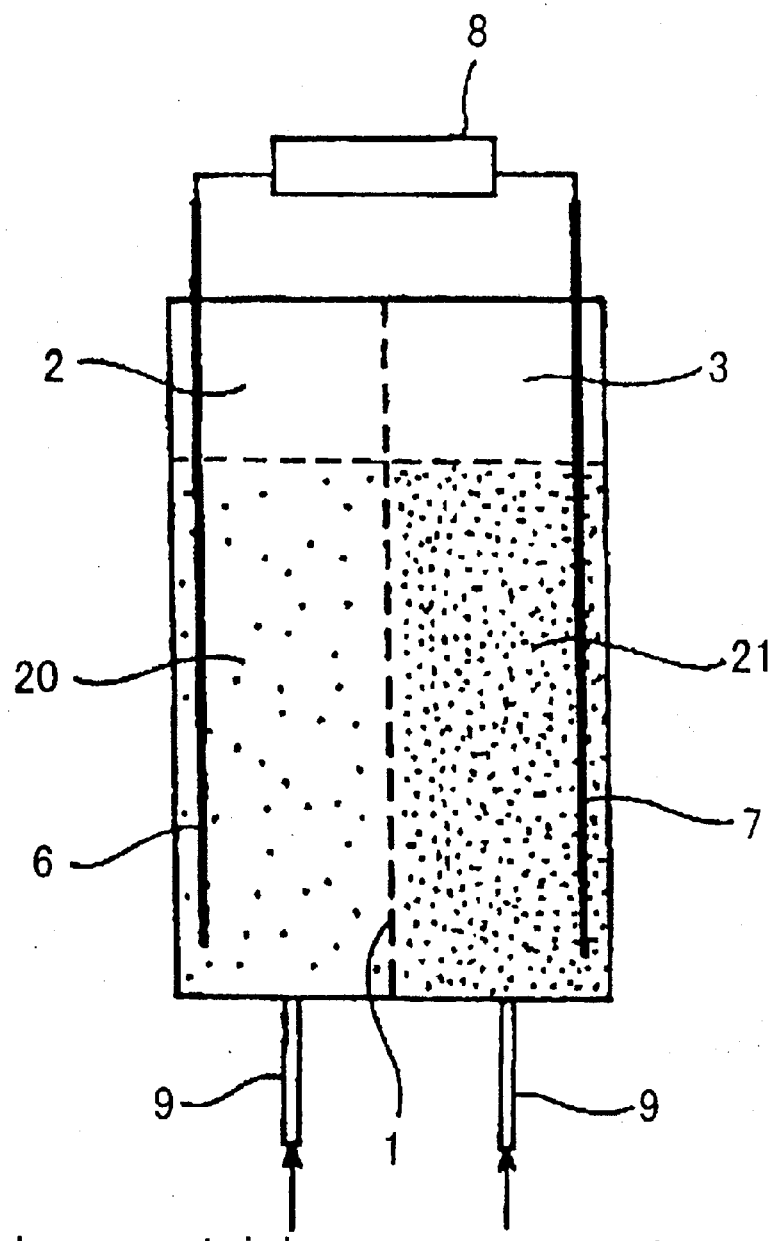

With reference to FIG. 11, recovery and makeup in association with the reaction of the battery of this embodiment will be described. In FIG. 11, although only the constitution on the anode side is illustrated, the same device or the like is provided on the cathode side.

As shown in FIG. 11, the powdered material generated by the charge and discharge is discharged from the anode cell 2 as the slurry together with the electrolytic solution, and part or all of the powdered active material is discarded by the separator 26 as necessary. The electrolytic solution is separated and the powdered material is supplied from the separator 26 to a reactor 30, where it reacts with a fuel supplied from a fuel supply tube 31 and is changed into a re-dischargeable active material. The charged powdered material in the reactor 30 is supplied to the mixer 28, to which new powdered material equal in amount to the powdered material discarded by the separator 26 is supplied from the makeup powdered material hopper 29. The recovered and made up powdered material is re-mixed with the electrolytic solution by the mixer 28 and supplied as the slurry from a slurry pump (not shown) to the anode cell 2. The constitution for separating and mixing the electrolytic solution is not illustrated.

In the reactor 30, in case of a nickel hydrogen battery, the following reaction is conducted:

$$M + (x/2)H_2 \rightarrow MHx$$

As a result, an active material identical to MHx generated in the following reaction during charge is produced:

$$M + xH_2O + xe^- \rightarrow MHx + xOH^-$$

In the reactor on the cathode side, in case of the nickel hydrogen battery, the following reaction by oxygen or air is conducted as follows:

$$Ni(OH)_2 + (1/4)O_2 \rightarrow NiOOH + \frac{1}{2}H_2O$$

As a result, an active material identical to NiOOH generated in the following reaction during charge is produced:

$$Ni(OH)_2 + OH^- \rightarrow NiOOH + H_2O + e^-$$

The constitution of this embodiment can be suitably combined into the constitutions of the third, fourth and sixth embodiments.

Eighth Embodiment

FIG. 12 shows a battery according to an eighth embodiment of the first invention. In this embodiment, the hydrogen-occluding alloy is used as the anode powdered active material, hydrogen and hydrogen-containing gas or hydrogen carbide gas or an alcohol-like material or an ether-like material is used as anode agitating (fluidizing) gas, nickel hydroxide is used as the cathode powdered active material, and oxygen or air is used as cathode agitating (fluidizing) gas. As shown in FIG. 12, the anode cell 2 is filled with the powdered hydrogen-occluding alloy and an electrolytic solution 20 and the cathode cell 3 is filled with the powdered nickel hydroxide and an electrolytic solution 21. The fluid fluidizing and dispersing means 9 serves to supply hydrogen to the anode cell 2 and supply oxygen or air to the cathode cell 3. An example of the hydrogen-occluding alloy, $La_{0.8}(Ce, Nd)_{0.15}Zr_{0.05} Ni_{3.8}Co_{0.8}Al_{0.5}$ or the like is used. As the electrolytic solution, for example, a KOH aqueous solution or the like may be used.

In the anode cell 2, hydrogen is fed to the powdered hydrogen-occluding alloy and the electrolytic solution 20 and the following reaction is conducted:

$$M + (x/2)H_2 \rightarrow MHx$$

When the battery is connected to the load means 8, hydrogen occluded in the hydrogen-occluding alloy reacts with a hydroxyl in the electrolytic solution as follows and discharges an electron and water:

$$MHx + xOH^- \rightarrow M + xH_2O + xe^-$$

The discharged electron moves to the anode current collector 6 immediately or through the powdered hydrogen-occluding alloy. The electron travels from the anode current collector 6, through the load means 8, and to the cathode current collector 7. The electron moves to the powdered nickel oxyhydroxide from the cathode current collector 7. The electron moves immediately or through the powdered nickel oxyhydroxide and reacts according to the following reaction to produce nickel hydroxide and hydroxyl. The hydroxyl passes through the separator 1, and is introduced to the anode cell 2, where it reacts with metal hydride.

$$NiOOH + H_2O + e^- \rightarrow Ni(OH)_2 + OH^-$$

In the cathode cell 3, in case of the nickel hydrogen battery, the following reaction by using oxygen or air is conducted.

$$Ni(OH)_2 + (1/4)O_2 \rightarrow NiOOH + (1/2)H_2O$$

As a result, an active material identical to NiOOH generated in the following reaction during charge is generated as follows:

$$Ni(OH)_2 + OH^- \rightarrow NiOOH + H_2O + e^-$$

The other constitution and function are similar to those of the second embodiment. The battery of this embodiment may be carried out by the constitutions of the third, fourth, sixth, and seventh embodiments.

2. Embodiments of the Second Invention

First Embodiment

Figure 14:
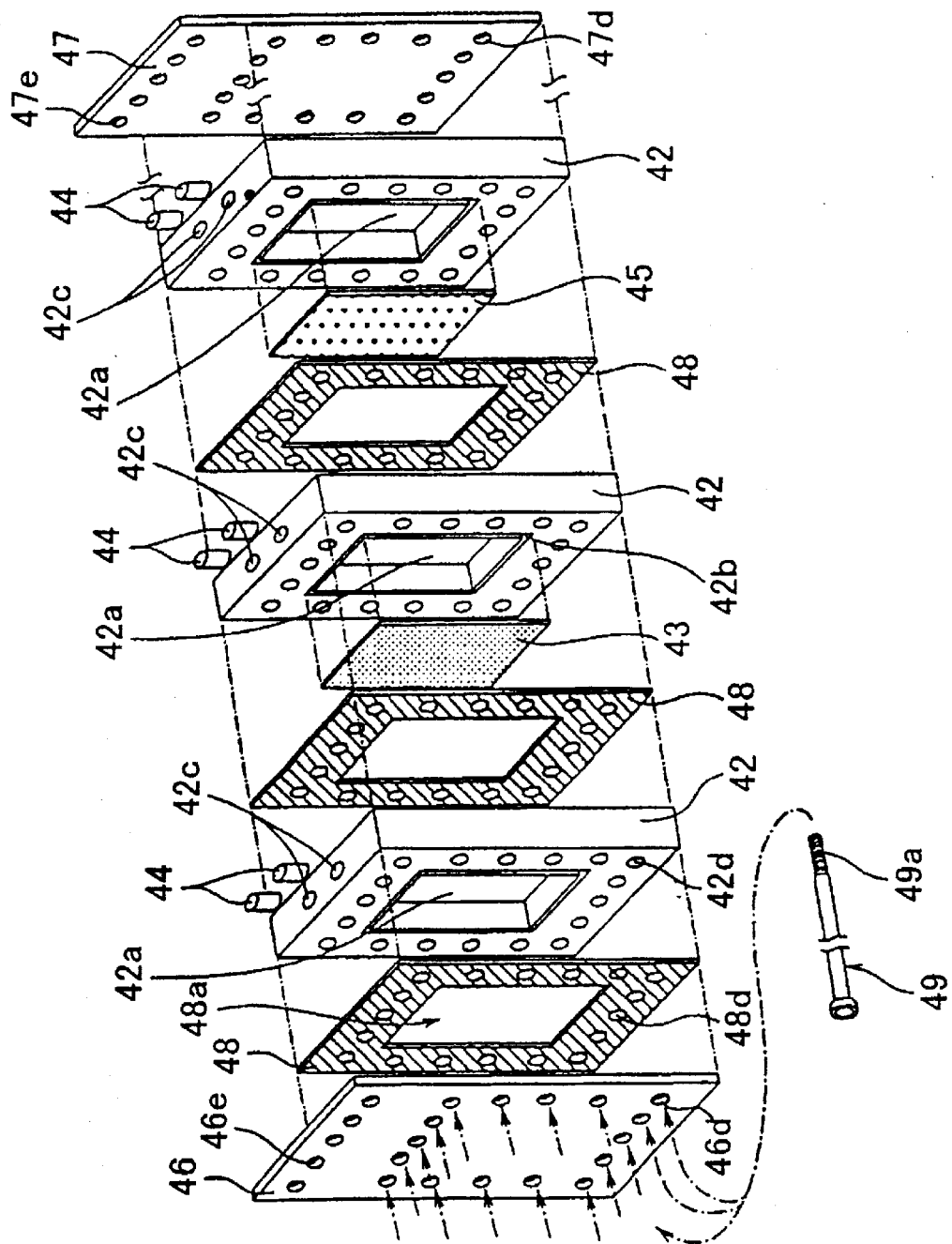
FIG. 14 is a perspective view showing a portion of main components prior to assembling (in a disassembled state) of the verification tester of the layered-type three-dimensional battery of FIGS. 13(a), 13(b)

FIG. 13 is a perspective view and a schematic cross-sectional view showing an example of a verification tester of a layered-type three-dimensional battery according to a first embodiment of the second invention and FIG. 14 is a perspective view showing a portion of main components prior to assembling (in a disassembled state) of the verification tester of FIG. 13. As shown in FIG. 13, a layered-type three-dimensional battery 41 is nickel-hydrogen battery. As shown in FIG. 14, the battery is structured to have a pair of two cell (vessel) members 42 each having a square central opening 42a penetrating therethrough in a thickness direction thereof. In the example in FIG. 13, two pairs (four in total) cell members 42 are provided. As shown in FIG. 14, a shallow (in this example, 0.5 mm deep) concave portion 42b is formed annularly at a periphery of the opening 42a of each of the cell members 42. A substantially-square and alkali resistant ion-permeable separator (in this example Teflon separator) 43 is fitted into the concave portion 42b between the cell members 42. The separator 43 is a membrane which permits only ions to pass therethrough but does not permit powdered electrode n, h or electricity to pass therethrough. In addition to the above, an unglazed pottery, an ion exchange resin membrane, glass, or the like is used. Two injection ports 42c are formed in an upper surface of each of the cell members 42 such that they vertically penetrate toward the opening 42a and are spaced apart from each other in the width direction thereof. Rubber plugs 44 are removably attached to the respective injection ports 42c.

A substantially-square, alkali-resistant, conductive, and plate-shaped current collecting member (in this example, nickel plate) 45 is fitted into the concave portion 42b between the cell members 42 in each pair. Alkali-resistant and conductive current collectors (in this example, nickel plate) 46, 47 are provided on opposite sides of the two pairs of the cell members 42. Rubber packings 48 are respectively interposed between the cell members 42, between the cell member 42 and the current collector 46, and the cell member 42 and the current collector 47. The rubber packings 48 have openings 48a shaped identically to the openings 42a in central portions thereof and have outer shapes identical to those of the cell members 42. A plurality of insertion holes 42d, 48d, 46d, 47d are sequentially formed at peripheries of the openings 42a, 48a in the cell members 42, the packings 48, and the current collectors 46, 47 such that these holes penetrate in the thickness directions thereof and are spaced in peripheral directions thereof. Non-conductive bolts 49 are inserted through the plurality of insertion holes 42d, 48d, 46d, 47d and nuts (not shown) are securely screwed to tip screw portions 49a of the bolts 49. Small holes 46e and small holes 47e are respectively formed at upper end portions of the left-end (cathode) and right-end (anode) current collectors 46, 47 such that these holes are spaced in the width directions thereof. In this example, cathode terminals 50 and anode terminals 51 are respectively fitted to the small holes 46e of the left-end current collector 46 and the small holes 47e of the right-end current collector 47 and one end portions of wirings 52, 53 are connected to these terminals.

A potassium hydroxide solution k as the electrolytic solution is injected into each of the cell members 42 through the injection ports 42c. Powdered nickel hydroxide n as the cathode powdered active material, powdered hydrogen-occluding alloy h as the anode powdered active material, the powdered nickel hydroxide n as the cathode powdered active material, the powdered hydrogen-occluding alloy h as the anode powdered active material are put into the potassium hydrogen aqueous solution k sequentially from the left-end cell member 42 of FIG. 13(b) and suspended. As a result, from the left end to the right end of FIG. 13(b), a cathode cell 54, an anode cell 55, the cathode cell 54, and the anode cell 55 are sequentially formed.

The layered-type three-dimensional battery 41 is thus constituted. The battery 41 of this example is structured such that two nickel hydrogen unit batteries (secondary batteries) 56 are connected in series to generate a voltage of approximately 2.4 v. Load means 57 such as 2.4 v electric bulb is connected between the cathode terminal 50 and the anode terminal 51 of the battery 41 by means of wirings 52, 53. During discharge of the charged battery 41, the powdered nickel oxyhydroxide n in the cathode cell 54 which is in contact with the cathode current collector 46 of a left-side first unit battery 56 provided with the cathode terminals 50 receives an electron (e⁻) from the cathode current collector 46 together with a hydrogen ion to be formed into nickel hydroxide. In the anode 55, the powdered hydrogen-occluding alloy h discharges the electron (e³¹ ) and the hydrogen ion (H⁺), and the hydrogen ion passes through the ion-permeable separator 43 and travels to the cathode cell. In summary, the following reaction in the cathode cell 54 is conducted:

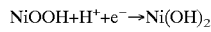

NiOOH+H⁺+e⁻→Ni(OH)₂

On the other hand, the following reaction in the anode cell 55 is conducted:

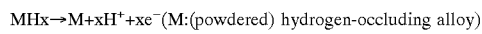

MHx→M+xH⁺+xe⁻(M:(powdered) hydrogen-occluding alloy)

Following this, the electron (e⁻) discharged from the powdered hydrogen-occluding alloy h in the anode cell 55 is collected to the current collecting member 45 forming a separating wall between the anode cell 55 and the cathode cell 54 of the right-side second unit battery 56 while moving through the powdered hydrogen-occluding alloy h, and the powdered nickel oxyhydroxide n in the cathode cell 54 of the second unit battery receives the electron (e⁻) from the current collecting member 45. The electron (e⁻) and the hydrogen ion are fed to the powdered nickel oxyhydroxide n to be formed into nickel hydroxide. In the anode cell 55 of the right-side second unit battery 56, the powdered hydrogen-occluding alloy h discharges the electron (e⁻) and the hydrogen ion (H⁺), and the hydrogen ion passes through the ion-permeable separator 43 and travels to the cathode cell 54. The electron (e⁻) discharged in the anode cell 55 is collected to the anode current collector 47 and moves from the anode terminal 51, through the wiring 53, and to the load means 57, and moves to the cathode current collector 46 through the wiring 52. Thereby, a current flows from the cathode terminal 50 of the cathode current collector 46, through the load means 57, and to the anode terminal 51 of the anode current collector 47. In this way, a voltage of 1.2V×2 (2.4V) is generated (discharge is performed).

On the other hand, the three-dimensional battery 41 is charged in the following manner. A charger 58 applies a predetermined voltage to the battery 41 to cause the electron (e⁻) to be fed from the anode terminal 51 of the anode current collector 47 to the anode cell 55 of the right-side second unit battery 56. The electron (e⁻) moves in the powdered hydrogen-occluding alloy h, thereby causing the following reaction to be conducted to generate a hydroxyl ion.

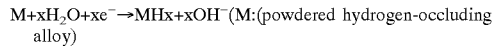

M+xH₂O+xe⁻→MHx+xOH⁻(M:(powdered hydrogen-occluding alloy)

The hydroxyl ion (OH⁻) generated in the anode cell 55 passes through the ion-permeable separator 43 and moves into the cathode cell 54 on the left side, where it reacts with the powdered nickel hydroxide n according to the following formula and discharges the electron (e⁻).

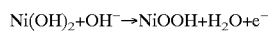

Ni(OH)₂+OH⁻→NiOOH+H₂O+e⁻

The electron (e⁻) discharged in the cathode cell 54 is collected to the current collecting member 45 and moves to the powdered hydrogen-occluding alloy h in the anode cell 55 on the left side. Thereby, the reaction represented by the above formula is conducted and a hydroxyl ion is generated. The hydroxyl ion (OH⁻) generated in the anode cell 55 passes through the ion-permeable separator 43 and moves into the cathode cell 54 of the first unit battery 56 on the left side, where it reacts with the powdered nickel hydroxide n according to the above formula and discharges the electron (e⁻). The electron (e⁻) is collected to the cathode terminal 50 of the cathode current collector 46 and sent to the charger 58.

Second Embodiment

Figure 15:
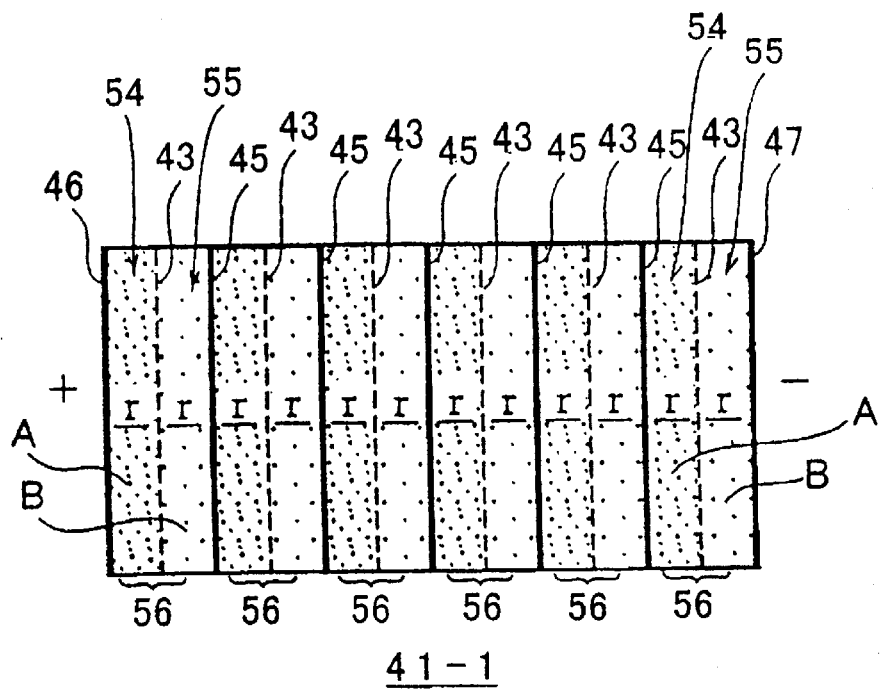
FIG. 15 is a central longitudinal sectional view schematically showing a layered-type three-dimensional battery according to a second embodiment of the second invention.

FIG. 15 is a central longitudinal sectional view schematically showing a layered-type three-dimensional battery according to a second embodiment of the second invention.

As shown in FIG. 15, a three-dimensional battery 41-1 of this embodiment is a lead storage battery structured such that 6 pairs of unit lead batteries 56 are connected in series. The unit lead storage battery 56 comprises a cathode cell 54 and an anode cell 55 which are separated by an acid-resistant and ion-permeable separator 43 provided in a middle portion thereof. A leftmost wall of the cathode cell 54 of a leftmost (first pair) unit battery 56 and a rightmost wall of an anode cell 55 of a rightmost (sixth pair) unit battery 56 are respectively constituted by a side wall of acid-resistant conductor (platinous plate or lead plate) as a current collector 46 and a side wall of acid-resistant conductor (platinous plate or lead plate) as a current collector 47. A right side wall of the anode cell 55 of the unit battery 56 of the first pair and a left side wall of the cathode cell 54 of the unit battery 56 of the sixth pair are respectively constituted by side walls of acid-resistant conductors (platinous plate or lead plate) as current collecting members 45. A four pairs of unit batteries 56 situated at an intermediate position are connected in series by means of the acid-resistant conductors (platinous plate or lead plate) as the current collecting members 45 servicing as separating walls defining the unit batteries 56 in respective pairs. The leftmost (first pair) unit battery 56 and the rightmost (sixth pair) unit battery 56 are connected in series by means of the acid-resistant conductor side walls (platinous plates or lead plates) as the current collecting members 45.

In this example, each of the cells 54, 55 is filled with a dilute sulfuric acid solution (sulfuric acid aqueous solution) r as a common electrolytic solution. Powdered lead dioxide (PbO₂) A is put into the dilute sulfuric acid solution in the cathode cell 54 and suspended. Powdered metallic lead (Pb) B is put in the dilute sulfuric acid solution in the anode cell 55 and suspended.

The three-dimensional battery 41-1 according to the second embodiment as described above discharges as follows. Specifically, the cathode cell 54 in contact with the left-end cathode current collector 46 receives an electron from the current collector 46 and the electron (e⁻) is fed to the powdered lead dioxide A, which is converted into lead sulfate (PbSO₄) and an ion is generated according to the following formula:

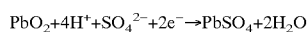
$$PbO_2 + 4H^+ + SO_4^{2-} + 2e^- \rightarrow PbSO_4 + 2H_2O$$

Then, an anion in the cathode cell 54 moves through the ion-permeable separator 43 and into the cathode cell 55, where it reacts with powdered metallic lead B and discharges the electron[e⁻] and the metallic lead is oxidized to be generated into powdered lead sulfate according to the following formula:

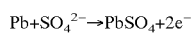
$$Pb + SO_4^{2-} \rightarrow PbSO_4 + 2e^-$$

The electron in the anode cell 55 is collected to the current collecting member 45 and is fed from the current collecting member 45 to the powdered lead dioxide A in the cathode cell 54 on the right side, and the reaction is conducted according to the above formula to generate lead dioxide (PbSO₄) and the ion. The anion in the cathode cell 54 moves through the ion-permeable separator 43 into the anode cell 55, where it reacts with the powdered metallic lead B and discharges the electron and powdered lead sulfate is generated according to the above formula. The electron is collected to the current collecting member 45. This reaction is sequentially repeated in the respective unit batteries 56. The electron moves from the right-end anode current collector 47, through load means (not shown), and to the left-end cathode current collector 46. Conversely, a current flows from the cathode current collector 46, through the load means (not shown), and to the right-end current collector 47. In this example, a voltage of approximately 13.6V is generated. It should be noted that any acid-resistant conductors may be used as the current collectors or electrodes. For example, carbon or conductive polymer may be used.

Third Embodiment

Figure 16:
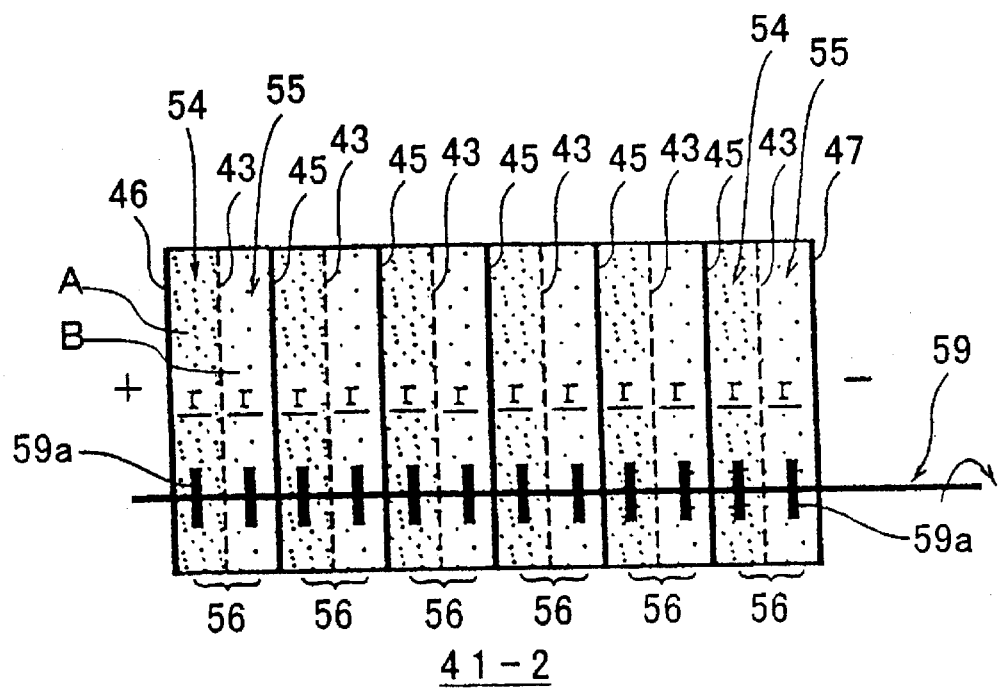
FIG. 16 is a central longitudinal sectional view schematically showing a layered-type three-dimensional battery according to a third embodiment of the second invention.

FIG. 16 is a central longitudinal sectional view schematically showing a layered-type three-dimensional battery according to a third embodiment of the second invention.

As shown in FIG. 16, a three-dimensional battery 41-2 of this embodiment is a lead storage battery similarly to that of the second embodiment of FIG. 15. A rotational shaft 59 is rotatable provided in the battery 41-2 such that it penetrates through the battery 41-2 in the axial direction thereof, and is rotated manually or by a rotation drive device (not shown). A plurality of agitation vanes 59a are provided at positions corresponding to the cells 54, 55 on the rotational shaft 59 such that they are protruded in the direction orthogonal to the rotational shaft 59 and are adapted to agitate the dilute sulfuric solutions r and suspended powdered lead dioxide A or powdered metallic lead B in the respective cells 54, 55 by rotation of the rotational shaft. This constitution differs from that of the battery 41-1 of the second embodiment.

According to the three-dimensional battery 41-2 of this embodiment, the powdered lead dioxide A and the powdered metallic lead B as powdered electrodes are agitated to provide preferable contact between the powdered electrode A and the current collector 46, between the powdered electrode B and the current collecting members 47, or between the powdered electrodes A, B and the current collecting members 45. Therefore, a capacity of each of the cells 54, 55 (cell member 42: see FIG. 13) can be increased and a power can be correspondingly increased. In addition, since the agitation of the powdered lead dioxide A and the powdered metallic lead B as the powdered electrodes can prevent the adhesion of lead sulfate particulars to the current collectors or the current collecting members, lead plates can be employed as the current collectors 46, 47 and the current collecting members 45. Since the battery 41-2 is identical to the battery 41-1 of the second embodiment except the agitating means 59, the corresponding parts are referenced to by the same reference numerals and description thereof is omitted.

Fourth Embodiment

Figure 17:
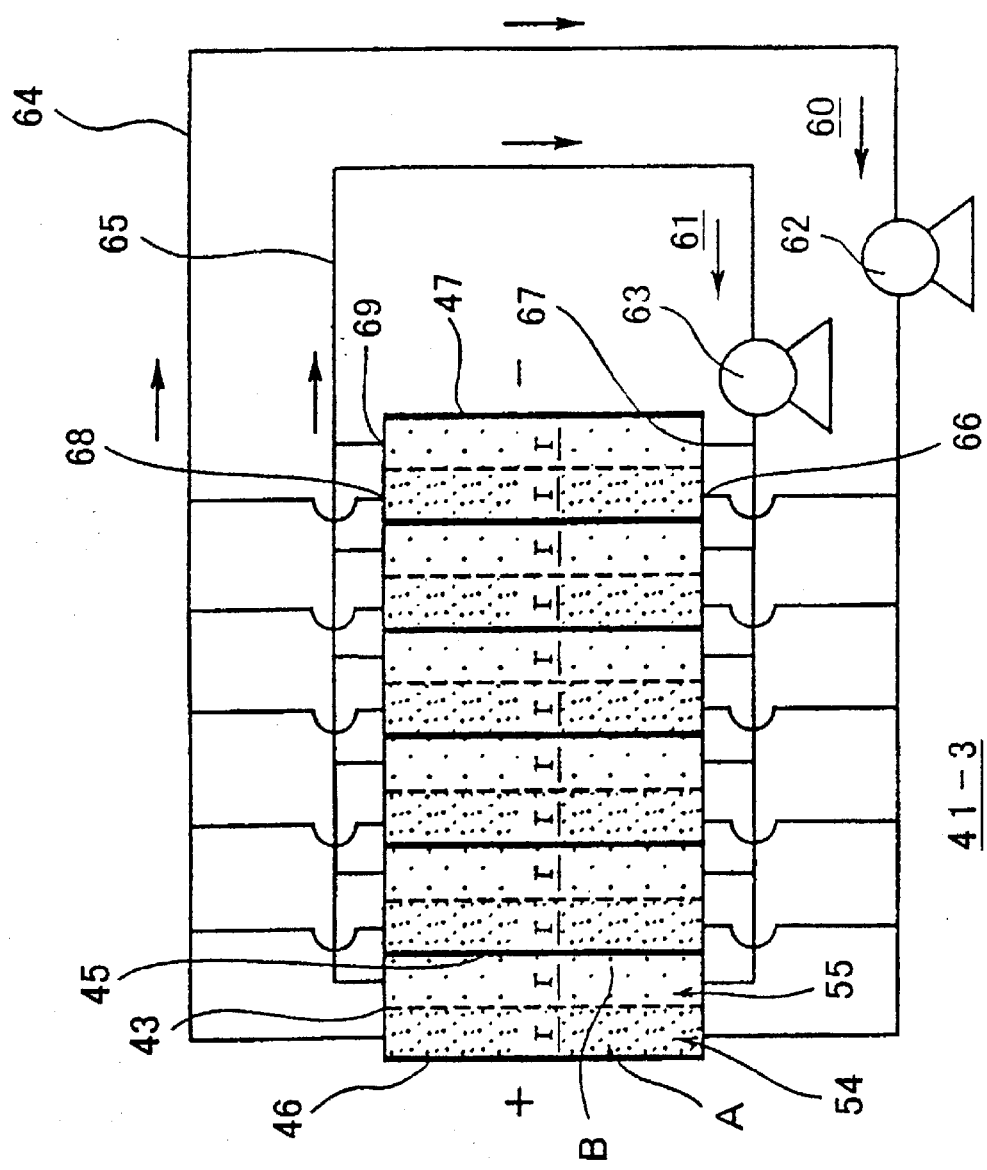
FIG. 17 is a central longitudinal sectional view schematically showing a layered-type three-dimensional battery according to a fourth embodiment of the second invention.

FIG. 17 is a central longitudinal sectional view schematically showing a layered-type three-dimensional battery according to a fourth embodiment of the second invention.

As shown in FIG. 17, a three-dimensional battery 41-3 of this embodiment is a lead storage battery having a structure similar to the structure of the third embodiment of FIG. 16 and provided, with agitating means different from that of the battery 41-2 of the third embodiment. Specifically, the agitating means of this embodiment comprises agitating means 60 for the cathode cell 54 and agitating means 61 for the anode cell 55. The respective agitating means 60, 61 respectively comprise circulation pumps 62, 63. Dispersion nozzles 66, 67 are respectively attached to injection ports of circulation tubes 64, 65 of the sulfuric acid aqueous solution r and filters 68, 69 for the powdered electrodes A, B are attached to suction ports of these tubes. With this constitution, the sulfuric acid aqueous solution r is circulated. In the battery 41-3 of this embodiment, the sulfuric acid aqueous solution r is ejected through the dispersion nozzle 66 or 67 to the cathode cell 54 or the anode cell 55 to allow the powdered electrode A or B to be agitated. A trap or the like is used to insulate the pump from the electrolytic solution.

According to the three-dimensional battery 41-3 of this embodiment, the powdered lead dioxide A and the powdered metallic lead B as powdered electrodes are also agitated, thereby obtaining preferable contact between the powdered electrode A and the current collector 46, between the powdered electrode B and the current collector 47, or between the powdered electrodes A, B and the current collecting members 45. Therefore, a capacity of each of the cells 54, 55 (cell member 42: see FIG. 13) can be increased and a power can be correspondingly increased. In addition, the adhesion of lead sulfate particulars to the current collectors or the current collecting members can be prevented, lead plates can be employed as the current collectors 46, 47 and the current collecting members 45. Since the battery 41-3 is identical to the battery 41-2 of the third embodiment except the agitating means, the corresponding parts are referenced to by the same reference numerals and description thereof is omitted.

Fifth Embodiment

Figure 18:
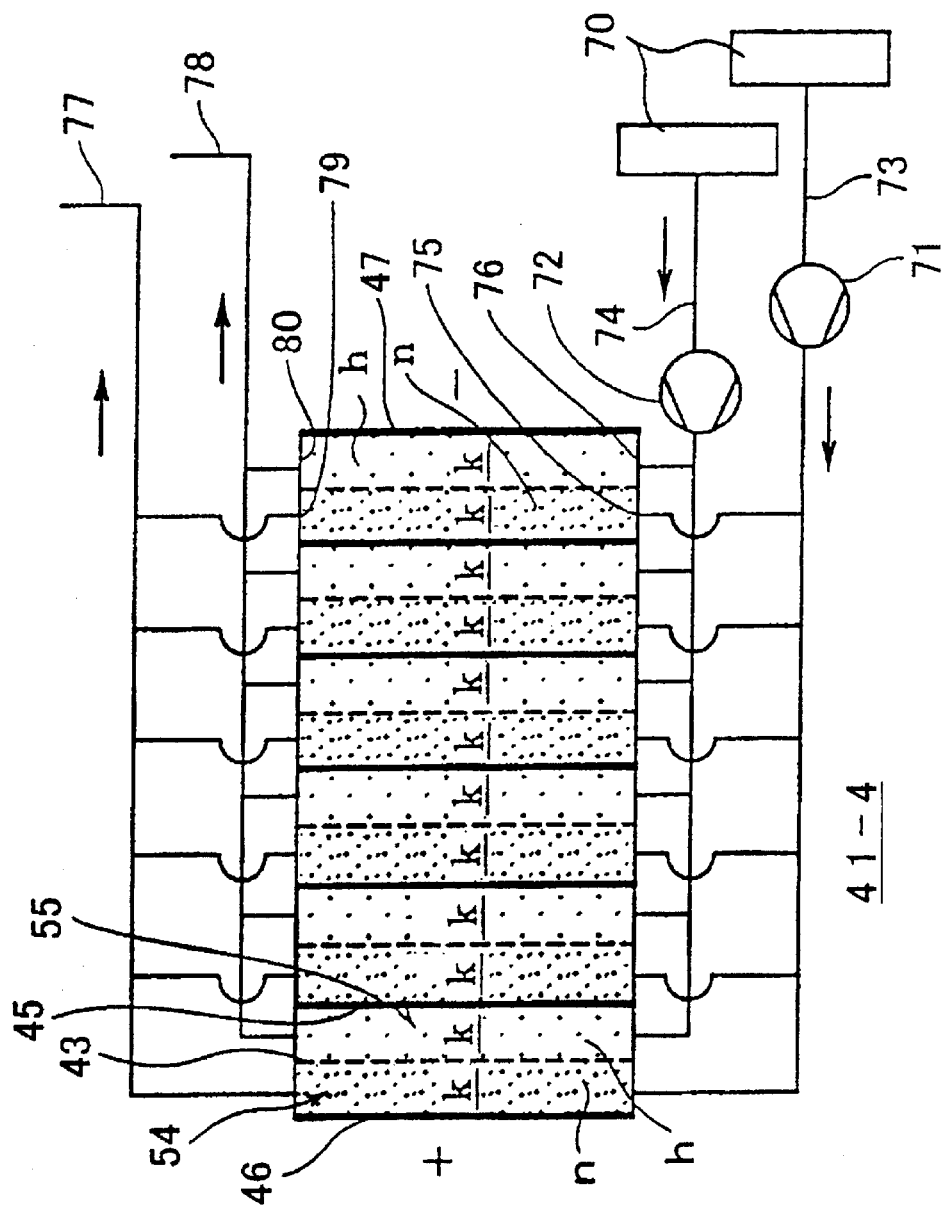
FIG. 18 is a central longitudinal sectional view schematically showing a layered-type three-dimensional battery according to a fifth embodiment of the second invention.

FIG. 18 is a central longitudinal sectional view schematically showing a layered-type three-dimensional battery according to a fifth embodiment of the second invention.

As shown in FIG. 18, a three-dimensional battery 41-4 of this embodiment is a lead storage battery having a structure similar to the structure of the fourth embodiment and provided with agitating means different from that of the battery 41-3 of the fourth embodiment. Specifically, the agitating means is adapted to feed an inert gas such as nitrogen and argon to the cathode cell 54 and the anode cell 55 such that the inert gas is fed from inert gas sources 70, through pipings 73, 74, blowers 71, 72, and dispersion nozzles 75, 76, and to a potassium hydroxide aqueous solution k, thereby agitating and fluidizing the powdered electrodes n, h. The inert gas such as nitrogen and argon fed to the cathode cell 54 and the anode cell 55 travel through pipings 77, 78 and filters 79, 80 and are opened in atmosphere and discharged.

The three-dimensional battery 41-4 of this embodiment is a nickel hydrogen three-dimensional secondary battery in which powdered nickel hydroxide n and powdered hydrogen-occluding alloy h are respectively put into the cathode cell 54 and the anode cell 55 and are suspended in the potassium hydroxide aqueous solution k as an electrolytic solution. Oxygen or air is employed as an agitating and fluidizing gas of the cathode cell 54 and hydrogen is employed as an agitating and fluidizing gas of the anode cell 55. Thereby, the following reaction is conducted. In the anode cell 55, hydrogen reacts with the hydrogen-occluding alloy h according to the following formula:

$$M+(x/2)H_2 \rightarrow MHx$$

At this time, when the battery is connected to the load means 57 (see FIG. 13), the hydrogen occluded in the powdered hydrogen-occluding alloy h reacts with a hydroxyl ion in the electrolytic solution k to discharge an electron and water as follows:

$$MHx+xOH^- \rightarrow M+xH_2O+xe^-$$

The discharged electron is collected to the anode current collector 47 and moves through the load means 57 (see FIG. 13) and to the cathode current collector 46. The electron moves to the powdered nickel oxyhydroxide n in the cathode cell 46, and reacts with water to be converted into nickel hydroxide and a hydroxyl ion according to the following formula:

$$NiOOH+H_2O+e^- \rightarrow Ni(OH)_2+OH^-$$

The hydroxyl ion permeates the separator 43 and moves to the anode cell 55, where it reacts with metal hydride and discharges an electron and water.

On the other hand, in the cathode cell 54, oxygen or air is fed and the following reaction is converted:

$$Ni(OH)_2+(\tfrac{1}{4})O_2 \rightarrow NiOOH+\tfrac{1}{2}H_2O$$

As a result, the reaction being conducted during charge according to the following formula generates NiOOH and power is generated:

$$Ni(OH)_2+OH^- \rightarrow NiOOH+H_2O+e^-$$

Sixth Embodiment

Figure 19:
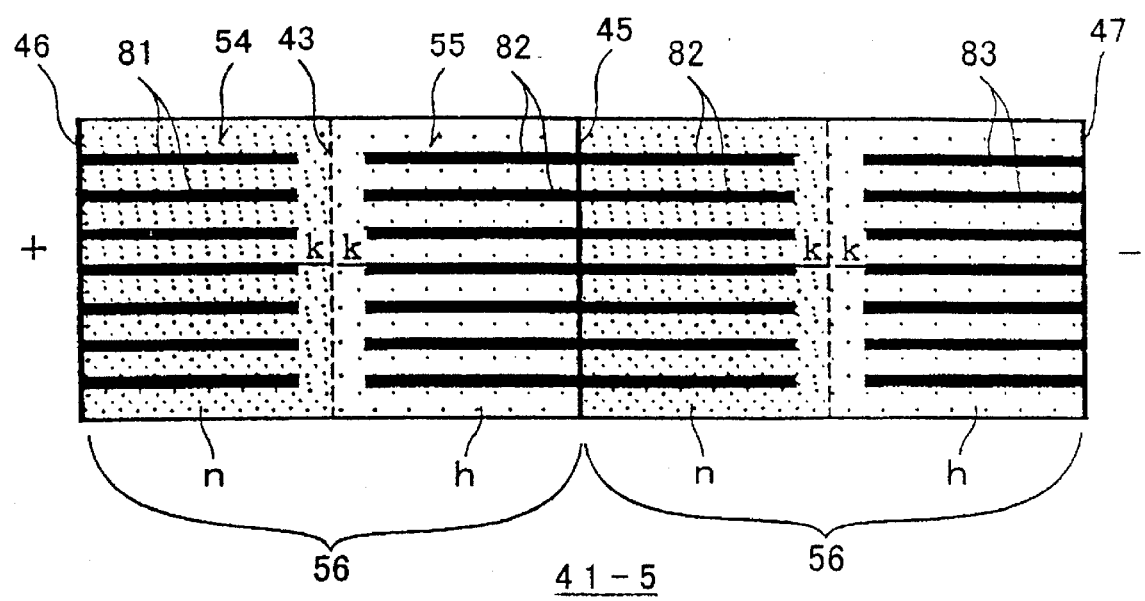
FIG. 19 is a central longitudinal sectional view schematically showing a layered-type three-dimensional battery according to a sixth embodiment of the second invention.

FIG. 19 is a central longitudinal sectional view schematically showing a layered-type three-dimensional battery according to a sixth embodiment of the second invention.

As shown in FIG. 19, a three-dimensional battery 41-5 of this embodiment is constituted by a nickel hydrogen secondary battery similarly to the first embodiment of FIG. 13. In the battery 41-5, capacities of the cathode cell 54 and the anode cell 55 are significantly increased. A number of studs 81, 82, 83 are provided protrusively from the current collectors 46, 47 and the current collecting member 45 toward the inside of the cathode cell 54 and the inside of the anode cell 55 such that these studs are spaced apart from one another. In this embodiment, since nickel plates are used as the current collectors 46, 47 and the current collecting member 45, the studs 81, 82, 83 integral with the current collectors and current collecting member are also constituted by the nickel plates. While in the battery 41-5 of this embodiment, the capacities of the cells 54, 55 are significantly increased, electricity (electrons and current) can be satisfactorily transmitted because the powdered electrodes n, h are reliably in contact with the current collectors 46, 47 and the current collecting member 45. The agitating means 59 or 60, 61 of the third embodiment or the fourth embodiment may be: combined into the battery 41-5 of this embodiment.

Alternative Embodiment

In addition to the embodiments of the three-dimensional battery of the second invention, the battery can be also embodied as described below.
1) Nickel hydroxide and cadmium, or nickel hydroxide and iron hydroxide may be used as the cathode powdered active material and the powdered anode active material instead of the above materials.
2) Two to six unit secondary batteries 56 are connected in series by means of the conductive (acid-resistant or alkali-resistant) conductive member 45 in the above-described embodiments, but any number of unit batteries may be connected in series according to a required voltage.
3.) The capacity of the battery can be adjusted by increasing the capacities of the cell members 42 according to a required power capacity and providing the agitating means or studs as necessary.

3. Embodiments of Third Invention

Subsequently, with regard to the embodiments of the third invention, equipment or device having a battery of three-dimensional structure (three-dimensional battery) as part of its structure and a function of chargeable/dischargeable power storage equipment, rotary equipment using a power stored in the three-dimensional battery as a power source, a mobile body using a power stored in the three-dimensional battery as a power source, power conveying means for supplying the power stored in the three-dimensional battery to another equipment, and equipment for converting the power stored in the three-dimensional battery into photo energy, kinetic energy or thermal energy, will be described below in detail.

[Equipment or Device Having Three-Dimensional Battery as Part of Its Structure and Function as Chargeable/Dischargeable Power Storage Equipment).

(Door)

In many cases, a door such as a door of a building or a door of automobile has a dual structure for thermal insulation and strength improvement but an inner space thereof is not efficiently utilized.

Accordingly, the inner space of the door is utilized as cells of a chargeable/dischargeable three-dimensional battery.

Specifically, the three-dimensional battery is charged with the above-described mechanism and the inner space of the door is utilized as a power storage.

When this embodiment is applied to the door of the building, the power stored in the three-dimensional battery in the door can be utilized as an emergency power supply if power supply is stopped due to a trouble caused by electric power failure of a commercial power supply. Also, when this embodiment is applied to the door of automobile, it is not necessary to additionally mount accumulator battery. Besides, a battery active material is mainly composed of metallic particulars and is therefore resistant to impact generated by collision in automobile accident. Further, the active material has sound absorbing ability and is soundproof.

Figure 20:
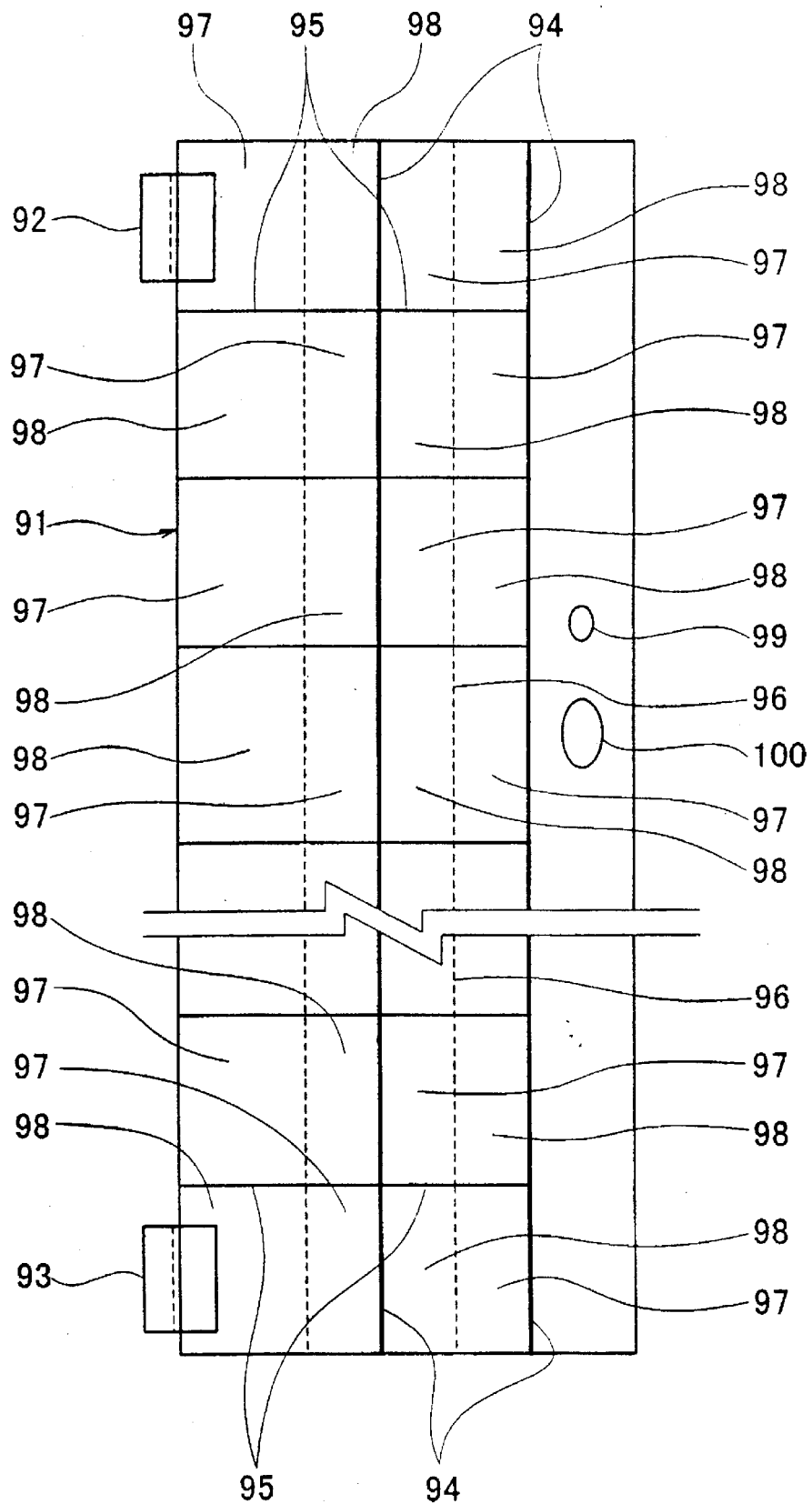
FIG. 20 is a longitudinal sectional view of a door having a chargeable/dischargeable three-dimensional battery in an inner space thereof.
Figure 2:
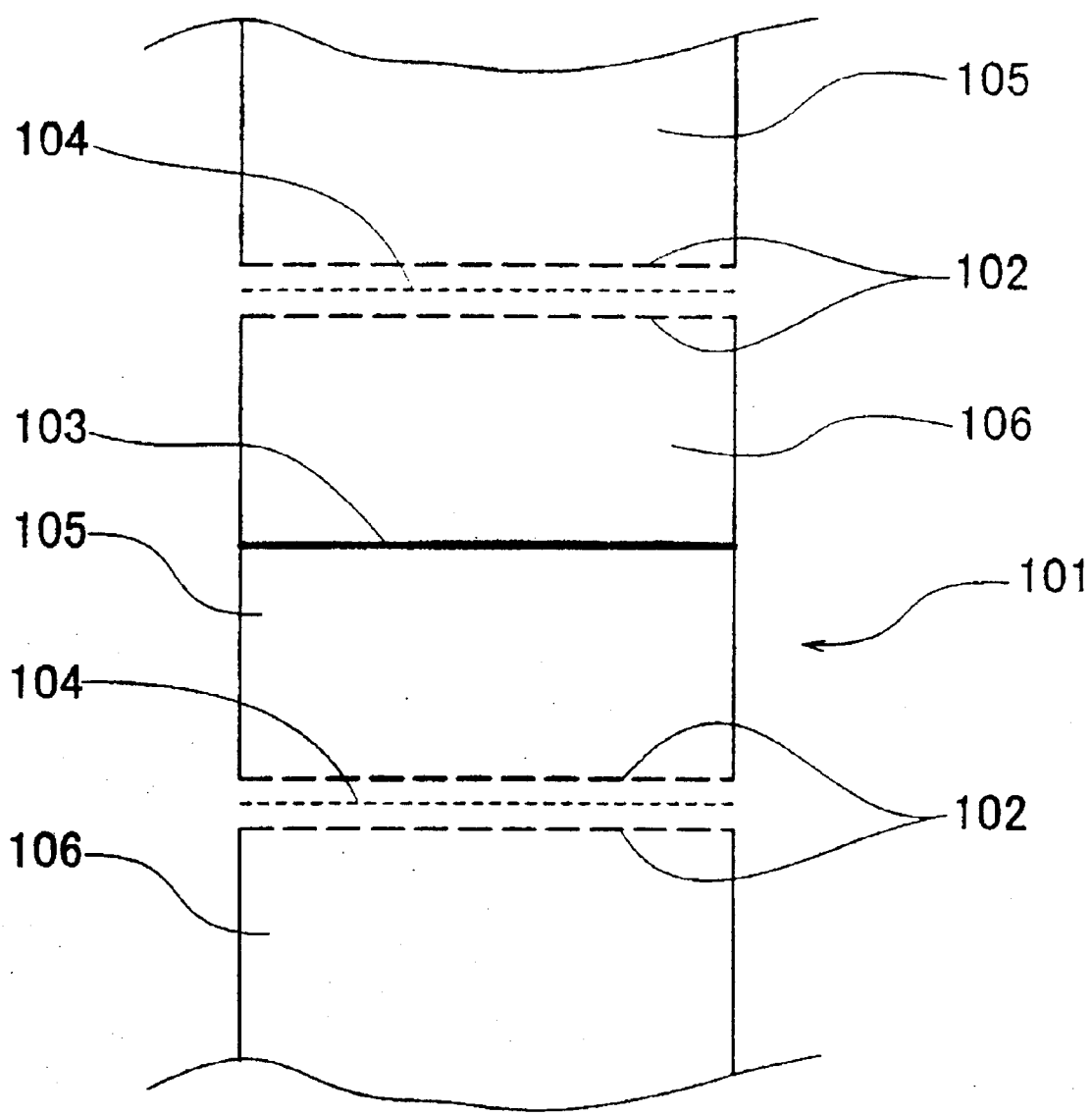

FIG. 20 is a longitudinal sectional view of a door having a chargeable/dischargeable three-dimensional battery in an inner space thereof. In FIG. 20, reference numeral 91 denotes a door housing, reference numeral 92 denotes a cathode terminal utilizing a hinge, reference numeral 93 denotes an anode terminal utilizing a hinge, and reference numeral 94 denotes conductive current collecting members. A plurality of cells are defined by the current collecting members 94 and non-conductive separators 95. Each of the cells is divided into two parts by an ion-permeable separator 96. One cell of the divided cells is filled with the cathode powdered active material and an electrolytic solution 97 and the other cell of the divided cells is filled with the anode powdered active material and an electrolytic solution 98. Reference numeral 99 denotes a key device and reference numeral 100 denotes a knob.

(Bridge Pier)

In general, bridge piers are made of steel or concrete, and the bridge piers made of steel have a hollow structure. However, hollow inner spaces thereof are not efficiently utilized.

Accordingly, the inner space of the hollow and steel-made bridge pier is utilized as cells of a chargeable/dischargeable three-dimensional battery.

Specifically, the three-dimensional battery is charged with the above-described mechanism and the inner space of the bridge pier is utilized as a power storage.

A bridge pier hollow portion is filled with powdered iron as an active material so as to be resistant to buckling breakdown. For example, in a case where there is ocean near the bridge pier, a power generated by utilizing ocean temperature difference or a power generated by utilizing tidal current can be stored, or a power generated by utilizing wind power can be stored.

FIG. 21 is a longitudinal sectional view of a bridge pier having a chargeable/dischargeable three-dimensional battery in an inner space thereof. In FIG. 21, reference numeral 101 denotes a bridge pier block, reference numeral 102 denotes branch flanges, reference numeral 103 denotes a conductive current collecting member. Each cell defined by the current collecting member 103 is divided into two parts by an ion-permeable separator 104. One cell of the divided cells is filled with the cathode powdered active material and an electrolytic solution 105 and the other cell of the divided cells is filled with the anode powdered active material and an electrolytic solution 106.

For example, consider the following case. A bridge grider is constituted by four bridge piers having cumulated 80 blocks of 20 m square and 5 m height. A bridge pier block 101 is made of iron alloy and the inside thereof is nickel-plated. The separator 104 is made of a material having non-conductivity and high strength such as metal oxide sinter. An active material of a mixture of powdered nickel hydroxide and powdered metallic nickel is used as the cathode powdered active material, an active material of a mixture of powdered iron hydroxide and powdered metallic nickel is used as the anode powdered active material, and a 6 normal potassium hydroxide solution is used as an electrolytic solution. Under the above-described conditions, a power of 70 billion kWhr can be stored. This power is equivalent to a commercial power for about one month which is used in Japan.

(Dam)

In general, a dam is a huge structure having a filling structure and made of concrete. Nevertheless, in actuality, its enormous volume is utilized exclusively as means for converting a positional energy of water into a power.

Accordingly, an outer shell of the dam is employed as a steel-made dam and an inner space thereof is employed as huge cells of the chargeable/dischargeable three-dimensional battery.

In other words, in addition to utilization as equipment for covering the positional energy of water into the power, the dam is utilized in such a manner that the three-dimensional battery is charged with the above-described mechanism and its inner space of the dam is a power storage.

As a result, a power storage efficiency becomes as high as 95% although a hoisting water power generation efficiency is 60%.

Figure 22:
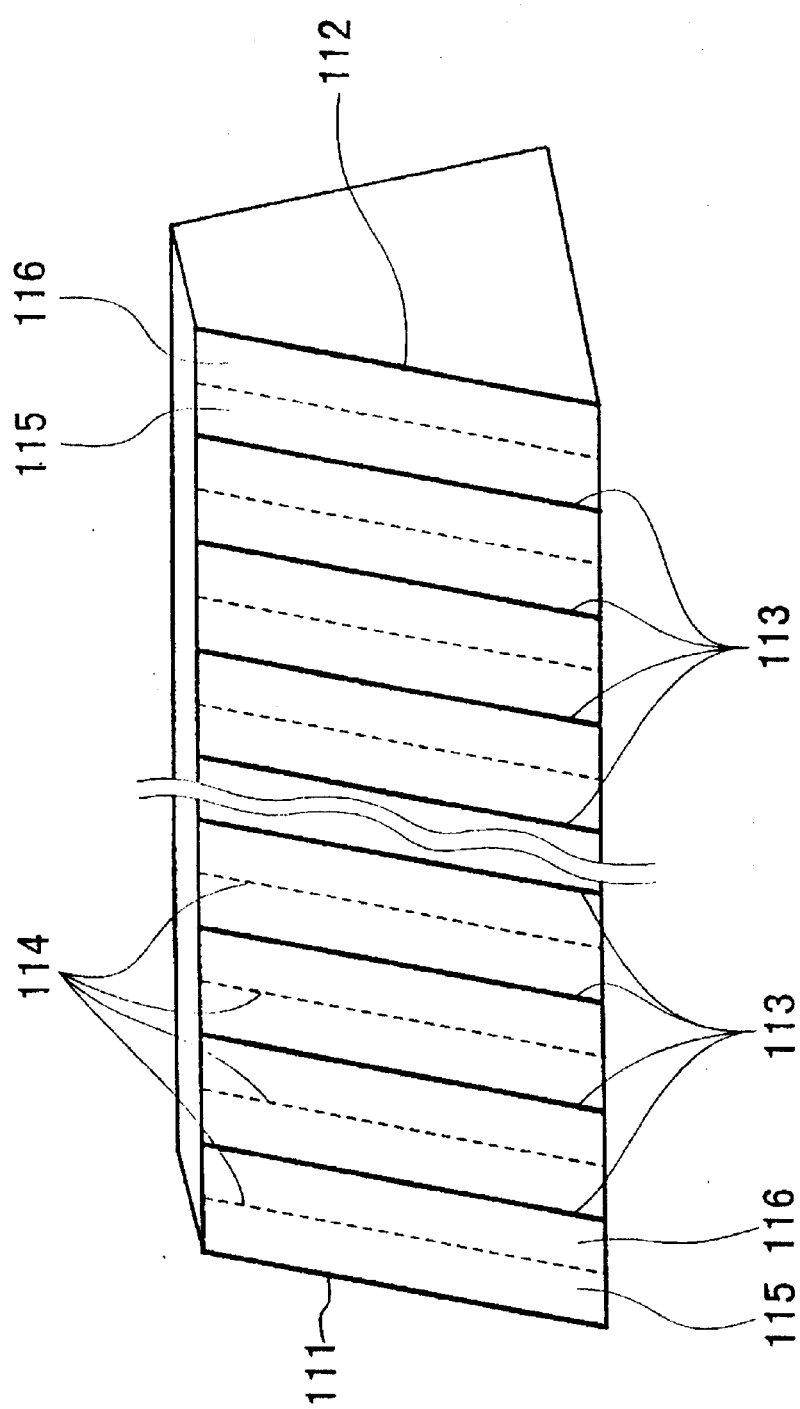
FIG. 22 is a perspective view of a dam having a chargeable/dischargeable three-dimensional battery in an inner space thereof.

FIG. 22 is a perspective view of a dam having a chargeable/dischargeable three-dimensional battery in an inner space thereof. In FIG. 22, reference numeral 111 denotes a cathode current collector, reference numeral 112 denotes an anode current collector, and reference numeral 113 denotes conductive current collecting members. Each cell defined by the current collecting members 113 is divided into two parts by an ion-permeable separator 114. A cell portion of the divided cells and close to the cathode current collector is filled with the cathode powdered active material and an electrolytic solution 115 and a cell portion of the divided cells and close to the anode current collector is filled with the anode powdered active material and an electrolytic solution 116.

(Radiator)

In a liquid-cooling type radiator, water or oil is used as a cooling medium. It is difficult to convert the cooling medium into a fuel or the like, and the cooling medium is employed exclusively as a coolant.

Accordingly, the radiator is constituted by a chargeable/dischargeable three-dimensional battery and the electrolytic solution is used as the cooling medium.

Specifically, heat necessary for charge/discharge of the battery is received via the electrolytic solution and the radiator is used as the power storage.

As a result, it becomes unnecessary to mount the accumulator battery in automobile and power storage efficiency of the battery is improved. In particular, the reaction speed of the battery at a low ambient temperature is accelerated by heating the electrolytic solution.

Figure 23:
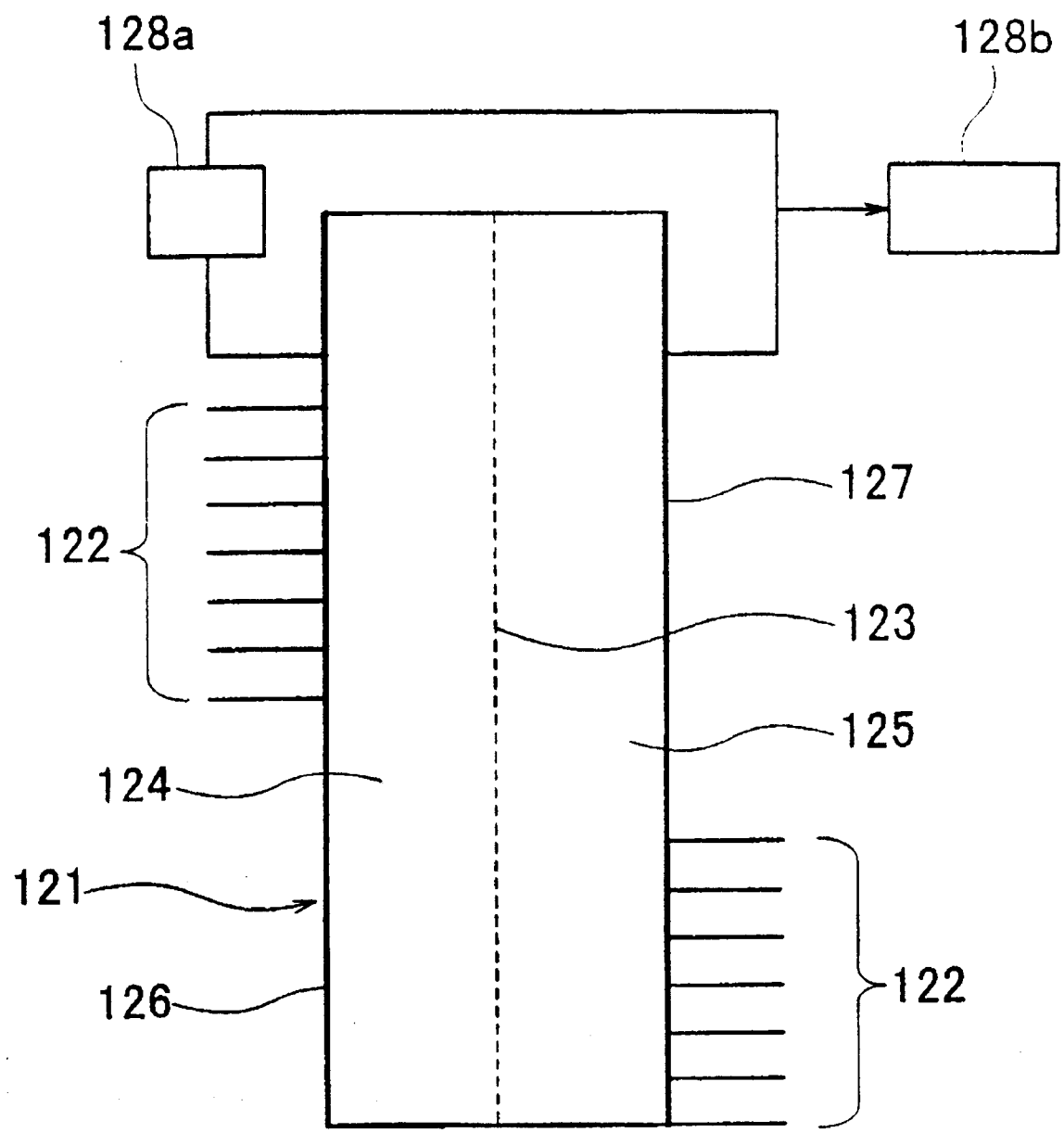
FIG. 23 is a schematic view showing a structure of a radiator as a power storage.

FIG. 23 is a view schematically showing a structure of the radiator as a power storage. In FIG. 23, reference numeral 121 denotes a radiator body and reference numeral 122 denotes fins. The radiator body 121 is divided into two parts by an ion-permeable separator 123. One side of the divided radiator is filled with the cathode powdered active material and an electrolytic solution 124 and the other side of the divided radiator is filled with the anode powdered active material and an electrolytic solution 125. Reference numeral 126 denotes a cathode current collector and reference numeral 127 denotes an anode current collector. Reference numerals 128a, 128b denote active material separation filters for recovering the active material and the active material separation filter 128b is connected to a heat source. Heat is transmitted to the radiator body 121 from the heat source.

(Roof)

Roof tiles, thatches, ceramics, or the like, which are heat insulative and water repellent are employed in roofs of general houses. The roof itself has no energy conversion function and a large space between the roof and a ceiling is wasted.

Accordingly, the space between the roof and the ceiling is utilized to form a chargeable/dischargeable three-dimensional battery.

Specifically, instead of soil filled into an attic as a heat insulating material and weight, powdered active materials of the three-dimensional battery are filled into the attic to be utilized as a power storage.

For example, if a power generated by a solar battery cell installed on the roof or by wind power generation is stored in the three-dimensional battery and the three-dimensional battery is configured to have a heat exchange function, then, in summer, an indoor warm air is suctioned to be utilized in a battery reaction of the three-dimensional battery, and in winter, heat generated as the result of the battery reaction of the three-dimensional battery is discharged indoors. Thereby, in summer, it is cool indoors and in winter, it is warm indoors. The three-dimensional battery can be used as air-conditioning equipment as well as a power storage. In addition, when the three-dimensional battery having the heat exchange function is installed in a ceiling portion of automobile, the same air-conditioning effect is obtained.

Figure 24:
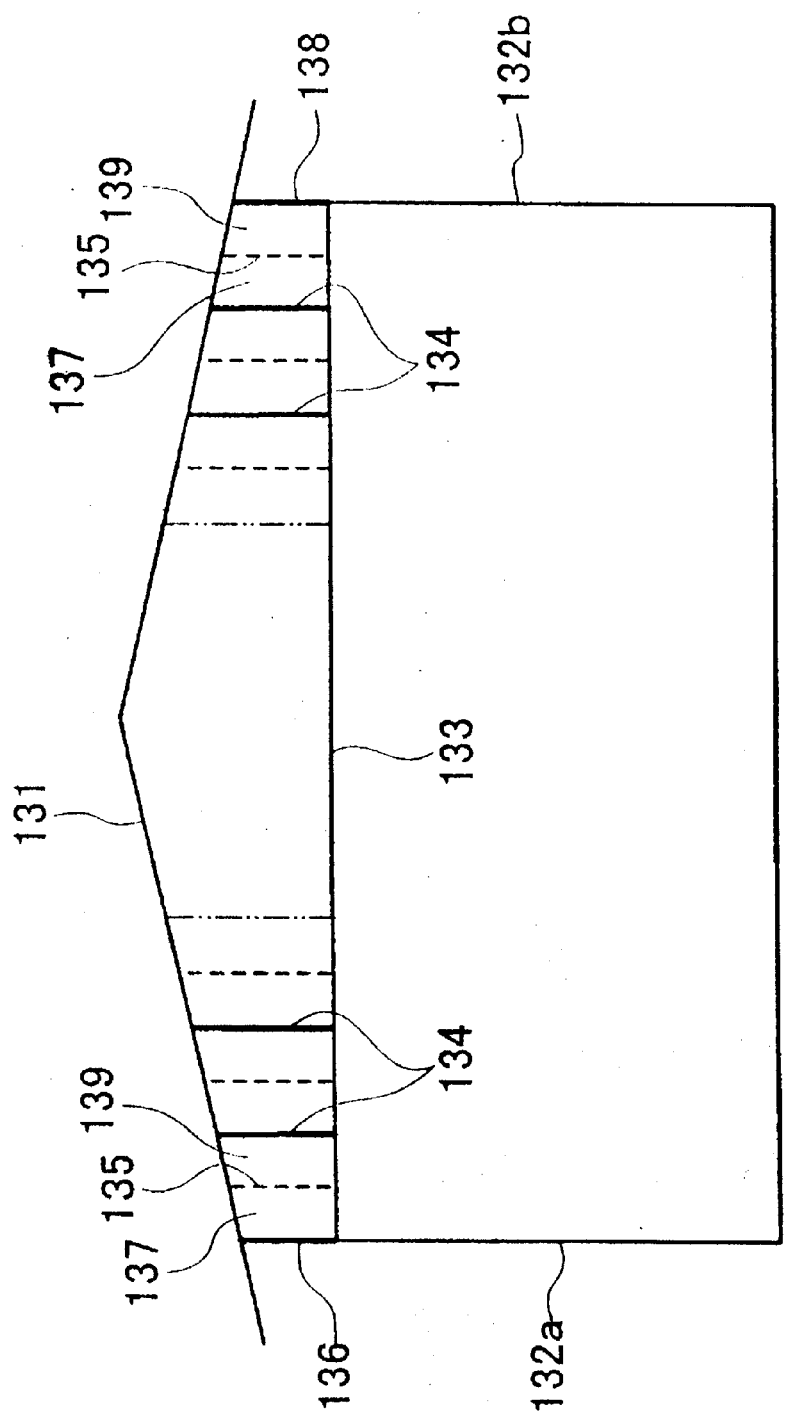
FIG. 24 is a longitudinal sectional view showing a house having a chargeable/dischargeable three-dimensional battery in a ceiling portion.
Figure 2:
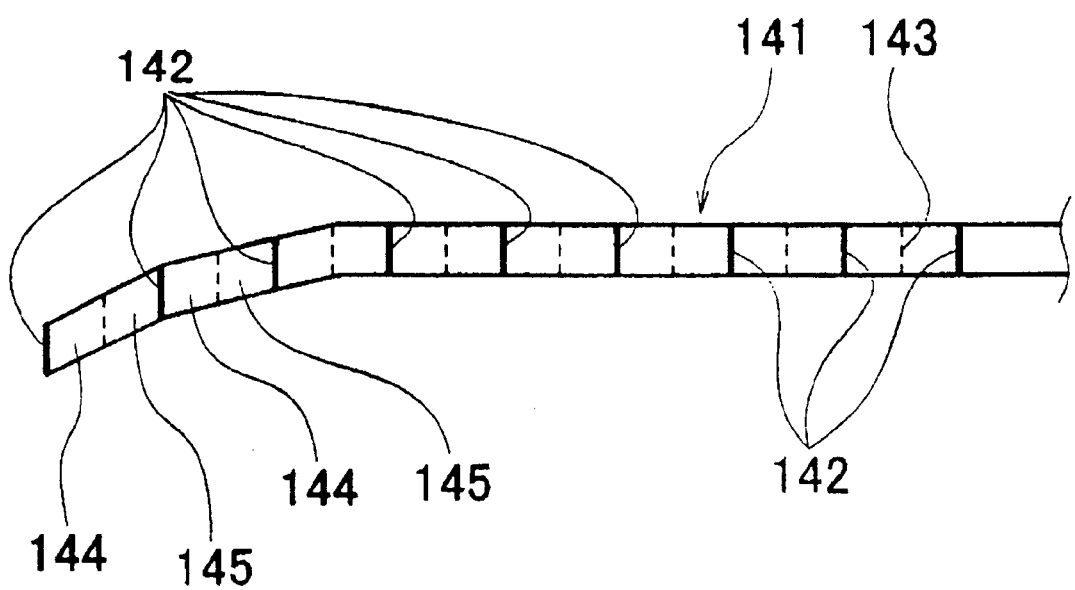

FIG. 24 is a longitudinal sectional view showing a house having a chargeable/dischargeable three-dimensional battery in a ceiling portion. In FIG. 24, reference numeral 131 denotes a roof, reference numerals 132a, 132b denote walls. A plurality of current collecting members 134 are placed from the one wall 132a to the other wall 132b in the ceiling portion surrounded by the roof 131, the walls 132a, 132b, and a beam 133. Each cell defined by the current collecting members 134 is divided into two parts by an ion-permeable separator 135. A cell portion of the divided cells and close to a cathode current collector 136 is filled with the cathode powdered active material and an electrolytic solution 137 and a cell portion of the divided cells and close to an anode current collector 138 is filled with the a node powdered active material and an electrolytic solution 139.

[Automobile Bonnet and Trunk Cover]

A bonnet and a trunk cover of automobile are used as a cover for an engine and other components and a reinforcement member, but its inner surface portion is not utilized.

Accordingly, the bonnet or the trunk cover is utilized as a casing of the three-dimensional battery and a chargeable/dischargeable three-dimensional battery is formed on an inner surface side of the bonnet or the trunk cover.

Specifically, the bonnet or the trunk cover is configured to have a battery function.

As a result, the accumulator battery mounted in the bonnet becomes unnecessary. Further, the three-dimensional battery functions as the reinforcement member and the strength of the bonnet or the trunk cover is increased.

FIG. 25 is a cross-sectional view showing part of the bonnet having a chargeable/dischargeable three-dimensional battery on the inner surface side. In FIG. 25, reference numeral 141 denotes a bonnet and reference numeral 142 denotes conductive current collecting members. Each cell defined by the current collecting members 142 is divided into two parts by an ion-permeable separator 143. One of the divided cells is filled with the cathode powdered active material and an electrolytic solution 144 and the other of the divided cells is filled with the anode powdered active material and an electrolytic solution 145.

(Road)

In general, a road is constructed of an underlayer roadbed, an upperlayer roadbed on the underlayer roadbed, and a surface layer portion paved with asphalt. In actuality, the roadbeds are employed exclusively as a base of the road.

Accordingly, a material of the roadbed generally used is replaced by powdered active materials and a chargeable/dischargeable three-dimensional battery is formed around a ground surface.

Specifically, the three-dimensional battery is charged with the above-described mechanism and a great amount of power is stored in the road.

As a result, freezing of the road can be prevented by heat generated resulting from a battery reaction. In addition, the recovery of the powdered active materials makes the material of the roadbed recyclable.

Figure 26:
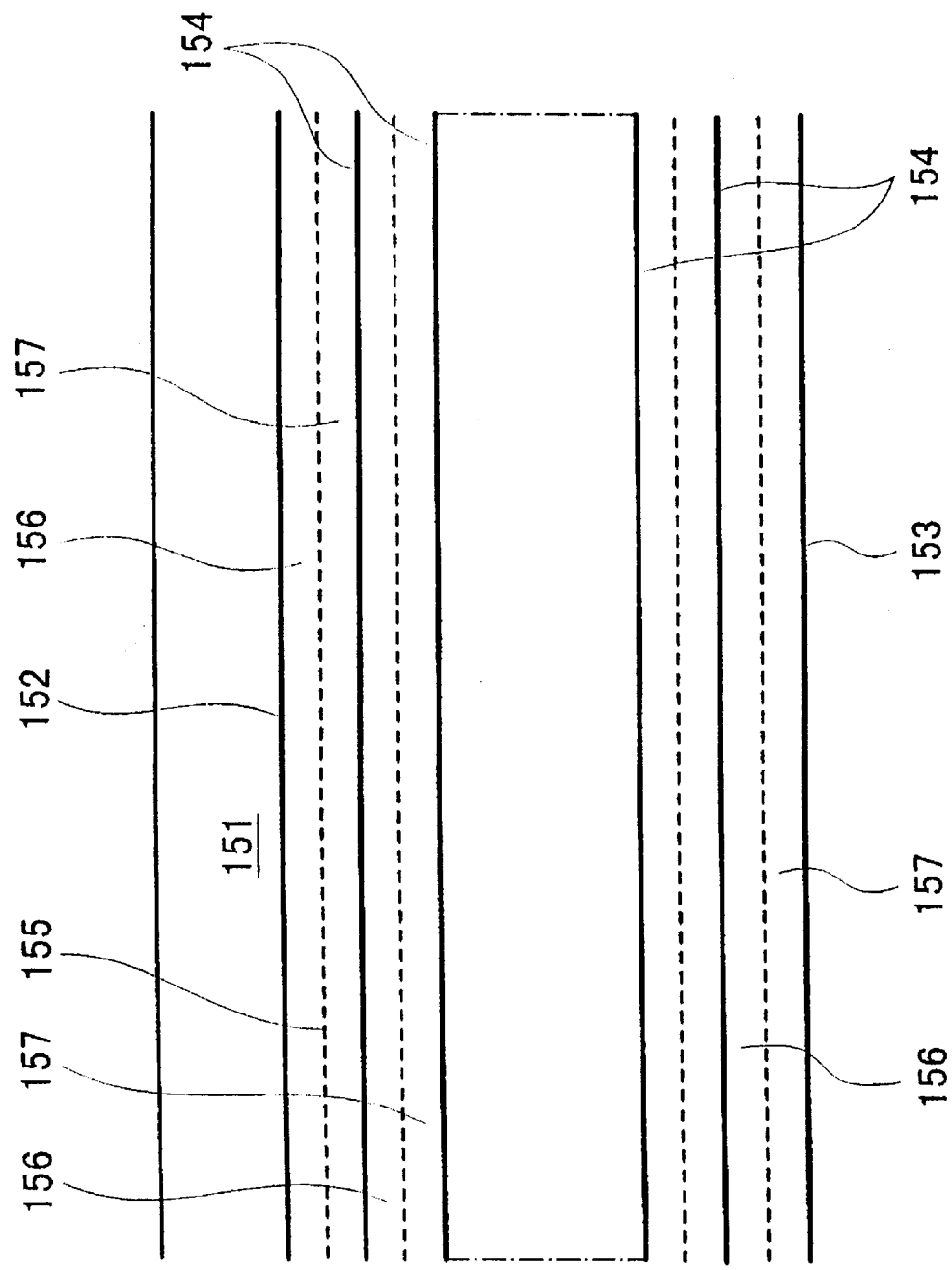
FIG. 26 is a cross-sectional view showing a vicinity of a ground surface in which a chargeable/dischargeable three-dimensional battery is formed.

FIG. 26 is a cross-sectional view showing a vicinity of a ground surface in which the chargeable/dischargeable three-dimensional battery is formed. In FIG. 26, reference numeral 151 denotes an asphalt pavement, reference numeral 152 denotes a cathode current collector, reference numeral 153 denotes an anode current collector, and reference numeral 154 denotes the conductive current collecting members. Each cell defined by the current collecting members 154 is divided into two parts by an ion-permeable separator 155. A cell portion of the divided cells and close to the cathode current collector is filled with the cathode powdered active material and an electrolytic solution 156 and a cell portion of the divided cells and close to the anode current collector is filled with the anode powdered active material and an electrolytic solution 157.

(Tableware)

In general, heat-insulating pottery or metallic tableware of a dual structure is used as heat-retentive tableware. However, because the tableware is highly heat-insulating and has a large heat capacity, it is necessary to heat or cool the tableware according to temperature of food therein for preferable heat retention before the food is put in the tableware.

Accordingly, the tableware is configured to have a bottom or side portion of a dual structure, and an inner space of the dual structure is utilized to form a chargeable/dischargeable three-dimensional battery and a heat generating element or a cooling element is embedded in the inner space.

Specifically, by using a power stored in the three-dimensional battery as a power supply, the heat generating element or the cooling element is activated, thereby allowing warm hood to be kept heated and cold food to be kept cooled.

As a result, it is not necessary to heat the tableware before the warm food is put therein and therefore, the food does not become cold. Likewise, it is not necessary to cool the tableware before the cold food is put therein and, therefore, the food does not become warm.

Figure 27:
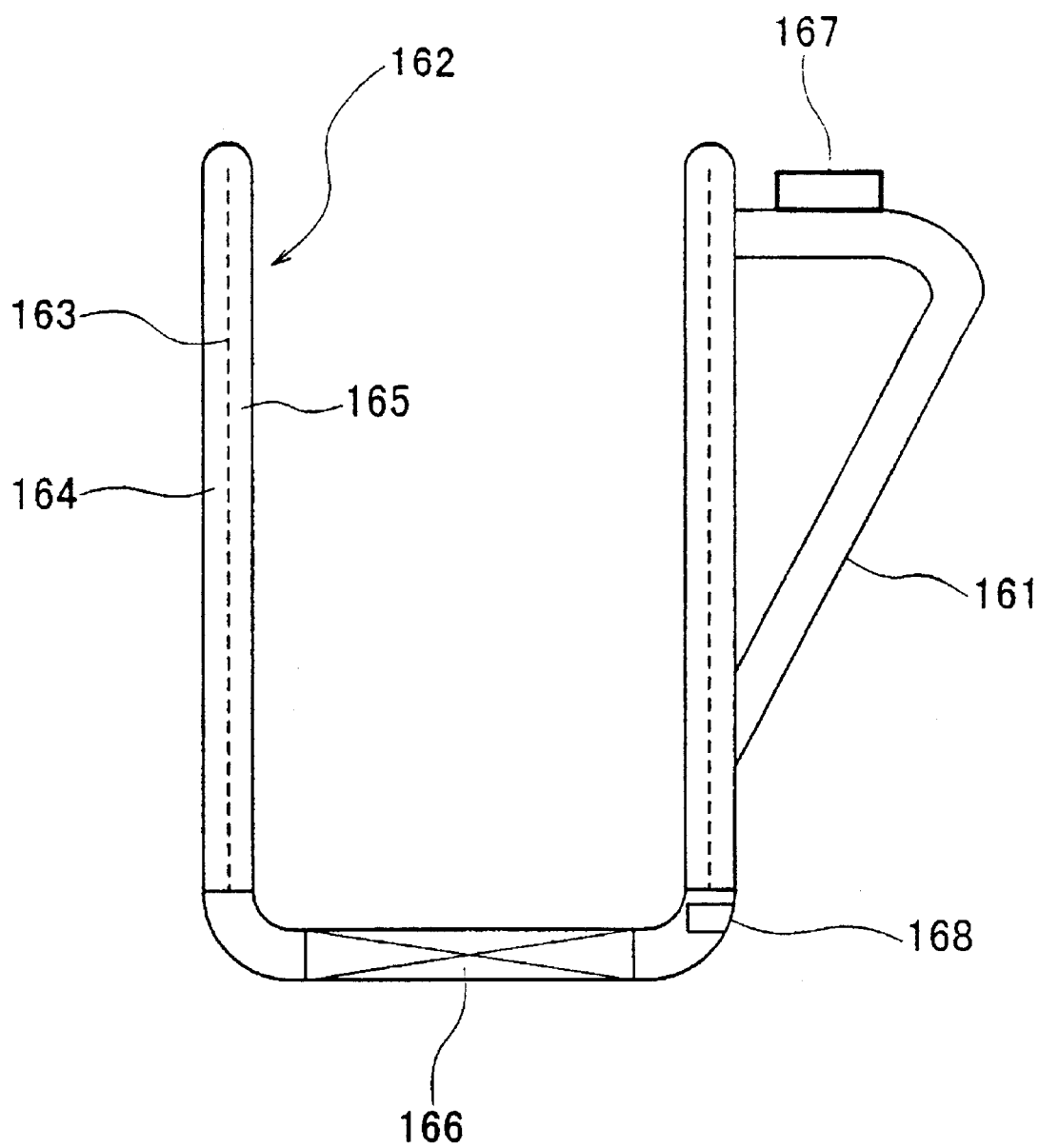
FIG. 27 is a longitudinal sectional view of a tableware having a chargeable/dischargeable three-dimensional battery in a side portion thereof.

FIG. 27 is a longitudinal sectional view of a tableware having a chargeable/dischargeable three-dimensional battery in a side portion thereof. In FIG. 27, reference numeral 161 denotes a handle of the tableware. A tableware body 162 is dual-structured and has an inner space. The inner space of the side portion of the tableware body 162 is divided into two parts by an ion-permeable separator 163. One of the divided spaces is filled with the cathode powdered active material and an electrolytic solution 164 and the other of the divided spaces is filled with the anode powdered active material and an electrolytic solution 165. A heat generating element (or cooling element) 166 is embedded in the bottom portion of the tableware. Reference numeral 167 denotes a power supply switch and reference numeral 168 denotes a charging jack. The above-structured three-dimensional battery of the tableware side portion is charged from the charging jack 168i and the power supply switch 167 is turned on when the food is put in the tableware to cause the heat generating element (or cooling element) 166 to be activated by power charged in the three-dimensional battery of the side portion. Thereby, the food in the tableware is kept heated or cooled.

[Balance Weight]

A hoisting machine such as a power shovel, forklift, and a crane is generally provided with a balance weight as an essential attachment for the purpose of keeping the balance between the machine and heavy load to be handled. The balance weight is chunk of metal and is exclusively utilized to balance the weight.

Accordingly, a cathode current collector and an anode current collector are provided in the balance weight. An ion-permeable separator is interposed between the cathode current collector and the anode current collector. A chargeable/dischargeable three-dimensional battery is formed in such a manner that a cathode powdered active material and an electrolytic solution are filled between the cathode current collector and the ion-permeable separator and an anode powdered active material and an electrolytic solution are filled between the anode current collector and the ion-permeable separator.

That is, the balance weight is utilized not only as a weight but as a power storage.

As a result, the power of the three-dimensional battery built in the balance weight can be utilized as an activation power supply of the hoisting machine such as the power shovel, the forklift, and the crane.

(Floor)

In some houses, underfloor spaces are utilized as indoor heating sources by flowing high-temperature combustion exhaust gas thereunder or installing electric heaters thereunder. However, the resulting heat is difficult to utilize for cooling, and therefore, a space under the floor is not efficiently utilized.

Accordingly, a chargeable/dischargeable three-dimensional battery is formed in the underfloor space.

Specifically, the underfloor space serves as a power storage and one of electrodes releases heat and the other electrode absorbs heat during charge/discharge, which is utilized for indoor heating/cooling.

Thus, the released/absorbed heat of the battery is directly utilized as the power supply for cooling/heating. Consequently, an energy conversion efficiency is improved as compared to general air-conditioning equipment that utilizes evaporation heat or radiation heat associated with expansion/compression of a compressive heat transmission medium.

Figure 28:
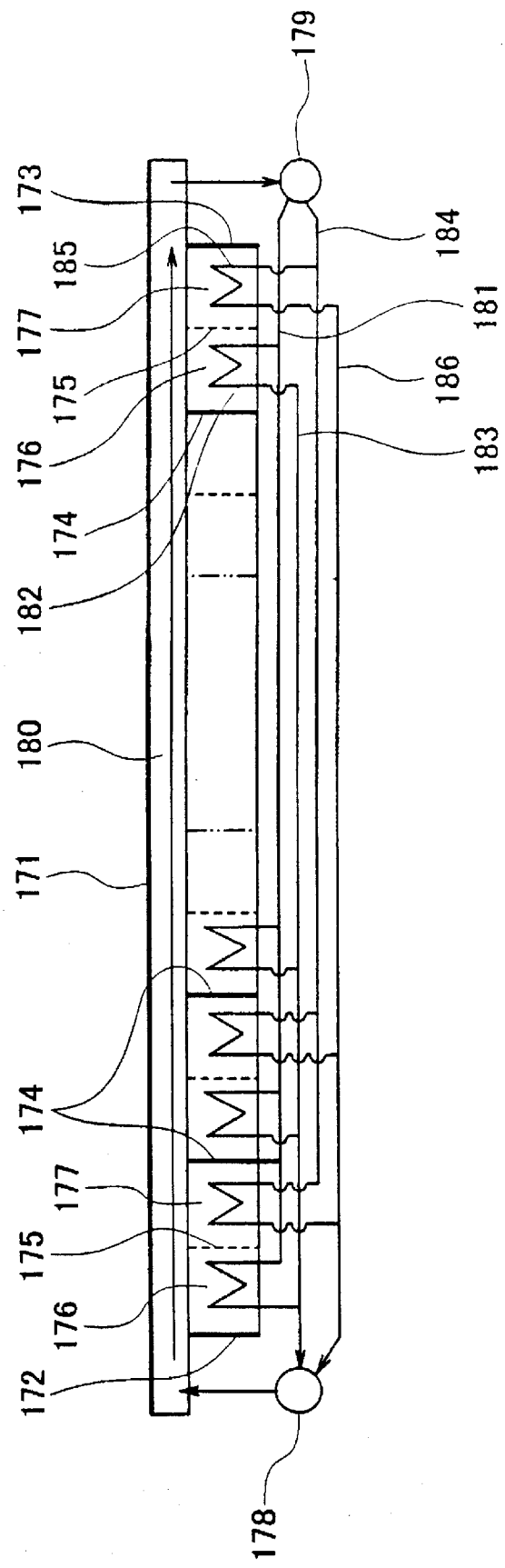
FIG. 28 is a cross-sectional view showing a floor of a house having a chargeable/dischargeable three-dimensional battery.

FIG. 28 is a cross-sectional view showing a floor of a house having a chargeable/dischargeable three dimensional battery. In FIG. 28, reference numeral 171 denotes a floor, reference numeral 172 denotes a cathode, reference numeral 173 denotes an anode, and reference numeral 174 denotes conductive current collecting members. Each cell defined by current collecting members 174 provided from the cathode toward the anode is divided into two parts by an ion-permeable separator 175. A cell portion of the divided cells and close to the cathode is filled with the cathode powdered active material and an electrolytic solution 176 and a cell portion of the divided cells and close to the anode is filled with the anode powdered active material and an electrolytic solution 177. Reference numeral 178 denotes a heat medium supply cooling/heating switching device and reference numeral 179 denotes a heat medium collecting cooling/heating switching device. The heat medium flowing through a heat medium circulation space 180 under the floor from the heat medium supply cooling/heating switching device 178 is collected into the heat medium collecting cooling/heating switching device 179 and is supplied to the cathode cell inner heat exchanger 182 through a cathode heat exchanger heat medium supply pipe 181. Then, the heat medium flows through the cathode heat exchanger heat medium discharge pipe 183 and reaches the heat medium supply cooling/heating switching device 178. The heat medium collected into the heat medium collecting cooling/heating switching device 179 is supplied to an anode cell inner heat exchanger 185 through an anode heat exchanger heat medium supply pipe 184. Then, the heat medium flows through an anode heat exchanger heat medium discharge pipe 186 and reaches the heat medium supply cooling/heating switching device 178. The heat medium supply cooling/heating switching device 178 and the heat medium collecting cooling/heating switching device 179 are switched to cooling/heating, to allow chemical reaction heat resulting from the battery reaction during charge/discharge to be utilized as a cooling source or a heating source.

(Bed)

In general, beds are heat insulating, and are warm in winter but are hot in summer.

Accordingly, a chargeable/dischargeable three-dimensional battery is formed in the bed by utilizing a portion under a bed surface into which elasticity means such as a spring body is provided.

Specifically, the bed serves as a power storage. Since one electrode releases heat and the other electrode absorbs heat during charge/discharge, the releasing reaction is utilized for heating and the absorbing reaction is utilized for cooling.

Thus, the released/absorbed heat of the battery is directly utilized as the power supply for cooling/heating. Consequently, an energy conversion efficiency is improved as compared to general air-conditioning equipment that utilizes evaporation heat or radiation heat associated with expansion/compression of a compressive heat transmitter medium.

A specific illustration is similar to that of FIG. 28, and is therefore omitted (the floor 171 may be assumed to be a bed surface).

(Construction Power Supply)

In a place where a commercial power supply is unavailable, an engine electric generator is employed as a type of construction power supply, but environmental pollution such as noises or exhaust gases arise.

Accordingly, a chargeable/dischargeable three-dimensional battery is mounted in a vehicle and installed in a construction site. Under construction, the power is supplied from the three-dimensional battery when necessary.

Thus, power supply means that makes little noises and exhausts little gases can be provided. This is very effective particularly when the construction power supply is required in a closed space such as a house-packed place or a tunnel.

Figure 29:
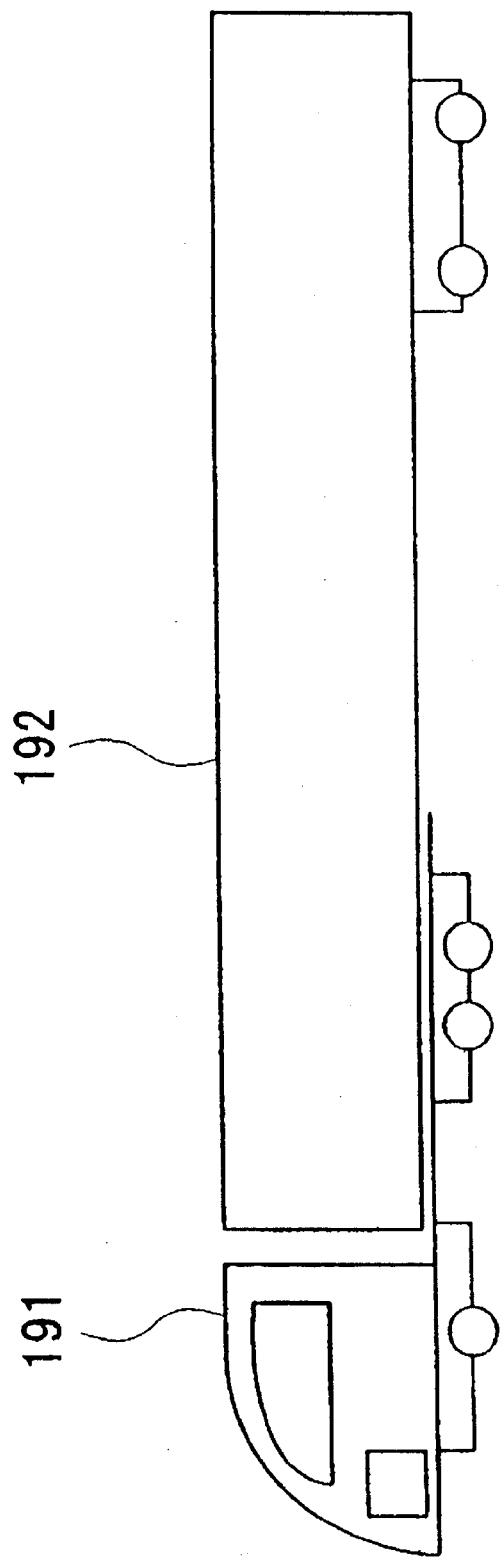
FIG. 29 is a side view showing a trailer in which a chargeable/dischargeable three-dimensional battery is mounted.

FIG. 29 is a side view showing a trailer in which a chargeable/dischargeable three-dimensional battery is mounted. In FIG. 29, reference numeral 191 denotes a power car and reference numeral 192 denotes a trailer in which the three-dimensional battery is mounted.

[Rotary Equipment Using Power Stored in Three-Dimensional Battery as Power Source]

(Electric Motor)

In general, an electric motor has a drawback that the electric motor is not activated unless the power is supplied from an external power supply and a current more than a rated value flows when being activated.

Accordingly, a chargeable/dischargeable three-dimensional battery is formed by using a casing or a seat of the electric motor as a battery housing.

Specifically, a power storage device is included in the electric motor. Thereby, the electric motor can be activated without supplying the power from the external power supply.

Thus, incorporating of the battery into the electric motor can reduce a volume of the whole device. At activation, since the power is supplied from the three-dimensional battery as well as the external power supply, large feeding equipment becomes unnecessary and a usage amount of the external power can be suppressed. In a normal drive state of the electric motor, the external power can be dispensed with by using only the three-dimensional battery to supply the power, while at power electric failure, the electric motor is activated by using the battery.

Figure 30:
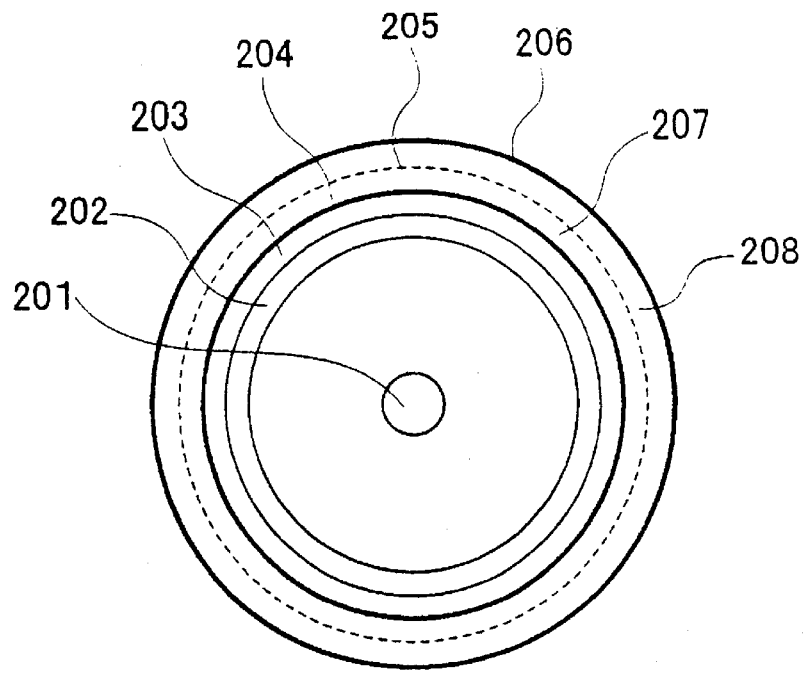
FIG. 30(a) is a longitudinal sectional view showing an electric motor in which a chargeable/dischargeable three-dimensional battery is built in a casing and FIG. 30(b) is a longitudinal sectional view showing an electric motor in which a chargeable/dischargeable three-dimensional battery is built in a base portion thereof.
Figure 30:
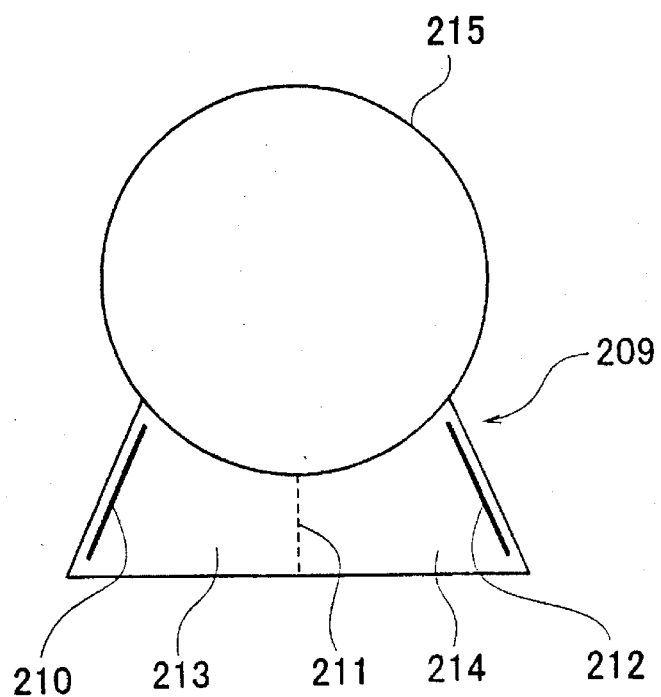

FIG. 30(*a*) is a longitudinal sectional view showing an electric motor in which the chargeable/dischargeable three-dimensional battery is built in the casing. In FIG. 30(*a*), reference numeral 201 denotes a rotational shaft, reference numeral 202 denotes a rotator, reference numeral 203 denotes a magnetic coil, reference numeral 204 denotes a cathode current collector, reference numeral 205 denotes an ion-permeable separator, and reference numeral 206 denotes an anode current collector. A cathode powdered active material and an electrolytic solution 207 are filled between the cathode current collector 204 and the ion-permeable separator 205 and an anode powder ed active material and an electrolytic solution 208 are filled between the anode current collector 206 and the ion-permeable separator 205. While one battery is illustrated in FIG. 30(*a*), a high voltage can be obtained by laminating batteries in the circumferential direction thereof or in the longitudinal direction of its axis. are laminated in the longitudinal direction of its axis, then a volume efficiency of the electric motor can be improved.

FIG. 30(*b*) is a longitudinal sectional view showing an electric motor in which a chargeable/dischargeable three-dimensional battery is built in a base portion thereof. In FIG. 30(*b*), reference numeral 209 denotes a base portion of an electric motor 215, reference numeral 210 denotes a cathode current collector, reference numeral 211 denotes an ion-permeable separator, and reference numeral 212 denotes an anode current collector. A cathode powdered active material and an electrolytic solution 213 are filled in a portion between the cathode current collector 210 and the separator 211 and an anode powdered active material and an electrolytic solution 214 are filled between the anode current collector 212 and the separator 211.

If the three-dimensional battery of the present invention is adopted in appliance activated by a small-sized electric motor, for example, a portable tape recorder, then a space of a battery currently used can be saved, and the electric motor is made slightly larger. Therefore, the entire portable tape recorder can be made small. If the three-dimensional battery of the present invention is employed in a large-sized electric motor, then a large current required at activation of the electric motor can be also supplied from the three-dimensional battery. Consequently, a voluminous power supply device required only at the activation can be dispensed with, and the amount of usage of an external power can be significantly reduced.

(Engine)

In general, a jacket for circulating a cooling medium is provided in a casing of an engine such as a reciprocal engine or a turbo engine. An electric motor is necessary to start the engine and a power must be supplied from an external power supply to activate the electric motor.

Accordingly, a chargeable/dischargeable three-dimensional battery is formed by utilizing a casing of the engine as a battery housing.

Specifically, the casing serving as the battery absorbs heat of the engine and efficiently converts the heat into a power and the power is stored in outside of the engine casing.

Since the engine thus has a storing function, the external power supply can be dispensed with. In addition, since the heat of the engine is utilized to store the power, the heat energy which has been conventionally discarded externally can be converted into the electric energy and stored. Consequently, the energy efficiency can be improved.

Figure 31:
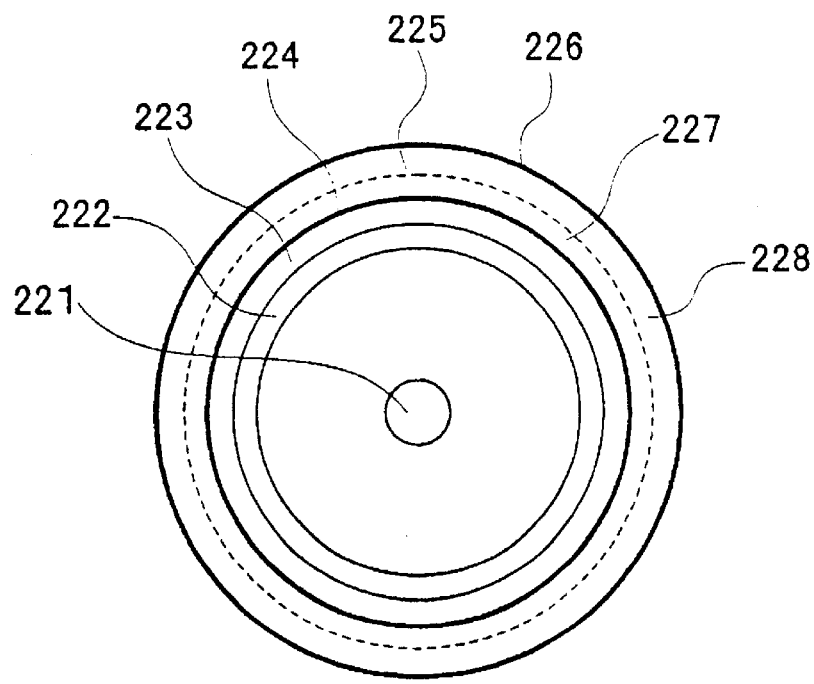
FIG. 31 is a longitudinal sectional view showing a turbo engine in which a chargeable/dischargeable three-dimensional battery is built in a casing.

FIG. 31 is a longitudinal sectional view showing a turbo engine in which a chargeable/dischargeable three-dimensional battery is built in a casing. In FIG. 31, reference numeral 221 denotes a rotational shaft, reference numeral 222 denotes a turbine, reference numeral 223 denotes a casing, reference numeral 224 denotes a cathode current collector, reference numeral 225 denotes an ion-permeable separator, and reference numeral 226 denotes an anode current collector. A cathode powdered active material and an electrolytic solution 227 are filled between the cathode current collector 224 and the separator 225 and an anode powdered active material and an electrolytic solution 228 are filled between the anode current collector 226 and the separator 225.

It is preferable that the battery of FIG. 31 adopts a structure of a battery (e.g., molten-carbonate type fuel battery using a carbonate such as lithium carbonate and potassium carbonate as electrolytes and activated at a high temperature of approximately 650° C.) activated at a relatively high temperature according to an activated temperature of the engine and the casing 223 is used as an electrode that absorbs the heat by charge. FIG. 31 shows the turbo engine. In case of the reciprocal engine, a cooling double jacket on an outer periphery of a cylinder can be used as the casing the battery.

[Mobile Body Using Power Stored in Three-dimensional Battery as Power Source]

(Dual-Structured Ship)

In many cases, ship for transporting a liquid which would pollute sea water if leaked, such as a tanker, has a dual-structure to prevent the leak of the liquid into the sea caused by accident or the like. In actuality, the dual-structured portion is not efficiently utilized.

Accordingly, a chargeable/dischargeable three-dimensional battery using the sea water and alkali as an electrolytic solution is formed in the dual-structured portion.

Specifically, the dual-structured portion of the ship can be utilized as the power storage.

As a result, the stored power can be utilized as a power source for the cruising ship.

Figure 32:
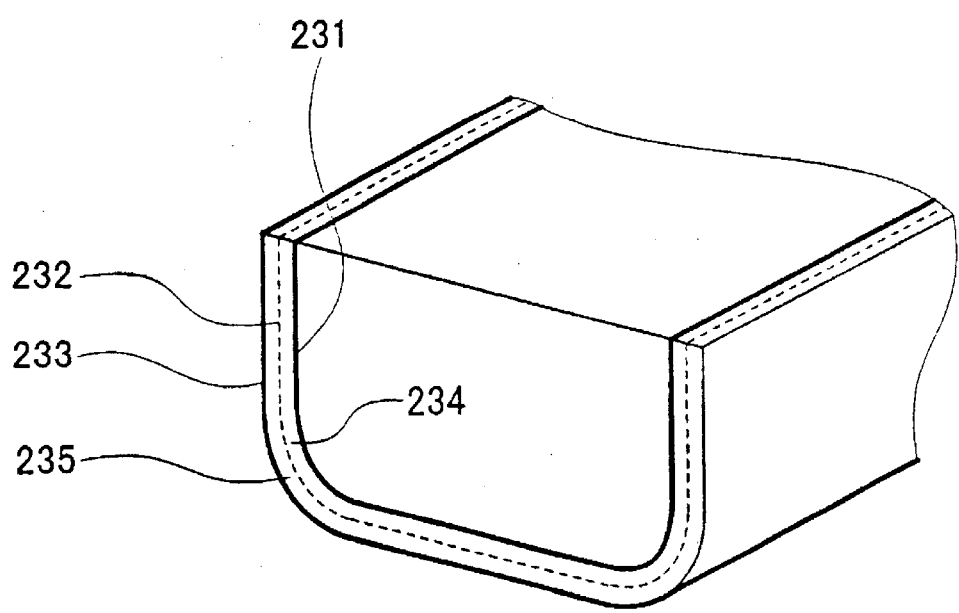
FIG. 32 is a perspective view showing part of dual-structured ship in which a chargeable/dischargeable three-dimensional battery is built.

FIG. 32 is a perspective view showing part of the dual-structured ship in which the chargeable/dischargeable three-dimensional battery is built. In FIG. 32, reference numeral 231 denotes a tank wall corresponding to a cathode current collector, reference numeral 232 denotes an ion-permeable separator, and reference numeral 233 denotes a ship outer wall corresponding to an anode current collector. A cathode powdered active material and an electrolytic solution 234 are filled between the cathode current collector 231 and the separator 232 and an anode powdered active material and an electrolytic solution 235 are filled between the anode current collector 233 and the separator 232. In this embodiment, the sea water can be also utilized as the electrolytic solution. If the dual-structured portion of the dual-structured ship is thus efficiently utilized as the three-dimensional battery, for example, 5% of the weight of the 1 million ton tanker is utilized as the battery, then the ship is capable of cruising for about 60 hours with an engine power of one hundred thousands horse power.

(Ship)

A great quantity of petroleum, natural gases, nuclear fuels, coil and so forth as an energy source are transported by enormous ship of large displacement capacity for the purpose of reducing a transport cost, but there has been no means for directly transporting the power.

Accordingly, part of or all of a ship belly is used as a chargeable/dischargeable three-dimensional battery.

Specifically, the ship belly is utilized as a power storage.

As a result, the stored power can be utilized as the power source of the cruising ship.

Figure 33:
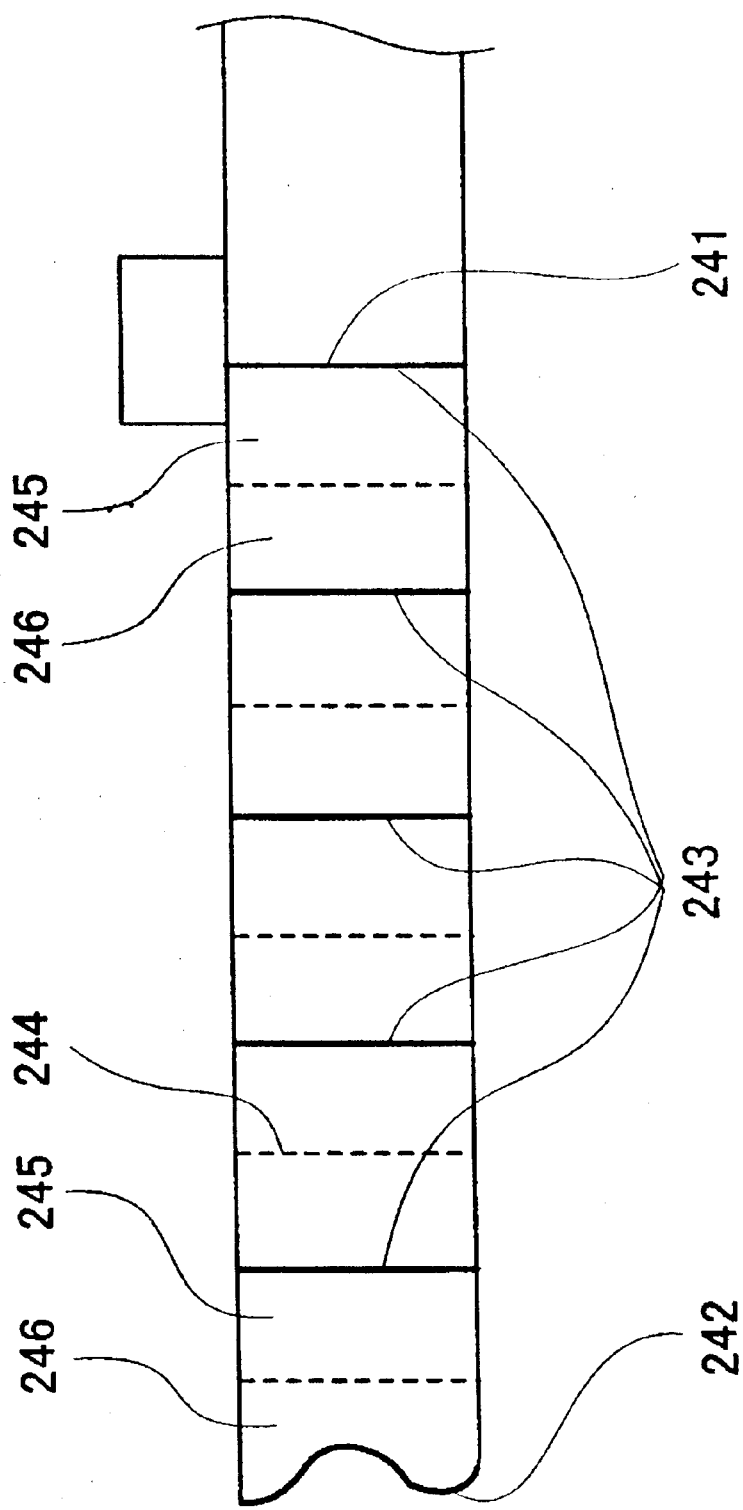
FIG. 33 is a longitudinal sectional view showing part of ship in the longitudinal direction in which a chargeable/dischargeable three-dimensional battery is built.

FIG. 33 is a partially longitudinal sectional view showing part of ship in which a chargeable/dischargeable three-dimensional battery is built. In FIG. 33, reference numeral 241 denotes a ship separating wall corresponding to a cathode current collector and reference numeral 242 denotes a ship outer wall corresponding to an anode current collector. A plurality of conductive current collecting members 243 serving as the separating walls are interposed between the cathode current collector 241 and the anode current collector 242 and each cell defined by the current collecting members 243 is divided into two parts by an ion-permeable separator 244. A cell portion of the divided cells and close to the cathode current collector is filled with the cathode powdered active material and an electrolytic solution 245 and a cell portion of the divided cells and close to the anode current collector is filled with an anode powdered active material and an electrolytic solution 246.

Assuming that the three-dimensional battery is created in the ship having displacement capacity of one million tons, a power of 100 million kWhr can be stored. If the power costs 10 yen (8 cents) per 1 kWhr, then the power that costs 1 billion yen (8,311,861.00 dollars) can be transported, and this is preferable because the efficiency in transporting the natural gases or coil is improved.

(Airplane)

A body of an airplane has a dual structure so as to be pressure-resistant and a wing thereof has a dual structure to obtain strength. Part of an inner space of the wing is filled with a fuel but the remaining inner space is not efficiently utilized.

Accordingly, the inner space of the wing is utilized to form cells of a chargeable/dischargeable three-dimensional battery.

Specifically, the power stored in the three-dimensional battery in the wing is utilized as a power at activation of an engine of the airplane and a power source inside the flying airplane.

As a result, since a power gas turbine and a dedicated battery becomes unnecessary, a lightweight airplane is achieved.

Figure 34:
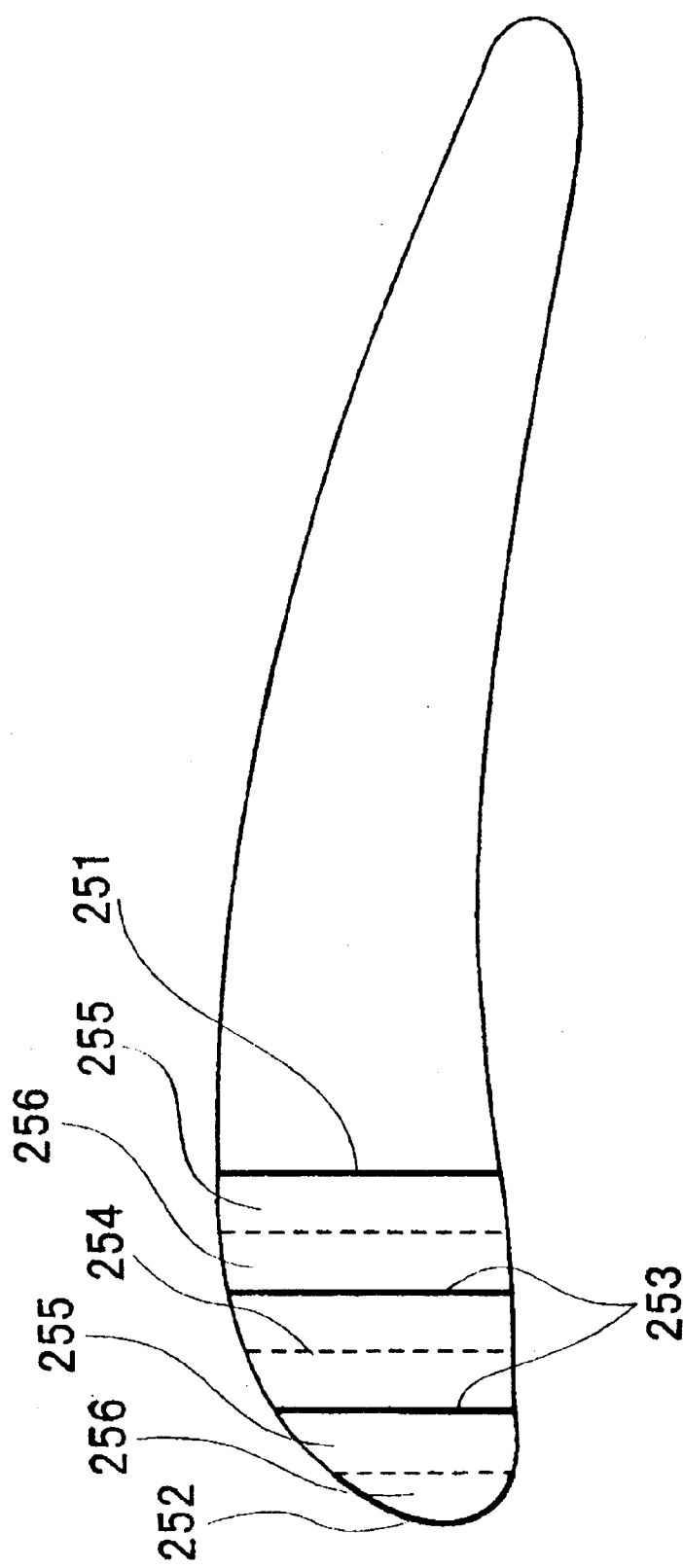
FIG. 34 is a cross-sectional view showing a wing of an airplane in which a chargeable/dischargeable three-dimensional battery is built.

FIG. 34 is a cross-sectional view of a wing of an airplane in which a chargeable/dischargeable three-dimensional battery is built. In FIG. 34, reference numeral 251 denotes an inner wing separating wall corresponding to a cathode current collector and reference numeral 252 denotes an outer wing separating wall corresponding to an anode current collector. A plurality of conductive current collecting members 253 serving as separating walls are interposed between the cathode current collector 251 and the anode current collector 252 and each cell defined by the current collecting members 253 is divided into two parts by an ion-permeable separator 254. A cell portion of the divided cells and close to the cathode current collector is filled with a cathode powdered active material and an electrolytic solution 255 and a cell portion of the divided cells and close to the anode current collector is filled with an anode powdered active material and an electrolytic solution 256.

(Road Roller)

A road roller is generally provided with large and heavy tires and the tires serve as weights. Metallic masses are filled in the inside of the tires and the filled materials are not efficiently utilized.

Accordingly, the metallic masses inside of the tires of the road roller may be replaced by powdered active materials to form a chargeable/dischargeable three-dimensional battery.

Specifically, the tires of the road roller are utilized as a mobile power supply.

As a result, the tires can be efficiently utilized as the mobile power as well as the weights.

Figure 35:
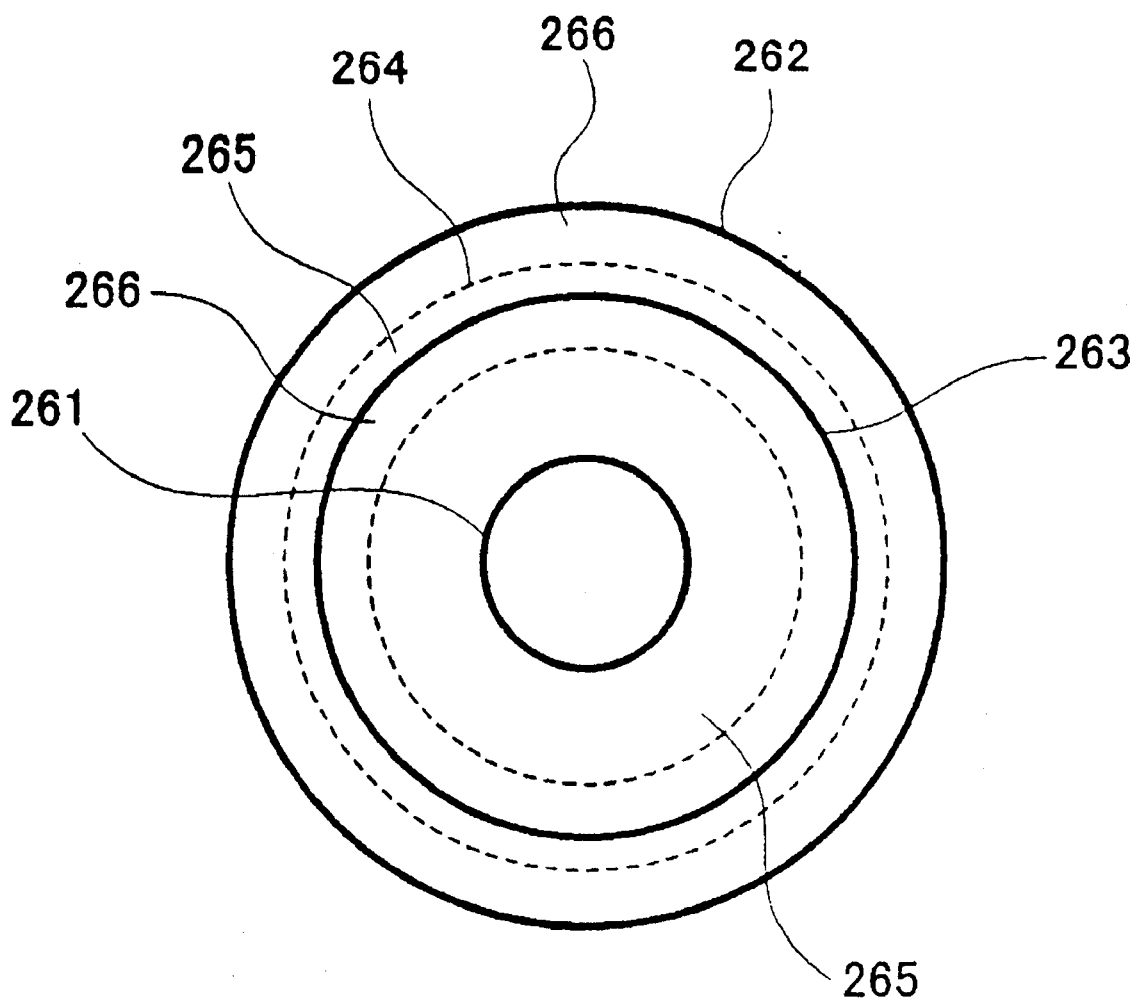
FIG. 35 is a cross-sectional view showing a tire of a road roller in which a chargeable/dischargeable three-dimensional battery is built.

FIG. 35 is a cross-sectional view showing a tire of a road roller in which a chargeable/dischargeable three-dimensional battery is built. In FIG. 35, reference numeral 261 denotes a rotational shaft corresponding to a cathode current collector and reference numeral 262 denotes an outer wall corresponding to an anode current collector. A conductive current collecting member 263 serving as a separating wall is interposed between the cathode current collector 261 and the anode current collector 262 and each cell defined by the current collecting member 263 is divided into two parts by an ion-permeable separator 264. A cell portion of the divided cells and close to the cathode current collector is filled with a cathode powdered active material and an electrolytic solution 265 and a cell portion of the divided cells and close to the anode current collector is filled with an anode powdered active material and an electrolytic solution 266.

(Electric Train)

In general, a power is supplied from a power line through a pantograph. In actuality, building of a wire is costly and time-consuming. Also, the friction between the pantograph and the power line causes noises.

Accordingly, a bottom portion of a vehicle body of the electric train is used as cells of chargeable/dischargeable three-dimensional battery.

Specifically, the power of the three-dimensional battery is stored in the bottom portion of the vehicle body to be used as a power for traveling.

As a result, the building of the wire becomes unnecessary.

Figure 36:
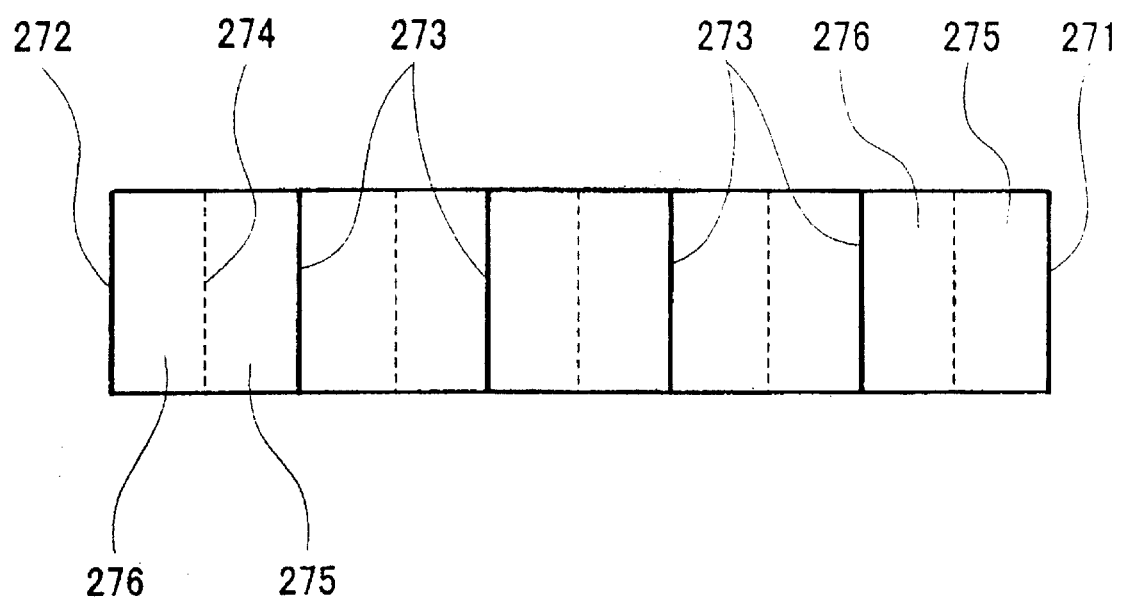
FIG. 36 is a schematic view showing a structure of a chargeable/dischargeable three-dimensional battery installed in a bottom portion of a vehicle body of an electric train.

FIG. 36 is a schematic view showing a structure of a chargeable/dischargeable three-dimensional battery installed in the bottom portion of the vehicle body of the electric train. In FIG. 36, reference numeral 271 denotes a cathode current collector and reference numeral 272 denotes an anode current collector. A plurality of conductive current collecting members 273 serving as the separating walls are interposed between the cathode current collector 271 and the anode current collector 272 and each cell defined by the current collecting members 273 is divided into two parts by an ion-permeable separator 274. A cell portion of the divided cells and close to the cathode current collector is filled with a cathode powdered active material and an electrolytic solution 275 and a cell portion of the divided cells and close to the anode current collector is filled with an anode powdered active material and an electrolytic solution 276.

For example, if 1 ton three-dimensional battery is created, then a 100 kWhr power can be stored, and an electric train traveling around the city can travel for several tens minutes and can be charged in a short time (several minutes) while the train is not moving. However, to travel 16 vehicles of a bullet train, the maximum power of 15000 kW is required, and the bullet train cannot travel for 2 hours without mounting 4 ton three-dimensional battery in each vehicle. It is therefore preferable that the three-dimensional battery having a capacity as small as about 2 ton is mounted together with an engine electric generator, a fuel battery or the like.

[Electric Locomotive]

An electric locomotive is adapted to travel by driving an electric motor by a power generated by an engine electric generator. Since the response to variation of a load is slow, fly wheels are mounted to the electric locomotive. However, the energy stored in the engine electric generator is little and a traveling performance is adversely affected by the variation of angular momentum.

Accordingly, a chargeable/dischargeable three-dimensional battery is installed between the electric generator and the electric motor.

Specifically, the power stored in the three-dimensional battery is used to drive the electric motor and utilized as the power for traveling.

As a result, the response to variation of the load is improved and an efficiency of the engine is improved, thereby increasing the maximum engine power. Simultaneously, the emissions of polluted substances can be advantageously reduced.

FIG. 37(a) is a cross-sectional view showing an electric locomotive having a chargeable/dischargeable three-dimensional battery. In FIG. 37(a), reference numeral 281 denotes a driver's seat, reference numeral 282 denotes an engine electric generator, reference numeral 283 denotes a three-dimensional battery, reference numeral 284 denotes an electric motor, reference numeral 285 denotes a control device, and reference numeral 286 denotes driving wheels. FIG. 37(b) is a view schematically showing an example of a mechanism for driving an electric motor via a chargeable/dischargeable three-dimensional battery from an electric generator when applied to the turbo engine. In FIG. 37(b), reference numeral 287 denotes a compressor, reference numeral 288 denotes a fuel tank, and reference numeral 289 denotes a combustion chamber. An air 290 externally introduced is compressed by a compressor 287, and the resulting high-pressure air and a fuel in the fuel tank 288 are combusted by the combustion chamber 289 to generate a high-temperature and high-pressure gas. A kinetic energy of the high-temperature and high-pressure gas is supplied to the three-dimensional battery 293 through an expander 291 and an electric generator 292 and converted into a power to be stored therein. The power is supplied to the electric motor 295 through the control device 294.

(Power Vehicle)

In general, a power is supplied to an electric locomotive and an electric train from a power line through a pantograph. The train cannot travel on non-electrified line and during electric power failure. Accordingly, a power vehicle constituted by vehicles in which an electric generator and a chargeable/dischargeable three-dimensional battery or only the chargeable/dischargeable three-dimensional battery is mounted is connected to the electric locomotive or electric train.

Specifically, the power of the power vehicle is used to drive the electric motor and is utilized as the power for traveling of the electric locomotive or the electric train.

As a result, the electric locomotive or the electric train can travel on the non-electrified line.

Figure 37:
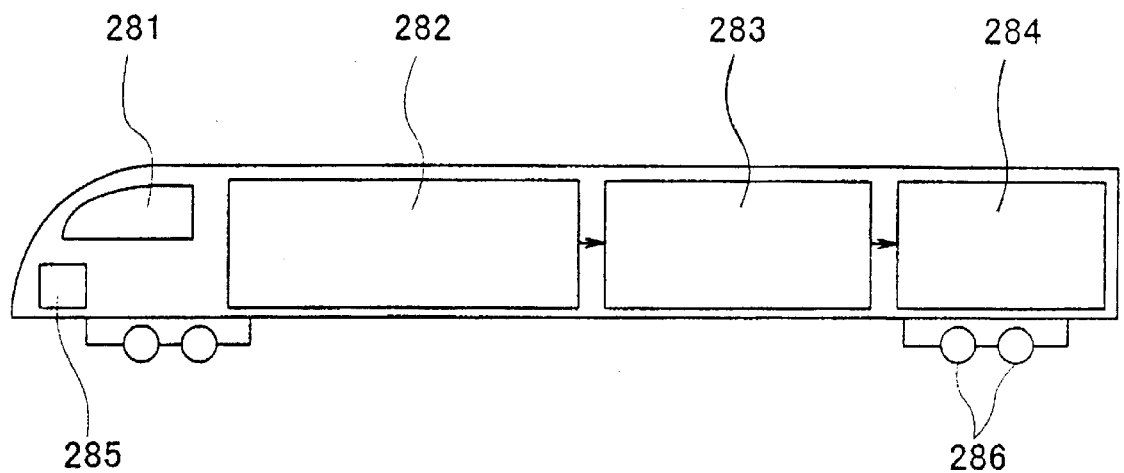
FIG. 37(a) is a cross-sectional view showing an electric locomotive having a chargeable/dischargeable three-dimensional battery and FIG. 37(b) is a schematic view showing an example of a mechanism for driving an electric motor by means of a chargeable/dischargeable three-dimensional battery from an electric generator when applied to the turbo engine.
Figure 37:
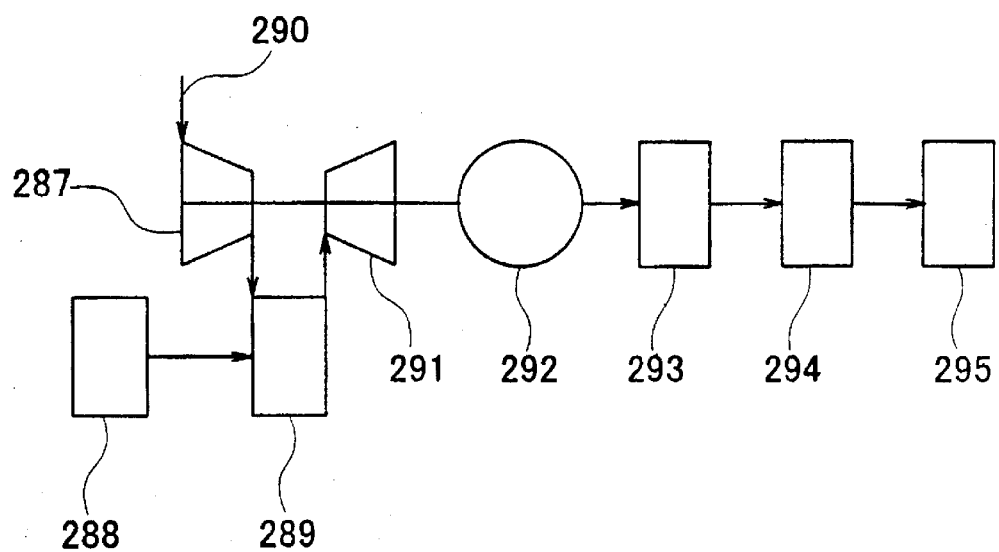

FIG. 38(a) is a cross-sectional view showing an electric locomotive to which a power vehicle is connected and FIG. 38(b) is a view schematically showing an example of power storage equipment from an electric generator to the chargeable/dischargeable three-dimensional battery when applied to the turbo engine. In FIG. 38(a), reference numeral 301 denotes an electric locomotive and reference numeral 302 denotes a power vehicle. The components identical to those of FIG. 37 are referenced to by the same reference numerals and description thereof is omitted. The difference between FIG. 38(b) and FIG. 37(b) is that FIG. 37(b) includes the control device 294 and the electric generator 295 but FIG. 38(b) does not.

(Low-Noise Electric Train)

In general, a power is supplied from a power line through a pantograph, and therefore, a friction between the pantograph and the power line causes a noise. For this reason, the electric train travels at a low speed to lessen the noise when traveling in a house-packed place. However, low-speed traveling of the electric train as a high-speed transport means causes a severe time loss and the train cannot reach destination at a desired timing.

Accordingly, a power vehicle constituted by vehicles in which an electric generator and a chargeable/dischargeable three-dimensional battery or only the chargeable/dischargeable three-dimensional battery is mounted is connected to the train as a power supply, and the three-dimensional battery is mounted in each vehicle.

Specifically, during high-speed traveling, the pantograph is stored and the train travels with the power stored in the three-dimensional battery.

As a result, the noise during the high-speed traveling can be lessened.

Figure 39:
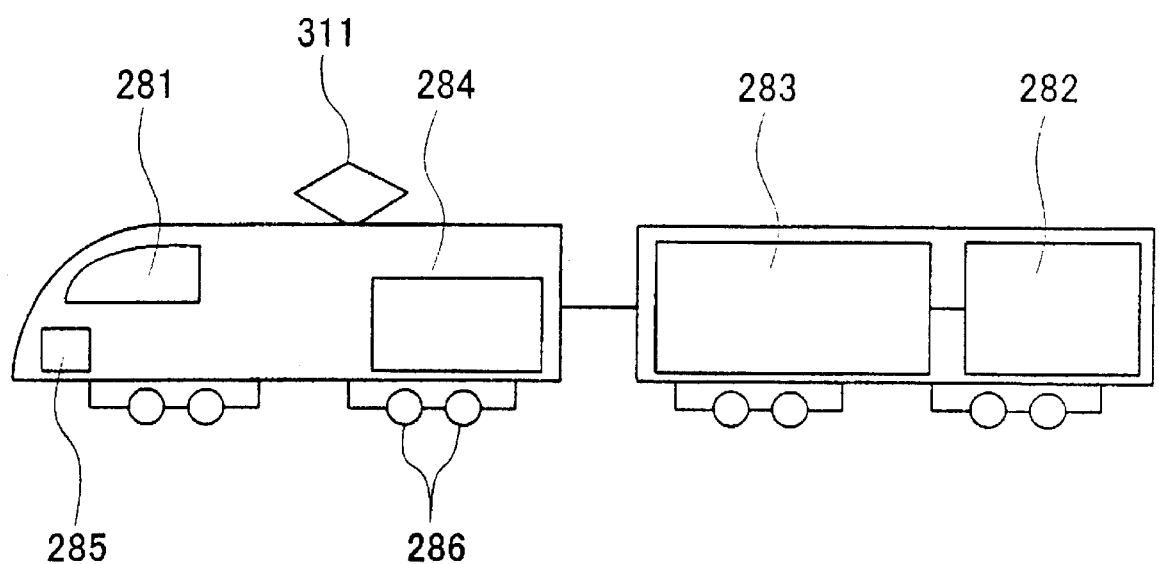
FIG. 39 is a cross-sectional view showing a low-noise electric train having a chargeable/dischargeable three-dimensional battery.

FIG. 39 is a cross-sectional view showing a low-noise electric train having a chargeable/dischargeable three-dimensional battery and differs from FIG. 38(a) in that a pantograph 311 is added to the electric locomotive 301 of FIG. 38(a).

[Power Conveying Means for Supplying Power Stored in Three-Dimensional Battery to Another Equipment]

(Electric Wire)

Conventionally, a coaxial cable is employed for high-frequency power transport and a parallel-type cable is employed for low-frequency power transport. If a power source stops power supply for a moment, or a short-time power electric failure occurs, the power supply stops, which might lead to a serious accident in equipment which does not permit momentary inactivation.

Accordingly, the power line is used as a current collector, and powdered active materials are filled around the power line. Thereby, the power line can have a function of the chargeable/dischargeable three-dimensional battery.

Specifically, the three-dimensional battery is formed in conformity to a voltage of equipment requiring a power, and the power stored in the three-dimensional battery is supplied for a short time.

As a result, in the equipment activated with a DC of a relatively small voltage, a required power can be supplied from the three-dimensional battery when the power stops the supply of power for a moment, and consequently, the electric equipment continues to be activated when a commercial power source stops supply of the power for a moment, the power source is switched, or a power source plus is discharged. In particular, electric troubles in equipment activated with a small power such as a personal computer or an electric watch can be satisfactorily dealt with.

FIG. 40(a) is a cross-sectional view showing a normal power line, FIG. 40(b) is a cross-sectional view of the power line in which the chargeable/dischargeable three-dimensional battery is built, and FIG. 40(c) is a schematic flow diagram showing an example in which a power is supplied to a terminal device from the power line in which the chargeable/dischargeable three-dimensional battery is built.

In FIG. 40(a), reference numerals 321, 322 denote power lines. In FIG. 40(b), reference numeral 323 denotes a power line corresponding to a cathode current collector and reference numeral 324 denotes an electric line corresponding to an anode current collector. A plurality of conductive current collecting members 325 are interposed between the cathode current collector 323 and the anode current collector 324 to form a plurality of cells. Each cell is divided into two parts by an ion-permeable separator 326. A cell portion of the divided cells and close to the cathode current collector is filled with a cathode powdered active material and an electrolytic solution 327 and a cell portion of the divided cells and close to the anode current collector is filled with an anode powdered active material and an electrolytic solution 328.

In FIG. 40(c), reference numeral 329 denotes a AC 100 V power supply, reference numeral 330 denotes an AC 100 V power line, reference numeral 331 denotes a rectifier, reference numeral 332 denotes a power line in which the three-dimensional battery is built, and reference numerals 333 denotes a personal computer. For example, if a powdered active material of 10 gr is filled in the power line 332, a nickel hydrogen battery is capable of feeding a DC current at 7.2V and 1A for 400 seconds.

(Electric Pole)

Cables are provided in an upper portion of an electric pole for the purpose of carrying a power. However, a structure itself of the electric pole is not efficiently utilized.

Accordingly, the electric pole is configured to have a structure of a chargeable/dischargeable three-dimensional battery.

Specifically, the power is supplied from a commercial power supply during a normal state and from the three-dimensional battery during electric power failure.

As a result, the power can be supplied without interruption during the electric power failure of the commercial power supply.

Figure 41:
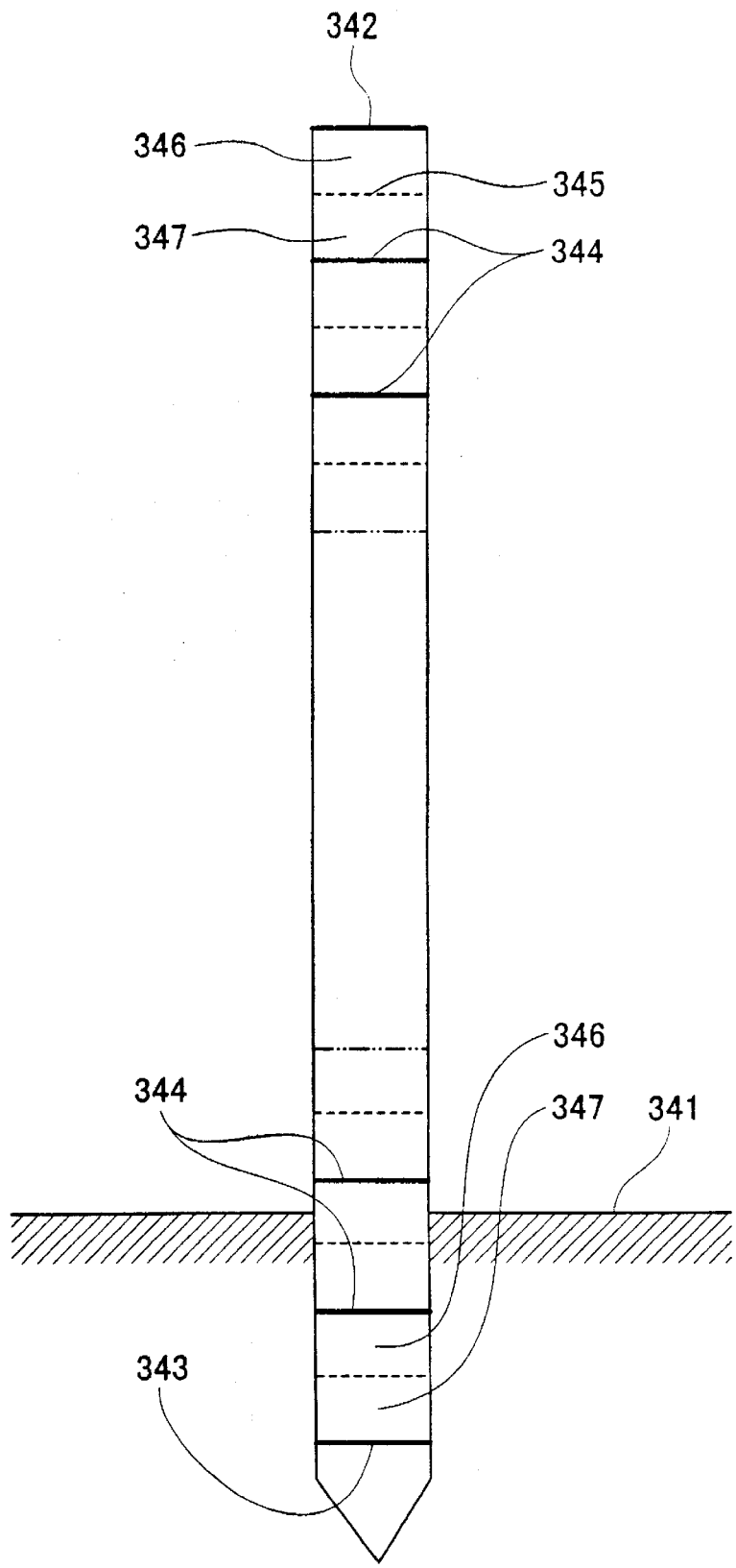
FIG. 41 is a cross-sectional view showing an electric pole in which the chargeable/dischargeable three-dimensional battery is built.

FIG. 41 is a cross-sectional view showing an electric pole in which the chargeable/dischargeable three-dimensional battery is built. In FIG. 41, reference numeral 341 denotes a ground surface, reference numeral 342 denotes a cathode, and reference numeral 343 denotes an anode. A plurality of current collecting members 344 are interposed , between the cathode and anode. Each cell defined by the current collecting members 344 is divided into two parts by an ion-permeable separator 345. A cell portion of the divided cells and close to the cathode current collector is filled with the cathode powdered active material and an electrolytic solution 346 and a cell portion of the divided cells and close to the anode is filled with the anode powdered active material and an electrolytic solution 347.

[Equipment for Converting Power Stored in Three-Dimensional Battery into Photo Energy, Kinetic Energy, or Heat Energy]

(Electric Bulb)

In general, an electric bulb is adapted to be lighted in such a manner that a glass case including a filament therein is connected to a metallic case, and a power is supplied to the filament via the metallic case. As should be understood, to light the electric bulb, a external power supply is required.

Accordingly, powdered active materials are filled in the metallic case of the electric bullet to form a chargeable/dischargeable three-dimensional battery.

Specifically, a terminal of the three-dimensional battery and a filament terminal of the electric bulb are shorted, thereby lighting the electric bulb.

As a result, the electric bulb can be lighted without the use of the external power supply.

Figure 42:
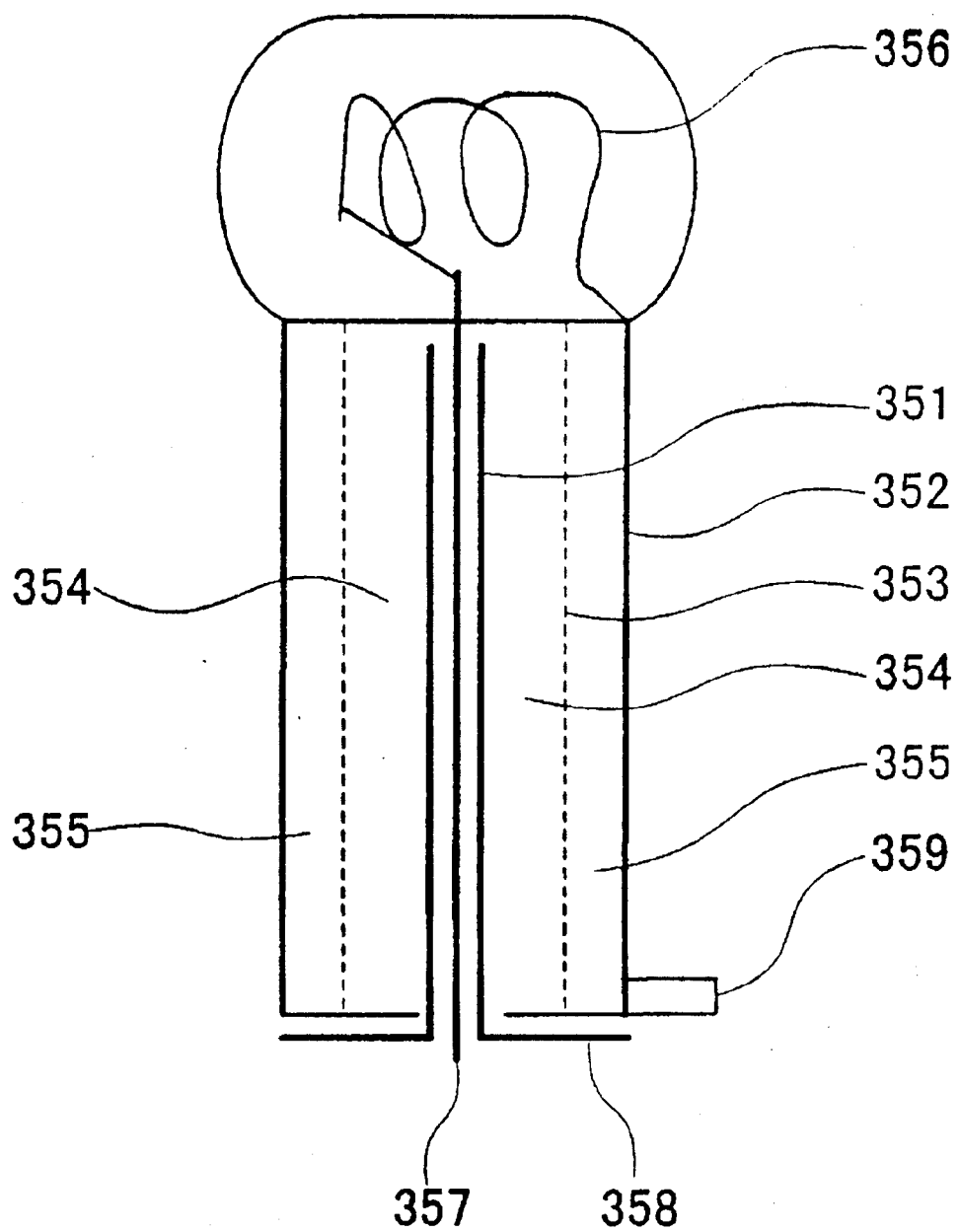
FIG. 42 is a cross-sectional view showing a battery in which the chargeable/dischargeable three-dimensional battery is built.
Figure 4:
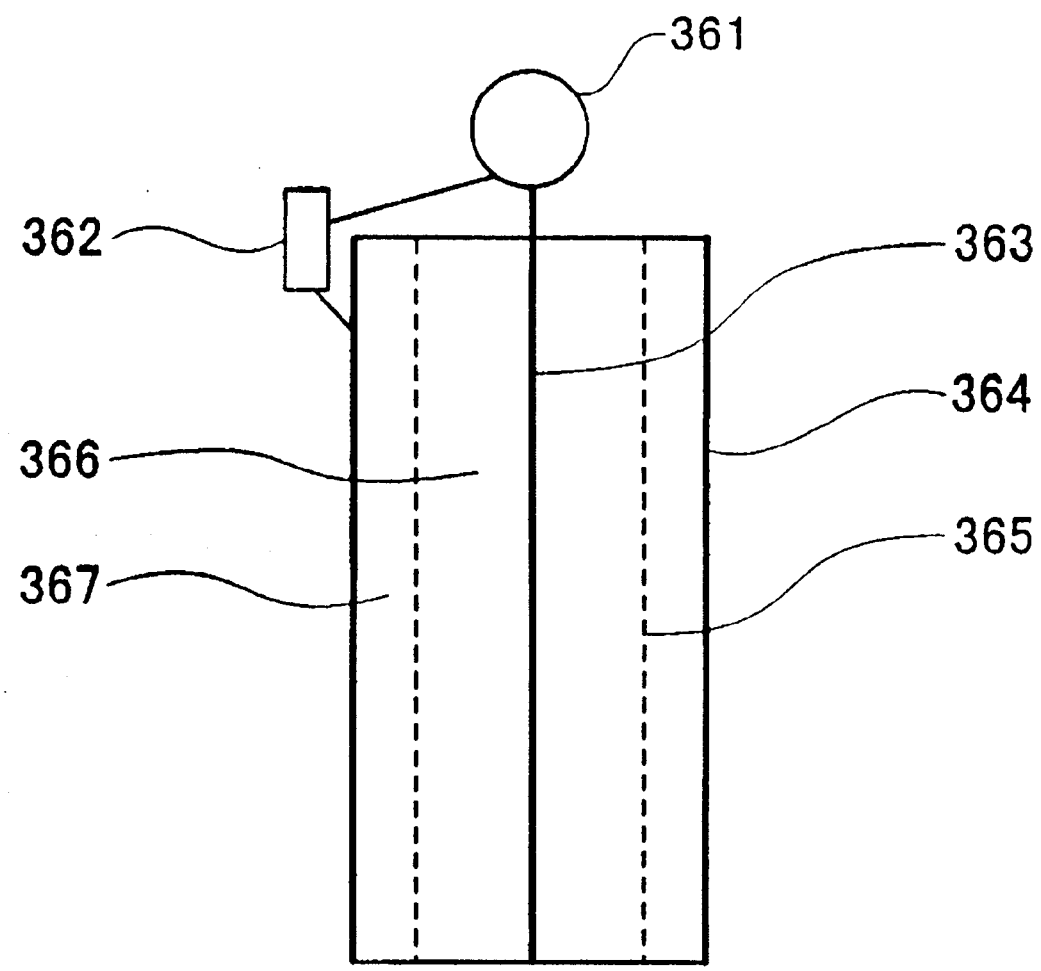

FIG. 42 is a cross-sectional view showing an electric bulb in which the chargeable/dischargeable three-dimensional battery is built. In FIG. 42, reference numeral 351 denotes a cathode current collector, 352 denote an anode current collector, and reference numeral 353 denotes an ion-permeable separator. A cathode powdered active material and an electrolytic solution 354 are filled between the cathode current collector 351 and the separator 353 and an anode powdered active material and an electrolytic solution 355 are filled between the anode current collector 352 and the separator 353. Reference numeral 356 denotes a filament, reference numeral 357 denotes a filament terminal, reference numeral 358 denotes a battery cathode terminal, and reference numeral 359 denotes a charging jack. Since one end of the filament 356 is internally connected to the anode current collector 352 of the battery, the filament terminal 357 and the battery cathode terminal 358 are shorted, thereby lighting the electric bulb.

(Flashlight)

In general, in a flashlight, a battery is put in a tubular case with a power switch to light an electric bulb. Since the flashlight has a dual case structure in which a battery case is put into the case of the flashlight, it is voluminous and heavyweight.

Accordingly, the case of the flashlight is utilized as a current collector and powdered active materials and electrolytic solutions are filled in the case, to form a chargeable/dischargeable three-dimensional battery.

Specifically, the case of the flashlight is utilized as a housing of the three-dimensional battery.

As a result, the battery put in the conventional flashlight can be dispensed with and therefore, a lightweight and small-sized flashlight is achieved.

FIG. 43 is a cross-sectional view showing a flashlight in which the chargeable/dischargeable three-dimensional battery is built. In FIG. 43, reference numeral 361 denotes an electric bulb, reference numeral 362 denotes a switch, reference numeral 363 denotes a cathode current collector, reference numeral 364 denotes an anode current collector, and reference numeral 365 denotes an ion-permeable separator. A cathode powdered active material and an electrolytic solution 366 are filled between the cathode current collector 363 and the separator 365 and an anode powdered active material and an electrolytic solution 367 are filled between the anode current collector 364 and the separator 365.

(Huge Meteor Orbit Changing Device)

There has been proposed a method for shooting a metallic bullet placed in two rails into a huge meteor by using a power of a lead battery as an energy to change an orbit of the meteor, as a device for changing the orbit of the huge meteor. The energy for shooting the bullet is actually short.

Accordingly, a chargeable/dischargeable three-dimensional battery with a large current is formed around a ground surface.

Specifically, the large current stored in the three-dimensional battery is changed into a kinetic energy and an energy with which the metallic bullet is shot from a rail gun into the meteor can be significantly increased.

FIG. 44($a$) is a longitudinal cross-sectional view showing the chargeable/dischargeable three-dimensional battery formed around the ground surface. In FIG. 44($a$), reference numeral 371 denotes a ground surface, reference numeral 372 denotes a cathode, and reference numeral 373 denotes an anode. A plurality of conductive current collecting members 374 are interposed between the cathode 371 and the anode 372. Each cell defined by current collecting members 374 is divided into two parts by an ion-permeable separator 375. A cell portion of the divided cells and close to the cathode is filled with the cathode powdered active material and an electrolytic solution 376 and a cell portion of the divided cells and close to the anode is filled with the anode powdered active material and an electrolytic solution 377.

FIG. 44($b$) is a schematic view showing an example of a structure of a metal bullet shooting device using a rail gun. In FIG. 44($b$), reference numeral 378 denotes a chargeable/dischargeable three-dimensional battery, reference numeral 379 denotes a metallic bullet, reference numeral 380 denotes an H-type steel brush corresponding to a cathode and reference numeral 381 denotes an H-type steel brush corresponding to an anode. For example, if the three-dimensional battery having the structure of FIG. 44($a$) is formed over a region of 10 km square, then a power of ($10^5$ V×$10^{13}$ A) can be stored. With this power, a magnetic field of (0.5×$10^{18}$ W) is formed from an airy region to a ground surface and an electromagnetic power is given to the metallic bullet. Specifically, a force of $10^{35}$ N is applied to the rail composed of the brushes 380, 381 and having a width of 10 m and a bullet made of nickel having a diameter of 50 m and a length of 100 m can be shot at an accelerated speed approximately $\frac{1}{10000}$ time as high as a velocity of light. Consequently, almost all the meteors can be shot down.

(Melting Device)

A melting furnace in which various materials are melted is provided with a large-power supplying equipment which costs a lot.

Accordingly, a chargeable/dischargeable three-dimensional battery with a high output and a small capacity is provided in the melting furnace.

Specifically, the three-dimensional battery is charged by appropriate power generating means and a high-output and small-capacity power stored in the three-dimensional battery is supplied to the melting furnace when a material is melted. An electric energy of the power is converted into a heat energy to be used for melting the material.

Thus, the material can be melted in a relatively small power supplying equipment.

3. Embodiments of Fourth Invention

First Embodiment

Figure 45:
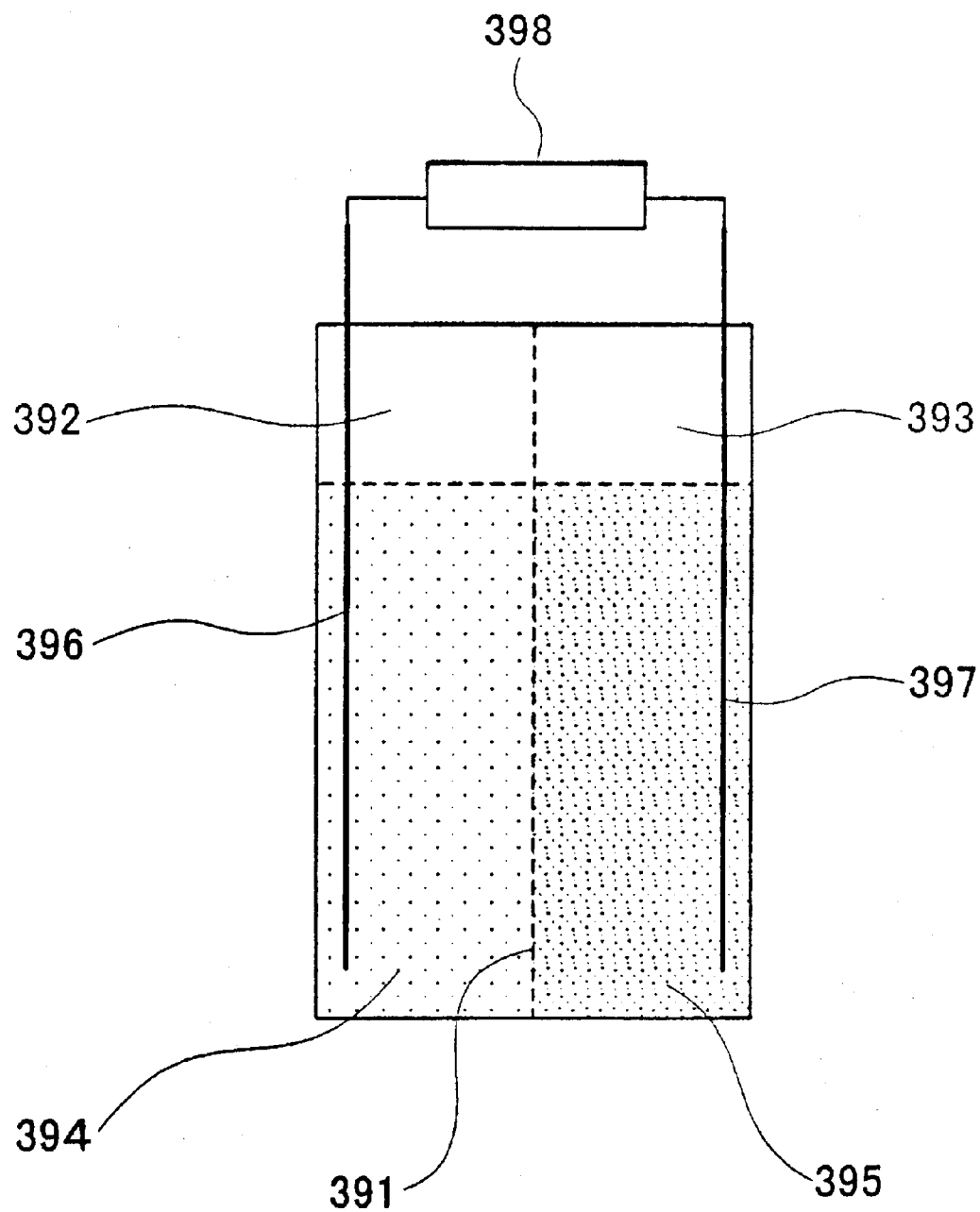
FIG. 45 is a schematic view showing a structure of an alkali primary battery according to a first embodiment of a fourth invention.

FIG. 45 is a schematic view showing a structure of an alkali primary battery according to a first embodiment of the fourth embodiment. As shown in FIG. 45, an anode cell 392 and a cathode cell 393 are provided with an ion-permeable separator 391 interposed therebetween. An anode powdered active material and an electrolytic solution 394 are filled in the anode cell 392 and a cathode powdered active material and an electrolytic solution 395 are filled in the cathode cell 393. Powdered iron carbide is used as powdered anode material and may be replaced by a powdered mixture of iron carbide and iron. The iron carbide refers to an iron carbide product at least partially having a chemical composition of $Fe_3C$. The iron carbide can be produced by a method disclosed in Japanese Laid-Open Patent Publication No. Hei. 9-48604 filed by the applicant, but when an iron-containing material is reduced and carburized to produce the iron carbide, it is not necessary to use the iron carbide product with all components of the iron-containing material converted into the iron carbide. This is because the more a carburized portion contained in the iron carbide is, the higher conductivity is obtained, but a producing cost of the iron carbide product including much carburized portion with high conversion rate is high. With this regard, when $Fe_3C$ composition of the iron carbide product is more than 5 atom %, required conductivity as an anode powdered material can be ensured. In addition, the producing cost can be relatively low.

A powdered mixture of manganese dioxide and carbon is used as the cathode powdered active material. A potassium hydride aqueous solution, is used as the electrolytic solution in the anode cell 392 and the cathode cell 393.

The separator 391 serves as an ion-permeable membrane and does not serve as a powder-passing membrane. As the separator 391, for example, an unglazed pottery, an ion exchange resin membrane, metal fibers, a non-woven fabric cloth, or the like may be used. An anode current collector 396 comprising a conductor and a cathode current collector 397 comprising a conductor are respectively provided in the anode cell 392 and the cathode cell 393. The current collectors 396, 397 are connected to load means 398. The current collectors 396, 397 are preferably made of metal which is not corroded in an alkali solution, and for example, a plate comprising carbon steel plated with nickel can be used.

Subsequently, discharge of an alkali primary battery according to the first embodiment of the fourth invention will be described in detail.

When the battery is connected to the load means 398, the anode current collector 396 discharges an electron to an external circuit. The discharged electron travels from the anode current collector 396, through the load means 398, and to the cathode current collector 397. The electron reacts with the cathode powdered active material immediately on the cathode current collector 397 or while traveling through the powdered material. An anion generated by the fact that the cathode powdered active material has received the electron passes through the separator 391 and enters the anode cell 392, where it reacts with the anode powdered active material and discharges the electron. The electron travels to the anode current collector 396 immediately or through the powdered material and is supplied to the load means 398. This cycle is repeated.

The above-described discharge reaction is represented by a chemical reaction formulae for an anode side and a cathode side as follows:

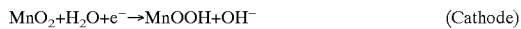

FIG. 45 only illustrates a schematic structure of the alkali primary battery and may adopt a variety of structures such as a cylindrical or layered structure.

Second Embodiment

Figure 46:
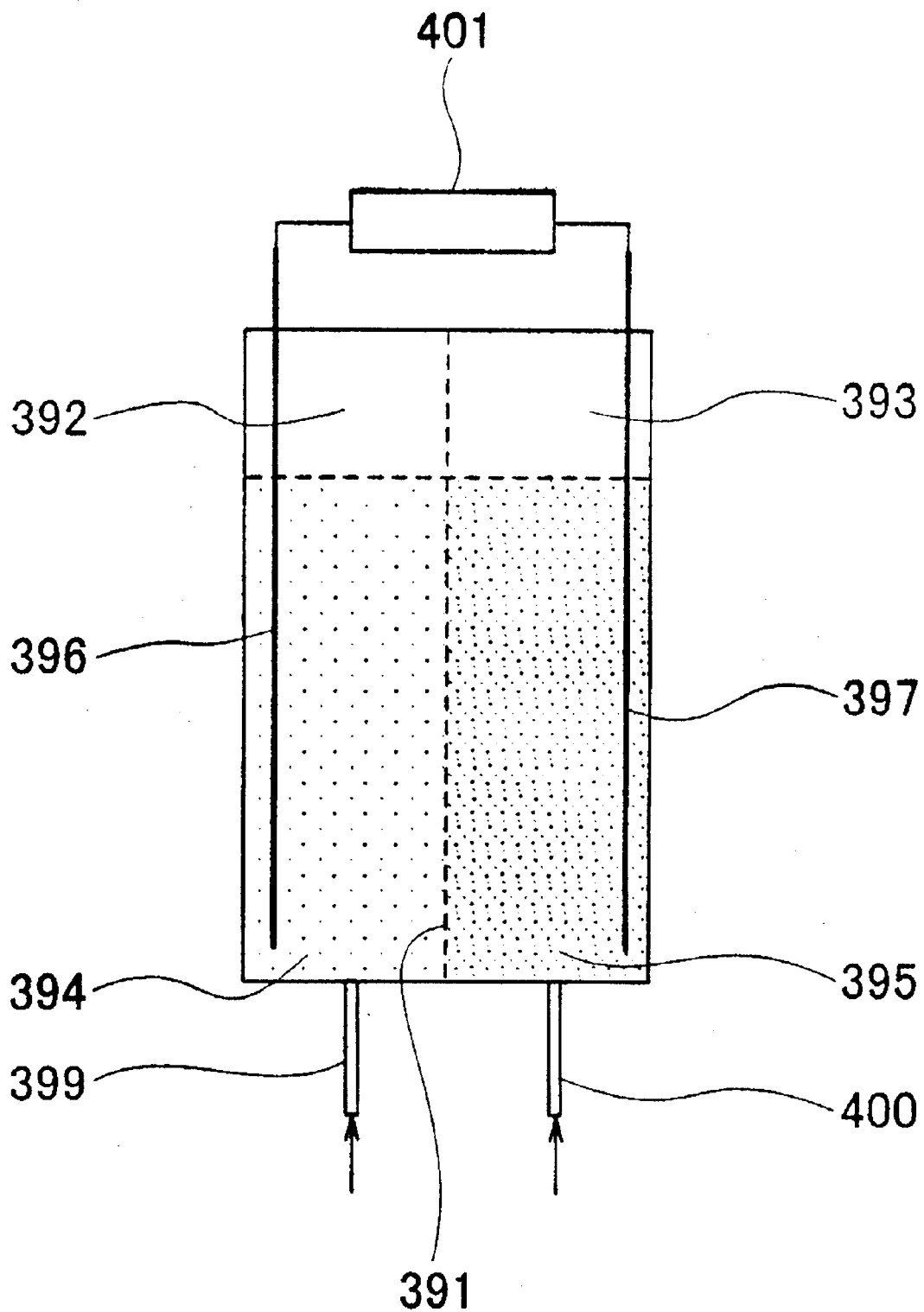
FIG. 46 is a schematic view showing a structure of an alkali secondary battery according to a second embodiment of the fourth invention.

FIG. 46 is a schematic view showing a structure of an alkali secondary battery according to a second embodiment of the fourth invention. The components identical to those of FIG. 45 are referenced to by the same reference numerals, and is not described in detail. The difference between the constitution of FIG. 45 and the constitution of FIG. 46 is that a powdered mixture of nickel hydroxide and carbon is used as a cathode powdered active material and fluid fluidizing and dispersing means 399, 400 are used in the constitution of FIG. 46. In addition to this, in FIG. 46, the load means 398 is replaced by load means (for discharge) or power generation means (for charge) 401.

Herein, to increase efficiency of contact between powdered materials or between the powdered materials and the current collectors 396, 397 in the anode cell 392 and the cathode cell 393, a gas or liquid is supplied into the respective cells 392, 393 from the fluid fluidizing and dispersing means 399, 400. Instead of or along with the fluid fluidizing and dispersing means 399, 400, agitating means such as vane-like agitators may be provided in the respective cells 392, 393 to fluidize the powdered materials.

Subsequently, charge of an alkali secondary battery according to the second embodiment of the fourth invention is described but discharge thereof is not described because the discharge is identical to that of the alkali primary battery.

When the battery is connected to the power generation means 401, an electron is discharged from the power generation means 401 and reaches the anode current collector 396. The electron reacts with the anode powdered active material immediately on the anode current collector 396 or while traveling through the anode powdered active material. An anion generated by the fact that the anode powdered active material has received the electron passes through the separator 391 and enters the cathode cell 393, where it reacts with the cathode powdered active material and discharges the electron. The electron moves to the cathode current collector 397 immediately or through the powdered material and is supplied to the power generation means 401. This cycle is repeated.

The above-described charge and discharge reactions are represented by chemical reaction formulae for an anode side and a cathode side as follows:

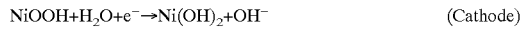

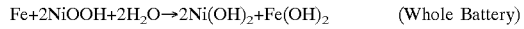

In the above formulae, an arrow indicating right represents a discharge reaction and an arrow indicating left represents a charge reaction.

FIG. 46 only illustrates a schematic structure of the alkali secondary battery and may adopt a variety of structures such as a cylindrical or layered structure.

(Discharge Curve)

Figure 47:
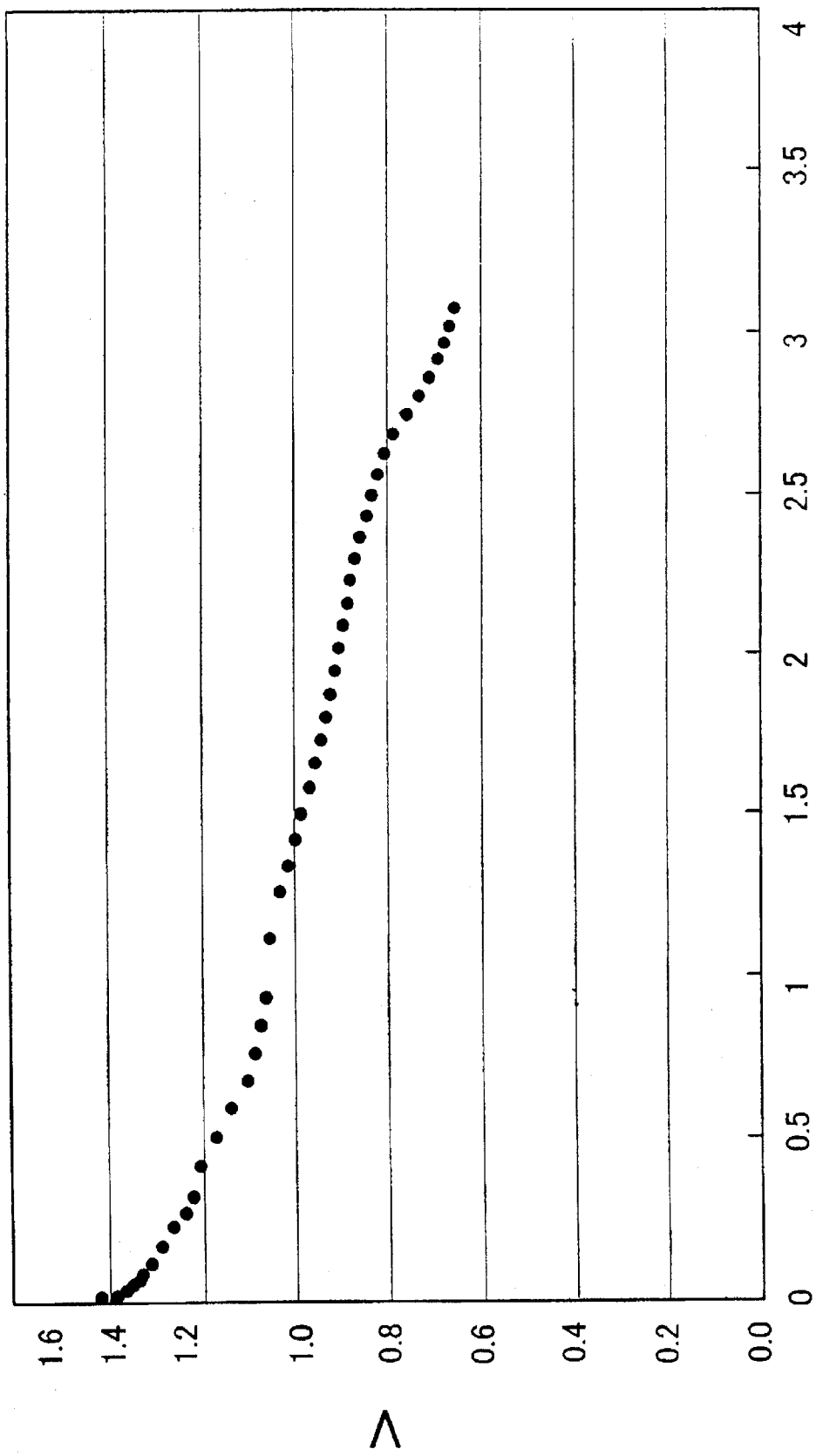
FIG. 47 is a view showing an example of a discharge curve of the alkali secondary battery of the fourth invention.
Figure 4:
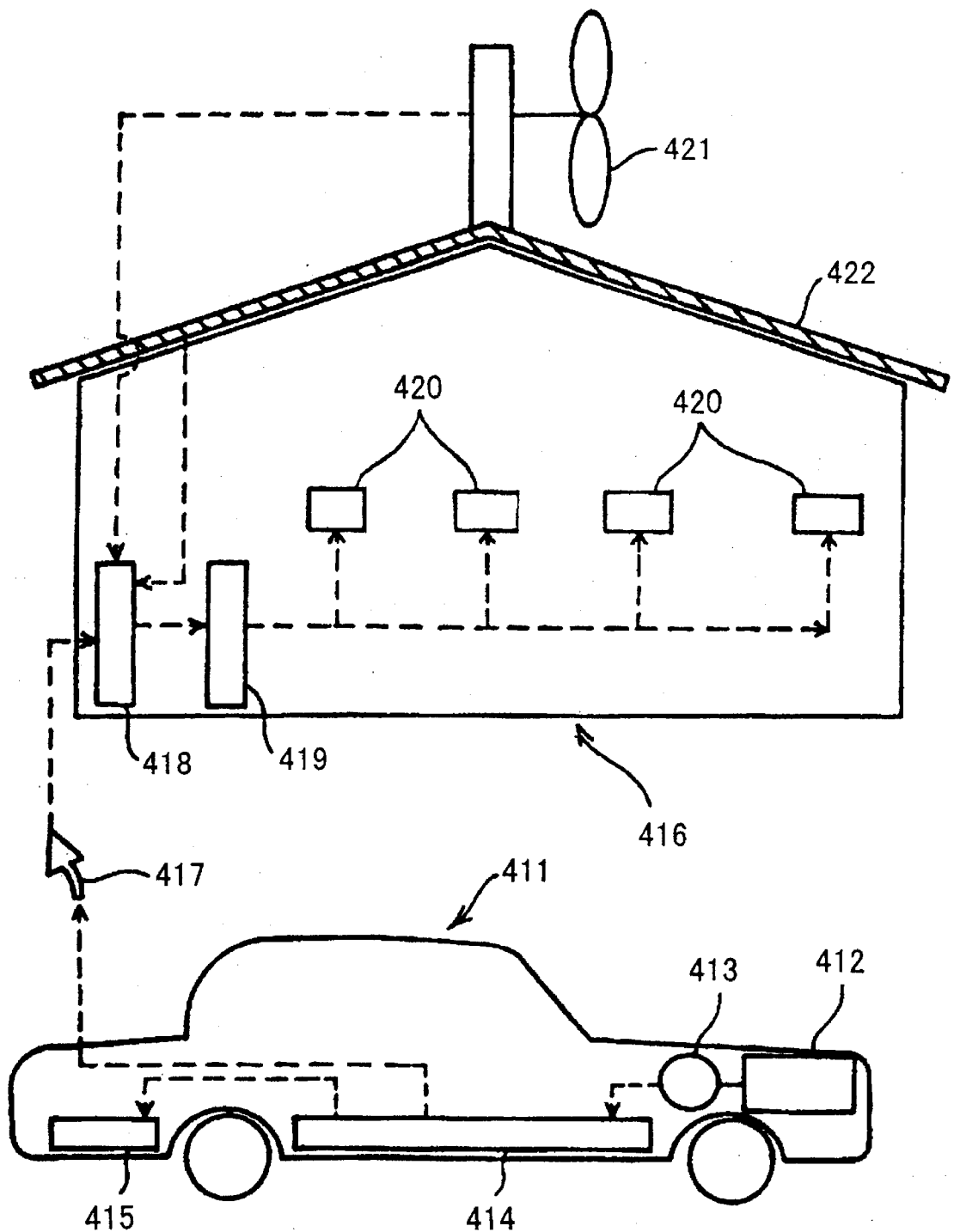
Figure 49:
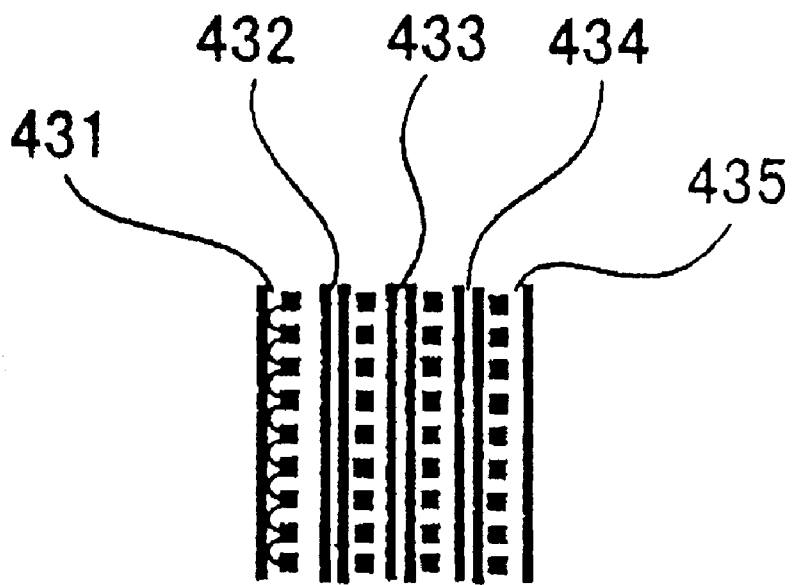
FIG. 49 is a central longitudinal sectional view schematically showing the conventional battery having a general membrane structure.
Figure 50:
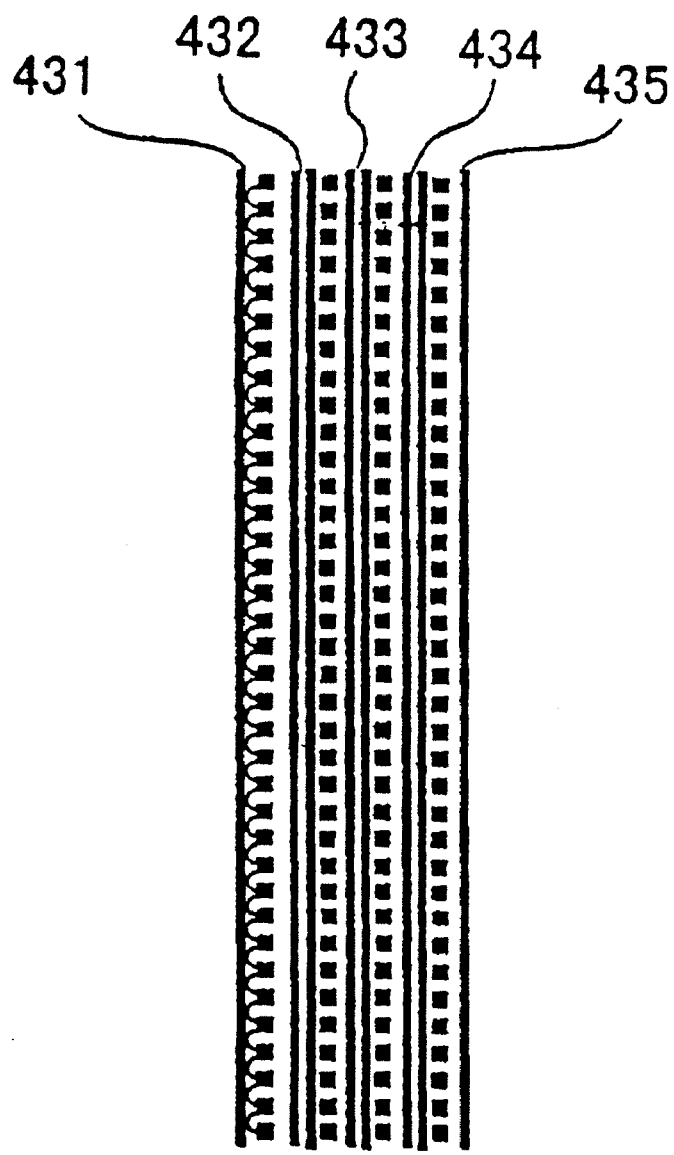
FIG. 50 is a central longitudinal sectional view schematically showing the conventional long-type battery having a general, membrane structure.
Figure 51:
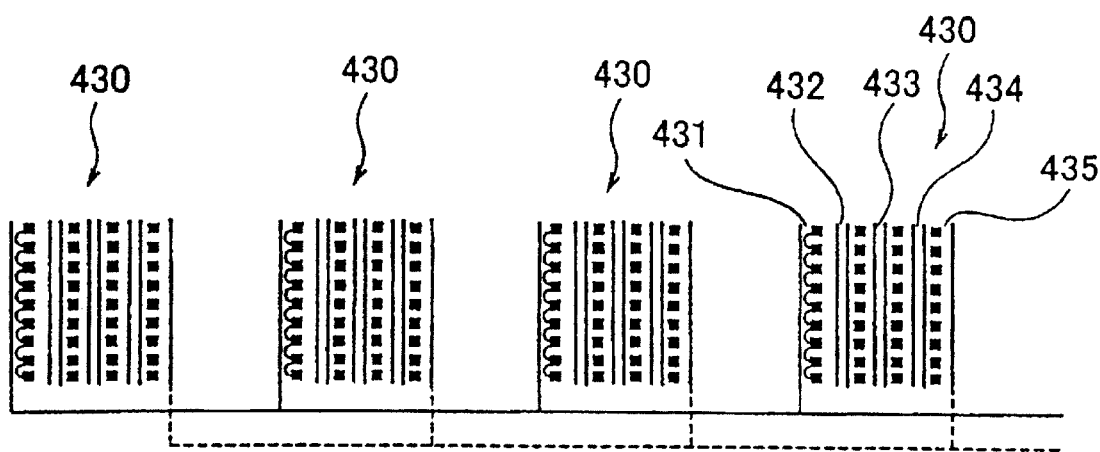
FIG. 51 is a central longitudinal sectional view schematically showing the state in which the conventional batteries having a general membrane structure are connected in parallel.
Figure 52:
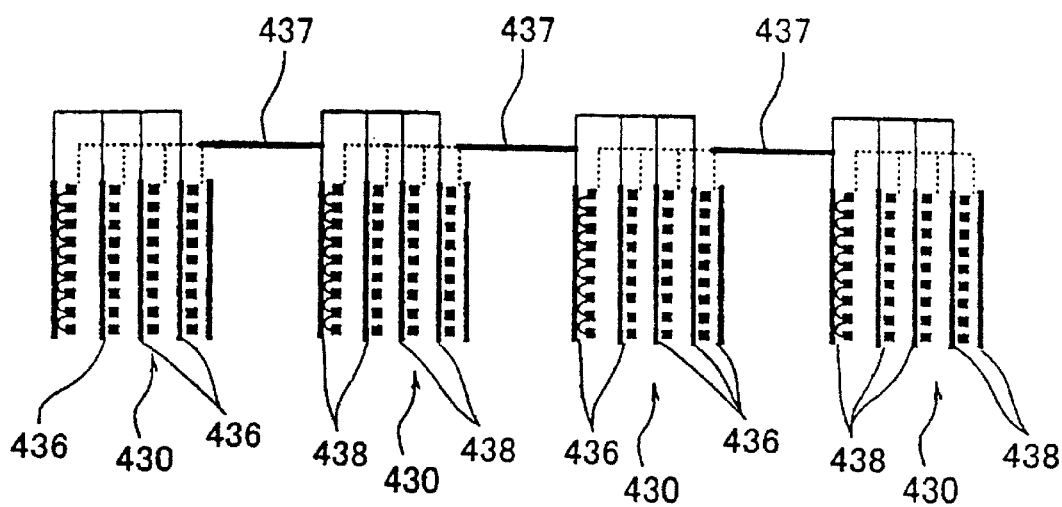
FIG. 52 is a central longitudinal sectional view schematically showing the state in which the conventional batteries having a general membrane structure are connected in series.

FIG. 47 is a view showing an example of a discharge curve of the alkali secondary battery (nominal capacity: 3 Ah) of the fourth invention. In FIG. 47, a longitudinal axis indicates a terminal voltage (V) and a lateral axis indicates a discharge capacity (Ah). In the alkali secondary battery, powdered iron carbide (about 30 atom % of the ion-containing material is iron carbide) is used as an anode active material and a powdered mixture of nickel hydroxide and carbon is used as a cathode active material. In this case, nitrogen is introduced into the cells by the fluid fluidizing and dispersing means 399, 400. As can be clearly seen from FIG. 47, preferable discharge characteristic is shown without rapid decrease of the discharge voltage.

4. Embodiments of Fifth Invention

FIG. 48 schematically shows a device that carries out a locally-distributed power generation method according to a first embodiment of the fifth invention. In FIG. 48, an automobile 411 comprises an engine 412 such as a gasoline engine, a diesel engine, and a gas turbine, an electric generator 413, traveling-source battery (battery) 414 for power storage, and an electric motor (motor) 415. The automobile 411 uses the engine 412 to cause the electric generator 413 to be activated in order to generate a power, which is stored in the traveling-source battery 414. The automobile 411 is adapted to travel by the engine 412 and by the electric motor 415 driven by the power from the battery 414 during traveling as its original purpose and only by the electric motor 415 when traveling load is less.

In the method and device of the fifth invention, the automobile or the like constituted as described above is utilized as fixed power generation equipment for houses and offices when it is not moving. It should be noted that it is possible to use an automobile with a device that generates a power by using a fuel battery instead of the device that uses the engine to activate the electric generator to generate the power. A power-driven two-wheeled vehicle, power-driven three-wheeled vehicle, ship or the like, as well as a power-driven four-wheeled vehicle may be employed so long as it has a similar function.

As shown in FIG. 48, when automobile 411 is put in a car barn of a house 416, a fixed battery (battery) 418 installed in the house 416 is connected to the traveling-source battery 414 mounted in the automobile 411 by means of a connector 417. Thereby, the power generated by rotation of the power generator 413 using the engine 412 is supplied to the fixed battery 418 and charged therein. The power from the fixed battery 418 is converted into AC and its voltage is adjusted by an inverter 419 and used in the loads 420. A commercial power supply (not shown) is connected between the inverter 419 and the loads 420. Or otherwise, the commercial power supply may be directly connected between the fixed battery 418 and DC load and used.

When the battery capacity of the traveling-source battery 414 is reduced, the engine 412 is activated and the electric generator 413 is rotated for charge. In this case, to lower the noise of an engine emission, a silencer may be outerly provided on an exhaust tube of the automobile 411.

As shown in FIG. 48, when wind power generation equipment or solar power generation equipment is installed in the house 416, that is, the power generated by a wind power generator 421 or a solar battery 422 is supplied to the fixed battery 418, the power can be used in the load 420 together with the power from the traveling-source battery 414. When the wind power generation equipment and the solar power generation equipment are installed in the house independently or in combination, a large-capacity battery (battery) becomes necessary, and equipment cost is increased. On the other hand, the power is supplied from the battery mounted in the automobile, or the like, the battery (fixed battery 418) to be installed in the house becomes small. Consequently, the equipment cost can be significantly reduced.

When the battery capacity of the traveling-source battery 414 is small and the power generated by the wind electric generator 421 or the solar battery 422 is greater than the power consumed by the loads 420, the traveling-source battery 414 can be charged with the power stored in the fixed battery 418.

In this embodiment, the wind power generation equipment or the solar power generation equipment is installed in the house 416. A wind power and solar light are optionally utilized, and the wind power electric generator 421, the solar battery 422 and the fixed battery 418 can be dispensed with. The installment of at least the inverter 419 is satisfactory. The power of the automobile can be used in houses by connecting the inverter 419 to the traveling-source battery 414 by means of the connector 417 or the like.

In this embodiment, only power equipment is explained. A heat energy generated in air-conditioning equipment, a radiator, or the like of the automobile or the like is utilized in the house to perform cogeneration. For example, warm air, cool air, or the like can be supplied from the air-conditioning equipment, the radiator, or the like of the automobile or the like, through a duct, and to the house, and utilized for air-conditioning in the house. The heat energy generated in air-conditioning equipment, a radiator, or the like of the automobile or the like can be utilized in a tent or cottage outside, which is irrelevant to the cogeneration.

As mentioned previously, the conventional house cogeneration equipment is costly and is unpayable if not used for a long time period. Although the state tried to pay half of the equipment cost of the solar power generation, which was economically unsuccessful, and a great deal of budget was surplus. Accordingly, by utilizing the power energy generated from the automobile or the like as transfer and transport means for the house instead of installing the conventional cogeneration equipment independently, house equipment cost can be significantly reduced and the distributed-type power generation can be developed.

In the automobile or the like in which a battery for power storage is mounted together with the device that uses the engine to activate the electric generator to generate the power, or the device that generates the power by the fuel battery, the power amount of the battery is several tens kW hr, and is sufficient as the power consumed in one house. When people go outside, they often use automobiles. In such cases, power supply is performed depending on whether or not the automobile is moving, by selectively using the traveling-source power or the fixed-type power.

For example, if 3 million yen (24,936.00 dollars) is paid to purchase private power generation equipment, this is uneconomical in view of difference between 3 million yen (24,936.00 dollars) and a purchasing price of the power. However, if 3 million yen (24,936.00 dollars) is paid to purchase an automobile, this is economical because the automobile can be used as transfer and transport means as its original purpose as well as the power generation equipment.

The traveling-source battery 414 and the fixed battery 418 may be batteries of the three-dimensional structure in which powdered active materials are used on the cathode side and the anode side as shown in FIGS. 1 to 12. Thus, the three-dimensional battery is preferable because, when part of or all of the degraded powdered materials is discarded, and the degraded powdered material is recovered by the recovery unit 27, and new powdered materials equivalent in amount to the discarded powdered materials are supplied to a vessel as shown in FIG. 10 according to the seventh embodiment of the first invention, charging can be started immediately.

While this embodiment has been described with regard to houses, the same is the case with offices.

Industrial Applicability

The present invention is constituted as described above, and is therefore suitable as a battery of a three-dimensional structure comprising powdered active materials and capable of storing a large power, and equipment or device having the battery as part of its structure, and an alkali primary battery and an alkali secondary battery of long lives in which discharge voltages are less likely to be reduced, and a locally-distributed power generation device which utilizes a power of transfer and transport means such as a power-driven two-wheeled vehicle, a power-driven three-wheeled vehicle, a battery-wheeled four-wheeled vehicle, ship, or the like.

What is claimed is:

1. A battery comprising two vessels connected with a member interposed therebetween that permits passage of an ion but does not permit passage of an electron, a powdered active material filled in one of the vessels and suspended in an electrolytic solution to discharge the electron, and a powdered active material filled in the other vessel and suspended in an electrolytic solution to absorb the electron, wherein conductive current collectors in contact with the powdered active material are provided in the two vessels, wherein
    at least one of fluid fluidizing and dispersing means and agitating means using a liquid or a gas for fluidizing the powdered active materials in the electrolytic solutions in the two vessels are connected to the two vessels or provided in the two vessels to provide efficient contact between the powdered active materials and between the powdered active materials and the current collectors.

2. The battery according to claim 1, wherein the current collectors in contact with the powdered active materials have a shape of one of a bar, a plate and a tube.

3. The battery according to claim 1, wherein the current collectors in contact with the powdered active materials serve as at least one of the fluid fluidizing and dispersing means and the agitating means using the liquid or the gas for fluidizing the powdered active materials in the electrolytic solutions in the vessels.

4. The battery according to claim 1, wherein heat transmitters are provided in the two vessels to keep reaction temperature in the battery constant.

5. The battery according to claim 4, wherein the heat transmitters are one of tubular current collectors and plate-shaped current collectors in contact with the powdered active materials.

6. The battery according to claim 1, wherein means for discharging degraded powdered active materials out of the two vessels and means for supplying the powdered active materials into the vessels are connected to the vessels.

7. The battery according to claim 6, wherein at least one of means for recovering discharged powdered active materials and means for making up the powdered active materials is connected to the discharging means, to supply the recovered or made-up powdered active materials from the supplying means into vessels.

8. The battery according to claim 6, wherein reaction means for charging the discharged powdered active materials by thermal reaction or chemical reaction is connected to the discharging means, to supply the charged powdered active materials from the supplying means into the vessels.

9. The battery according to claim 1, wherein the powdered active material on an anode side is powdered hydrogen-occluding alloy and the powdered active material on a cathode side is powdered nickel hydroxide.

10. The battery according to claim 1, wherein the powdered active material on an anode is powdered hydrogen-occluding alloy, the gas introduced into the fluid fluidizing and dispersing means on the anode side is hydrogen, the powdered active material on a cathode side is powdered nickel hydroxide, and the gas introduced into the fluid fluidizing and dispersing means on the cathode side is oxygen or air.

11. A three-dimensional battery of a layered type comprising plural pairs of unit batteries each comprising a pair of cells connected with a member interposed therebetween that permits passage of an ion but does not permit passage of an electron, a powdered active material put in and suspended in an electrolytic solution filled in one of the cells to discharge the electron, and a powdered active material put in and suspended in an electrolytic solution filled in the other cell to absorb the electron the plural pairs of batteries being integrally connected in series with conductive current collecting members placed so as to define separating walls of the respective cells and be in contact with the powdered active materials, wherein the cells on opposite sides are provided with current collectors that are in contact with the powdered active materials and respectively function as a cathode and an anode, wherein conductive studs are provided integrally with and protrusively from the current collecting members or the current collectors toward inside of the respective cells.

12. Equipment or device having a battery of a three-dimensional structure as part of its structure, comprising two vessels connected with a member interposed therebetween that permits passage of an ion but does not permit passage of an electron, a powdered active material filled in one of the vessels and suspended in an electrolytic solution in the one vessel to discharge the electron, and a powdered active material filled in the other vessel and suspended in an electrolytic solution in the other vessel to absorb the electron, wherein conductive current collectors in contact with the powdered active materials are provided in the two vessels, the equipment or device having a function as chargeable/dischargeable power storage equipment, wherein at least one of fluid fluidizing and dispersing means and agitating means using a liquid or a gas for fluidizing the powdered active materials suspended in the electrolytic solutions in the two vessels are connected to the two vessels or provided in the two vessels.

13. A locally-distributed power generation method that uses a device using an engine such as a gasoline engine, a diesel engine, and a gas turbine to activate an electric generator to generate a power and a battery of a three-dimensional structure comprising two vessels connected with a member interposed therebetween that permits passage of an ion but does not permit passage of an electron, a powdered active material filled in one of the vessels, and suspended in an electrolytic solution to discharge the electron, and a powdered active material filled in the other vessel and suspended in an electrolytic solution to absorb the electron, wherein conductive current collectors in contact with the powdered active materials are provided in the two vessels, as a battery for storing the generated power, the device for generating the power and the battery of the three-dimensional structure being mounted in transfer and transport means including any of a power-driven two-wheeled vehicle, a power-driven three-wheeled vehicle, a power-driven four-wheeled vehicle and a ship that travels by the engine and a power of an electric motor driven by the power from the battery, and connects the battery of the three-dimensional structure mounted in the transfer and transport means to an inverter installed in a house or an office, to enable to power generated in the electric generator of the transfer and transport means to be used in a load in the house or the office when the transfer and transport means is not moving, thereby utilizing the transfer and transport means which is not moving as fixed power generation equipment for the house or the office, that supplies high-temperature substances or/and low-temperature substances generated in the transfer and transport means which is not moving to the house or the office to perform cogeneration.

14. The locally-distributed power generation method according to claim 13, wherein a silencer is provided outerly on the transfer and transport means to reduce an emission sound of the engine when the engine is used to activate the electric generator to supply the power to the house or the office while the transfer and transport means including any of the power-driven two-wheeled vehicle, the power-driven three-wheeled vehicle, and the power-driven four-wheeled vehicle is not moving.

15. A locally-distributed power generation device comprising, transfer and transport means including any of a power-driven two-wheeled vehicle, a power-driven three-wheeled vehicle, a power-driven four-wheeled vehicle and ship, which uses a device that uses an engine such as a gasoline engine, diesel engine, a gas turbine engine to activate an electric generator to generate a power and a battery of a three-dimensional battery comprising two vessels connected with a member interposed therebetween that permits passage of an ion but does not permit passage of an electron, a powdered active material filled in one of the vessels, and suspended in an electrolytic solution to discharge the electron, and a powdered active material filled in the other vessel and suspended in an electrolytic solution to absorb the electron, wherein conductive current collectors in contact with the powdered active materials are provided in the two vessels, as a battery for storing the generated power, the device for generating the power and the battery of the three-dimensional structure being mounted in the transfer and transport means that travels by the engine and by a power of an electric motor driven by the power from the battery;

an inverter installed in a house or an office to supply an AC and voltage-adjusted power to each load of the house or the office; and a connector that connects the battery of the three-dimensional structure mounted in the transfer and transport means which is not moving to the inverter installed in the house or the office, wherein the power generated by the electric generator of the transfer and transport means can be used in the load of the house or the office, wherein a heat source of the transfer and transport means is adapted to communicate with the house or the office via a duct to allow high-temperature substances or/and low-temperature substances generated in the transfer and transport means which is not moving to be supplied to the house or the office, thereby constructing a cogeneration system.

\* \* \* \* \*

UNITED STATES PATENT AND TRADEMARK OFFICE
CERTIFICATE OF CORRECTION

PATENT NO. : 6,689,507 B1
DATED : February 10, 2004
INVENTOR(S) : Kazuo Tsutsumi et al.

It is certified that error appears in the above-identified patent and that said Letters Patent is hereby corrected as shown below:

<u>Title page,</u>
Item [22], PCT Filed: delete "Sep. 27, 2000" and insert -- March 3, 2000 --.

Signed and Sealed this

Eleventh Day of May, 2004

JON W. DUDAS
*Acting Director of the United States Patent and Trademark Office*